(12) United States Patent
Shikama

(10) Patent No.: US 6,476,981 B1
(45) Date of Patent: Nov. 5, 2002

(54) RETROFOCUS LENS SYSTEM AND PROJECTION DISPLAY APPARATUS

(75) Inventor: Shinsuke Shikama, Tokyo (JP)

(73) Assignee: Mistubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/597,398

(22) Filed: Jun. 21, 2000

(30) Foreign Application Priority Data

| Jul. 2, 1999 | (JP) | 11-188915 |
| Sep. 8, 1999 | (JP) | 11-254164 |
| Apr. 11, 2000 | (JP) | 11-108794 |

(51) Int. Cl.$^7$ .............. G02B 3/00; G02B 13/04
(52) U.S. Cl. ............ 359/750; 359/749; 359/649
(58) Field of Search ............... 359/649–651, 359/663, 749–753, 708, 713–716

(56) References Cited

U.S. PATENT DOCUMENTS

| 5,218,480 A | | 6/1993 | Moskovich | 359/753 |
| 5,442,484 A | | 8/1995 | Shikawa | 359/651 |
| 5,625,495 A | | 4/1997 | Moskovich | 359/663 |
| 5,745,297 A | * | 4/1998 | Kaneko et al. | 359/651 |
| 5,786,934 A | * | 7/1998 | Chiu et al. | 359/494 |
| 5,798,868 A | * | 8/1998 | Lee | 359/649 |
| 5,973,848 A | | 10/1999 | Taguchi et al. | 359/651 |

FOREIGN PATENT DOCUMENTS

JP 6-82689 * 3/1994

* cited by examiner

Primary Examiner—Jordan M. Schwartz

(57) ABSTRACT

A retrofocus lens system comprises a first lens group having a negative power, a second lens group having a positive power, and a third lens group having a positive power. The first lens group includes a first lens, a meniscus-shaped second lens having a negative power and a convex surface facing the large conjugate side, a third lens having a negative power, and a fourth lens. The second lens group includes a fifth lens having a positive power. The third lens group includes a sixth lens having a negative power, both surfaces of which are concave, a seventh lens having a positive power, both surfaces of which are convex, an eighth lens having a positive power, both surfaces of which are convex, and a ninth lens having a positive axial power. The system satisfies $0.9 < f_2/f_3 < 1.8$, $1.5 < |f_1|/f < 2.7$, $|f_4|/f > 30$, and $f_5/f > 6$, where f is a focal distance of the whole lens system, $|f_1|$ is an absolute value of a focal distance of the first lens group, $f_2$ is a focal distance of the second lens group, $f_3$ is a focal distance of the third lens group, $|f_4|$ is an absolute value of a focal distance of the first lens, and $f_5$ is an axial focal distance of the ninth lens.

8 Claims, 46 Drawing Sheets

IMA : 0.00 MM

IMA : 10.24 MM

IMA : 0.00 MM

IMA : 10.24 MM

IMA : 0.00 MM

IMA : 10.24 MM

IMA: 0.00 MM

IMA: 11.41 MM

IMA: 0.00 MM

IMA: 11.41 MM

IMA: 0.00 MM

IMA: 10.24 MM

FIG. 48A
FIG. 48B
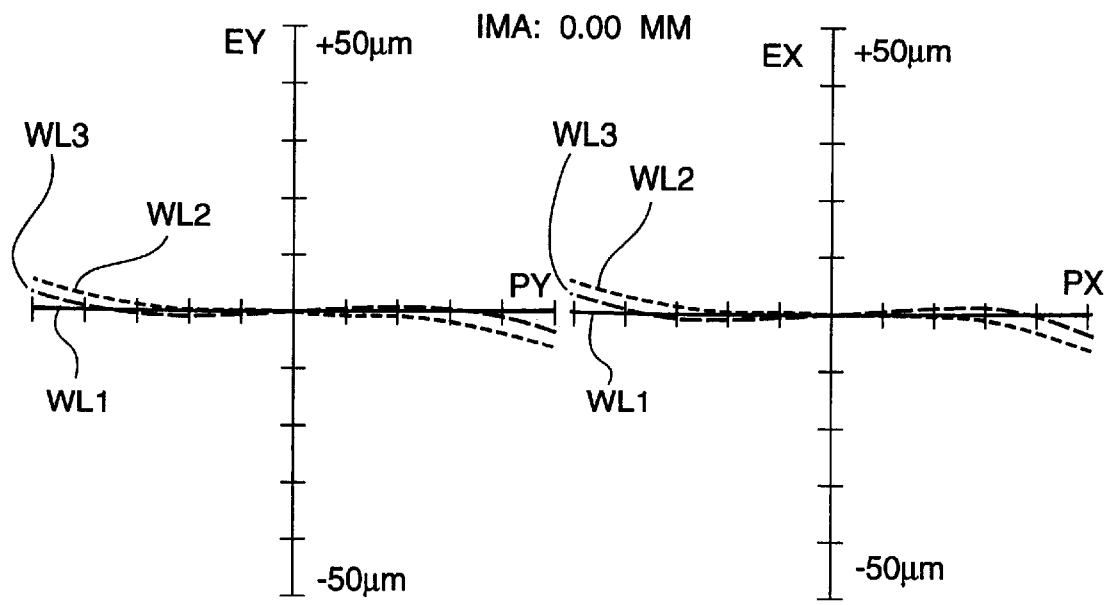
FIG. 48C
FIG. 48D
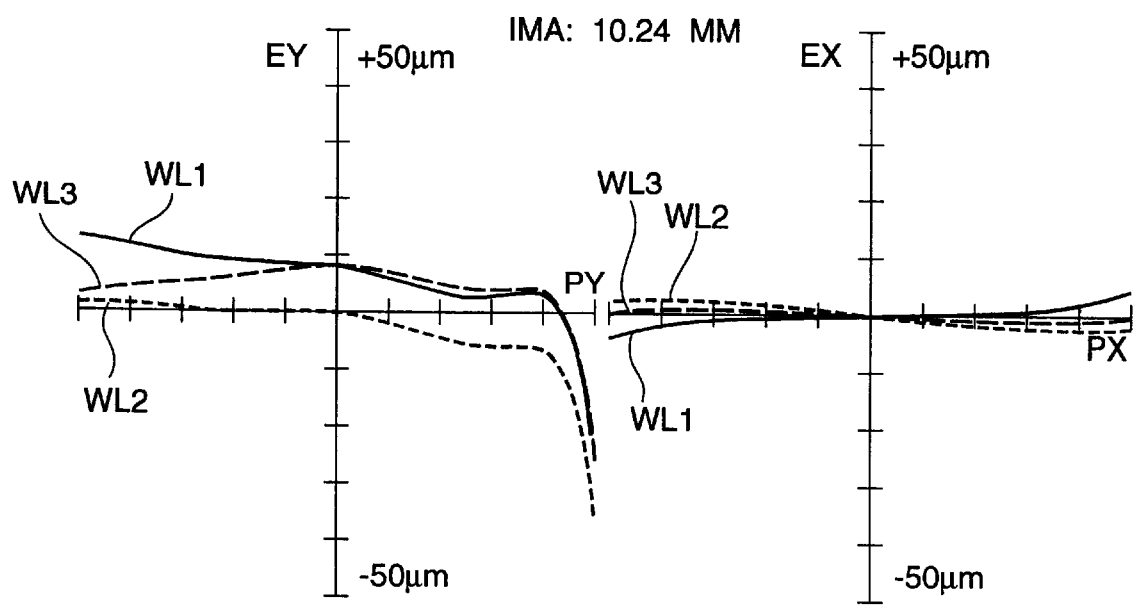

RETROFOCUS LENS SYSTEM AND PROJECTION DISPLAY APPARATUS

BACKGROUND OF THE INVENTION

The present invention relates to a retrofocus lens system that is suitable for a projection optical system which requires a long back focal length in comparison with a focal distance and a projection display apparatus incorporating the retrofocus lens system.

FIG. 49 is a schematic diagram showing a configuration of an optical system of a conventional projection display apparatus (i.e., a liquid crystal projector). As shown in FIG. 49, the projection display apparatus 300 comprises a light source 1 which includes a lamp 120 and a reflecting mirror 130 and emits approximately parallel illuminating light 2, dichroic mirrors 3B and 3G, and light reflection mirrors 4a, 4b, and 4c. The projection display apparatus 300 further comprises a transmissive liquid crystal panel 5R for displaying a red image, a transmissive liquid crystal panel 5G for displaying a green image, a transmissive liquid crystal panel 5B for displaying a blue image, a dichroic prism 6 which outputs combined light 20 of red (R), green (G), and blue (B) by reflecting the red light 2R and blue light 2B and passing the green light 2G, and a projection lens 7 for projecting incident light 20 onto a screen 8 at magnification. In the figure, a reference numeral 200 denotes a housing.

The dichroic mirror 3B reflects the blue light 2B from among the primary colors of the light 2 emitted from the light source 1 and passes the red light 2R and green light 2G. The blue light 2B reflected from the dichroic mirror 3B is reflected by the mirror 4b, passes the liquid crystal panel 5B, and then enters the dichroic prism 6. The dichroic mirror 3G reflects the green light 2G coming through the dichroic mirror 3B and passes the red light 2R. The green light 2G reflected from the dichroic mirror 3G passes the liquid crystal panel 5G and enters the dichroic prism 6. The red light 2R passing the dichroic mirror 3B is reflected by the mirrors 4a and 4c, passes the liquid crystal panel 5R, and enters the dichroic prism 6. The dichroic prism 6 sends out the combined light 20 of the incident red light 2R, green light 2G, and blue light 2B toward the projection lens 7. The projection lens 7 projects the combined light 20 onto the screen 8 at magnification.

In the projection display apparatus described above, the thick dichroic prism 6 must be disposed between the projection lens 7 and the liquid crystal panels 5R, 5G, and 5B functioning as light valve components, which are picture sources, so that the projection lens 7 requires a long back focal length.

If the projection display apparatus described above is used in a rear projector (a rear projection display apparatus), it is preferable that the distance between the projection lens 7 and the screen 8 is short (that is, the projection lens 7 has a wide angle of view), in order to reduce the outer dimensions of the apparatus.

Because the spectral transmittance, polarization generation characteristics, and reflectivity of the dichroic prism 6 greatly vary with the incident angle of the light, the design is provided so that the illuminating light striking the liquid crystal panels 5R, 5G, and 5B become approximately parallel light (that is, telecentric illumination is provided). In this case, the light striking the projection lens 7 are approximately parallel light. If this type of optical system uses a conventional wide-angle projection lens having a short back focal length, the light that passes the perimeter of the liquid crystal panels 5R, 5G, and 5B and then strike the projection lens 7 are extremely reduced, making the projected picture dark in the perimeter of the screen 8. Accordingly, it is desired that the apparatus is configured to make the principal ray of the light coming from the individual points of the picture source approximately parallel to the optical axis of the projection lens 7 (telecentric configuration). This configuration requires such a projection lens that the distance between the projection lens 7 and the position of the pupil is sufficiently greater than the focal distance.

As has been described above, a projection lens used in a projection display apparatus is required to satisfy the basic specifications associated with (1) a wide angle of view, (2) a great back focal length, and (3) telecentric characteristics on the image display component side. The projection lens of the projection display apparatus is also required to have basic aberration characteristics as described under (4) to (7) below.

(4) Low chromatic aberration: The magnification chromatic aberration must be representatively kept around the pixel pitch or preferably suppressed below a half of the pixel pitch, so that the projection magnification difference in primary-color pixels of the projected image is sufficiently reduced. The vertical chromatic aberration must be held low so that the focal points of the individual primary colors match.

(5) Low distortion: Since a wide-angle lens for rear projector projects a rectangular projection image inside the frame of the projection screen, the distortion around the perimeter of the screen often stands out. Accordingly, the deviation of a pixel from its ideal point because of distortion must be kept representatively around the pixel pitch. In rear projectors for use in CAD, multi-surface projectors that increase the number of pixels by arranging unit screens formed by rear projection, and the like, it is required to control the distortion so that the absolute deviation from an ideal point is kept to or below a half of the pixel pitch.

(6) Wide operating temperature range: The projection lens should be designed to maintain desired optical characteristics over a wide temperature range, so that the lens can be used in a wide temperature environment in which the projector is placed and can endure the heat generated by the illumination lamp. To provide the wide operating temperature range, the projection lens maybe configured only by glass lenses. In comparison with plastic materials, glass lenses generally exhibit small variations in expansion and refractive index with temperature variations, which favors the maintenance of stable optical characteristics. However, if an aspheric surface is used to correct aberrations, glass lenses have a cost disadvantage. The lens system of the present invention corrects aberrations with plastic aspheric-surface lenses and implements a projection lens with small defocusing due to temperature variations.

(7) High resolution: To project an original image produced by a light valve component having many pixels on the order of one million pixels at a high density, which has been increasingly developed in recent years, at a magnification, a projection lens having a high resolution matching the fine pixel structure of the light valve is needed. To ensure the high resolution of the projection lens, axial aberrations including chromatic aberration and distortion described above and off-axis aberrations must be sufficiently corrected.

SUMMARY OF THE INVENTION

It is an object of the present invention to provide a retrofocus lens system which has a long back focal length in comparison with the focal distance and telecentric characteristics on the picture source side and allows wide-angle projection, and a projection display apparatus utilizing the retrofocus lens system.

According to the present invention, a retrofocus lens system comprises, in order from a large conjugate side: a first lens group having a negative refracting power; a second lens group having a positive refracting power; and a third lens group having a positive refracting power. The first lens group includes, in order from the large conjugate side, a first lens from which projection light is sent out, a meniscus-shaped second lens which has a negative refracting power and a convex surface facing the large conjugate side, a third lens having a negative refracting power, and a fourth lens. The second lens group includes a fifth lens having a positive refracting power. The third lens group includes, in order from the large conjugate side, a sixth lens having a negative refracting power, both surfaces of which are concave, a seventh lens having a positive refracting power, both surfaces of which are convex, the seventh lens being joined with the sixth lens, an eighth lens having a positive refracting power, both surfaces of which are convex, and a ninth lens having a positive axial refracting power.

The retrofocus lens system satisfies the following conditional expressions (1) to (4):

$$0.9 < f_2/f_3 < 1.8 \quad (1)$$

$$1.5 < |f_1|/f < 2.7 \quad (2)$$

$$|f_4|/f > 30 \quad (3)$$

$$f_5/f > 6 \quad (4)$$

where f is a focal distance of the whole lens system, $|f_1|$ is an absolute value of a focal distance of the first lens group, $f_2$ is a focal distance of the second lens group, $f_3$ is a focal distance of the third lens group, $|f_4|$ is an absolute value of a focal distance of the first lens, and $f_5$ is an axial focal distance of the ninth lens.

Further, the first lens and the ninth lens may have an aspherical surface.

Furthermore, the retrofocus lens system may satisfy the following conditional expression (5):

$$|EXP|/f > 10 \quad (5)$$

where |EXP| is an absolute value of a distance from an image surface on a small conjugate side to a pupil surface on the small conjugate side in the whole lens system.

Moreover, the retrofocus lens system may satisfy the following conditional expression (6):

$$BFL/f > 2 \quad (6)$$

where BFL is a back focal length of the whole lens system.

Further, the retrofocus lens system satisfies the following conditional expressions (7), (8), and (9):

$$v_9 < 32 \quad (7)$$

$$v_{12} < 30 \quad (8)$$

$$v_p > 40 \quad (9)$$

where $v_9$ is an Abbe number on the d line of a glass material forming the fifth lens, $v_{12}$ is an Abbe number on the d line of a glass material forming the sixth lens, and $v_p$ is a mean value of Abbe numbers on the d line of glass materials forming the seventh lens, the eighth lens, and the ninth lens.

According to the present invention, a projection display apparatus comprises: a light source for emitting light; a light valve for two-dimensionally modulating the light from said light source; and the above-mentioned retrofocus lens system for projecting at a magnification the light modulated by said light valve.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 48A to 48D show characteristics of the retrofocus lens system of FIG. 32;

DETAILED DESCRIPTION OF THE INVENTION

Figure 1:
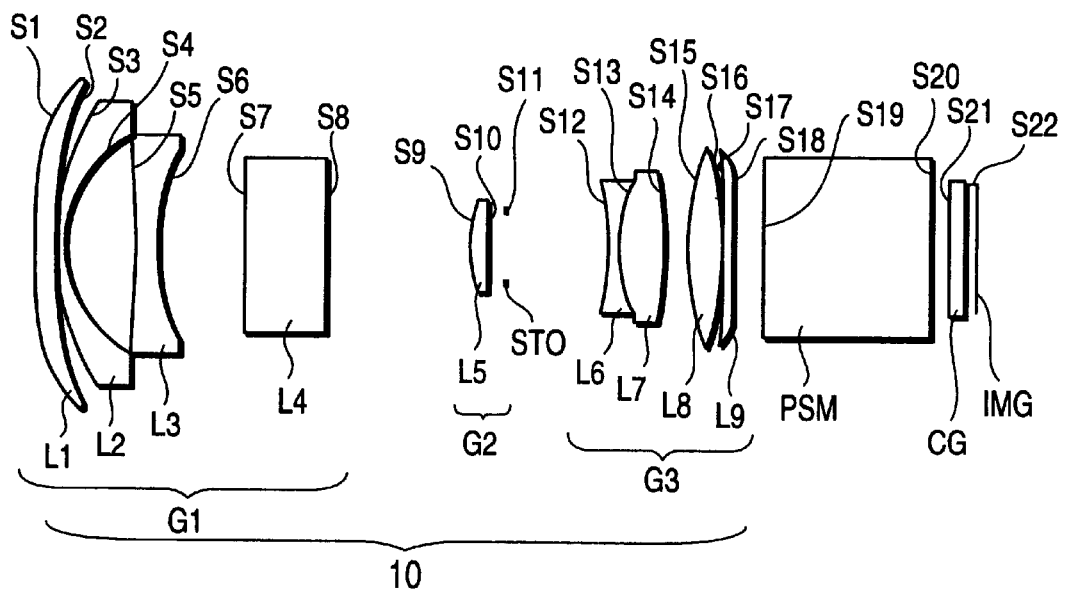
FIG. 1 is a schematic diagram showing a configuration of a retrofocus lens system of Embodiment 1 of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

The retrofocus lens system according to the present invention comprises a first lens group having a negative refracting power, a second lens group having a positive refracting power, a stop, and a third lens group having a positive refracting power, disposed in order from a large conjugate side. The "large conjugate side" means the side from which the projection light is output (that is, the screen side in a projection display apparatus using a retrofocus lens system as its projection lens) The "small conjugate side" means the side from which the projection light is input (that is, the light valve side in a projection display apparatus using a retrofocus lens system as its projection lens).

The first lens group includes, in order from the large conjugate side, a first lens from which projection light is sent out, a meniscus-shaped second lens which has a negative refracting power and a convex surface facing the large conjugate side, a third lens having a negative refracting power, and a fourth lens. The second lens group includes a fifth lens having a positive refracting power. The third lens group includes, in order from the large conjugate side, a sixth lens having a negative refracting power, both surfaces of which are concave, a seventh lens having a positive refracting power, both surfaces of which are convex, the seventh lens being joined with the sixth lens, an eighth lens having a positive refracting power, both surfaces of which are convex, and a ninth lens having a positive axial refracting power.

The retrofocus lens system according to the present invention is configured to satisfy the following conditional expressions (1) and (2):

$$0.9 < f_2/f_3 < 1.8 \qquad (1)$$

$$1.5 < |f_1|/f < 2.7 \qquad (2)$$

where f is a focal distance of the whole lens system, $f_2$ is a focal distance of the second lens group, $f_3$ is a focal distance of the third lens group, and $|f_1|$ is an absolute value of a focal distance of the first lens group.

The conditional expression (1) represents a condition for ensuring a long back focal length and maintaining telecentric characteristics. If the upper limit is exceeded, the positive refracting power of the third lens group is too large, making it difficult to provide a telecentric configuration for maintaining off-axis principal rays almost parallel and to correct the distortion. If the lower limit is exceeded, the positive refracting power of the third lens group is too small, weakening the retrofocus performance and making it difficult to keep a long back focal length.

The conditional expression (2) represents a condition for keeping a long back focal length, excellently correcting off-axis aberrations by limiting the power of the first lens group, and preventing the lens from becoming larger than necessary. If the upper limit is exceeded, the negative refracting power of the first lens group becomes too small, and the retrofocus performance weakens, making it difficult to keep a long back focal length and making the outside dimensions of the first lens group larger than necessary. If the lower limit is exceeded, the negative refracting power of the first lens group becomes too large, making it difficult to correct off-axis aberrations.

It is preferable that the retrofocus lens system according to the present invention uses a plastic lens having an aspheric surface as the first lens and is configured to satisfy the following conditional expression (3):

$$|f_1|/f>30 \tag{3}$$

where $|f_4|$ is an absolute value of the focal distance of the first lens.

The retrofocus lens system satisfying the conditional expression (3) can keep a wide angle of view and can ensure such a long back focal length that a prism or the like can be disposed between the projection lens and light valve although the focal distance is short. The principal ray of light from individual image heights, directed from the light valve onto the projection lens, can be kept approximately parallel to the optical axis (telecentric), a high peripheral illuminance ratio can be ensured, and an adverse effect on projection images caused by variations in optical properties due to incident angle characteristics for a prism can be eliminated. At least one surface of the first lens is made aspheric in order to precisely correct spherical aberration, distortion, and other high-order aberrations with a small number of lenses, and the axial power of the first lens made of a plastic material is suppressed low, so that the operating temperature range of the retrofocus lens system of the present invention can be expanded, and defocusing due to changes in temperature can be avoided.

It is preferable that the retrofocus lens system according to the present invention uses a plastic lens having an aspheric surface as the ninth lens and is configured to satisfy the following conditional expression (4):

$$f_5/f>6 \tag{4}$$

where $f_5$ is the axial focal distance of the ninth lens.

The retrofocus lens system satisfying the conditional expression (4) can ensure a wide angle of view and can also keep such a long back focal length that a prism or the like can be disposed between the projection lens and light valve, although the focal distance is short. The principal ray of light from individual image heights, directed from the light valve onto the projection lens, can be kept approximately parallel to the optical axis (telecentric), a high peripheral illuminance ratio can be ensured, and an adverse effect on projection images caused by variations in optical properties due to the incident angle characteristics for a prism can be eliminated. At least one surface of the ninth lens is made aspheric in order to precisely correct spherical aberration, distortion, and other high-order aberrations with a small number of lenses, and the axial power of the ninth lens made of a plastic material is suppressed low, so that the operating temperature range of the retrofocus lens system of the present invention can be expanded, and defocusing due to changes in temperature can be avoided.

It is preferable that the retrofocus lens system according to the present invention has a stop between the second lens group and the third lens group and is configured to satisfy the following conditional expression (5):

$$|EXP|/f>10 \tag{5}$$

where $|EXP|$ is an absolute value of a distance from an image surface on the small conjugate side to a pupil surface on the small conjugate side in the whole lens system.

The retrofocus lens system satisfying the conditional expression (5) can ensure a wide angle of view and such a long back focal length that a prism or the like can be disposed between the projection lens and light valve, although the focal distance is short. The principal ray of light from individual image heights, directed from the light valve onto the projection lens, can be kept approximately parallel to the optical axis (telecentric), a high peripheral illuminance ratio can be ensured, and an adverse effect on projection images caused by variations in optical properties due to the incident angle characteristics for a prism can be eliminated. Accordingly, by disposing a stop between the second lens group and the third lens group, the lens system can be provided with telecentric characteristics, and a desired brightness and imaging performance can be selected according to the characteristics of the illumination system up to the projection lens. By increasing the pupil distance on the light valve side, good telecentric characteristics can be obtained, and the light modulated by the light valve under telecentric illumination can be projected at a good peripheral illuminance ratio.

It is preferable that the retrofocus lens system according to the present invention is configured to satisfy the following conditional expression (6):

$$BFL/f>2 \tag{6}$$

where BFL is the back focal length of the whole lens system.

The retrofocus lens system satisfying the conditional expression (6) can ensure a wide angle of view and such a long back focal length that a prism or the like can be disposed between the projection lens and light valve, although the focal distance is short. The principal ray of light from individual image heights, directed from the light valve onto the projection lens, can be kept approximately parallel to the optical axis (telecentric), a high peripheral illuminance ratio can be ensured, and an adverse effect on projection images caused by variations in optical properties due to the incident angle characteristics for a prism can be eliminated. By increasing the back focal length, an appropriate air spacing needed to mount a thick prism component, a cover glass for protecting the front surface of the light valve, and a projection system can be provided between the light valve and retrofocus lens system.

It is preferable that the retrofocus lens system according to the present invention is configured to satisfy the following conditional expressions (7), (8), and (9):

$$v_9<32 \tag{7}$$

$$v_{12}<30 \tag{8}$$

$$v_p>40 \tag{9}$$

where $v_9$ is an Abbe number on the d line of a glass material forming the fifth lens, $v_{12}$ is an Abbe number on the d line of a glass material forming the sixth lens, and $v_p$ is a mean value of Abbe numbers on the d line of a glass materials forming the seventh lens, eighth lens, and ninth lens.

The retrofocus lens system satisfying the conditional expressions (7), (8), and (9) can ensure a wide angle of view and such a long back focal length that a prism or the like can be disposed between the projection lens and light valve, although the focal distance is short. The principal ray of light from individual image heights, directed from the light valve onto the projection lens, can be kept approximately parallel to the optical axis (telecentric), a high peripheral illuminance ratio can be ensured, and an adverse effect on projection images caused by variations in optical properties due to the incident angle characteristics of the prism component can be eliminated. By defining the upper limit of the Abbe number of the glass material forming the fifth lens with the conditional expression (7), the upper limit of the Abbe number of the glass material forming the sixth lens with the conditional expression (8), and the lower limit of the mean value of the Abbe numbers of the materials forming the seventh to ninth lenses with the conditional expression (9), the chromatic aberration can be appropriately controlled to suppress the color convergence of the primary-color images projected at magnification, and high-resolution projection performance can be implemented.

Embodiment 1

FIG. 1 is a schematic diagram showing a configuration of a retrofocus lens system 10 of Embodiment 1 of the present invention. As shown in FIG. 1, the retrofocus lens system (projection lens) 10 of Embodiment 1 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (the left side of FIG. 1).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a third lens $L_3$ having a negative refracting power, both surfaces of which are concave, and a fourth lens $L_4$ having a weak positive refracting power, both surfaces of which are convex.

The second lens group $G_2$ includes a meniscus-shaped fifth lens $L_5$ having a positive refracting power and a convex surface facing the large conjugate side.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens, an eighth lens $L_8$ having a positive refracting power, both surfaces of which are convex, and a ninth lens $L_9$ having a positive refracting power in the vicinity of the center.

In FIG. 1, IMG denotes an image forming surface of a light valve, CG denotes a cover glass in front of the light valve, and PSM denotes a prism disposed between the retrofocus lens system 10 and the light valve.

The components constituting the retrofocus lens system 10 are identified by sample values indicated in Table 1 below. In Table 1, $S_1$ to $S_{18}$ denote the surfaces of the lenses $L_1$ to $L_9$. $S_{19}$ and $S_{20}$ denote each surface of the prism PSM, and $S_{21}$ and $S_{22}$ denote each surface of the cover glass CG. Further, OBJ denotes a screen, R denotes a radius of curvature of the surface, T denotes a spacing between the surfaces, N denotes a refractive index of a glass material on the d line (d line of helium; a wavelength is 587.56 nm), and $v_d$ denotes an Abbe number on the d line. Furthermore, Type denotes a special surface type, and ASP denotes an aspheric surface.

TABLE 1

| S | R | T | N | vd | Type |
|---|---|---|---|---|---|
| OBJ | Infinity | 658 | | | |
| 1 | 1711.618 | 3.147535 | 1.489992 | 54.434 | ASP |
| 2 | 1553.54 | 0.2690544 | | | ASP |
| 3 | 38.58173 | 1.500396 | 1.804200 | 46.500 | |
| 4 | 19.3963 | 11.15668 | | | |
| 5 | −187.8675 | 3.871242 | 1.639999 | 60.100 | |
| 6 | 37.25129 | 13.8697 | | | |
| 7 | 263.9815 | 13.00113 | 1.804000 | 46.600 | |
| 8 | −326.625 | 22.6207 | | | |
| 9 | 33.12989 | 2.819631 | 1.805177 | 25.400 | |
| 10 | 480.4245 | 2.788473 | | | |
| 11 | Infinity | 16.41939 | | | STO |
| 12 | −27.81725 | 1.538833 | 1.922860 | 20.880 | |
| 13 | 21.99634 | 7.294133 | 1.799516 | 42.200 | |
| 14 | −53.39774 | 3.8731 | | | |
| 15 | 42.75749 | 5.381131 | 1.799516 | 42.200 | |
| 16 | −51.95336 | 0.2497059 | | | |
| 17 | 85.09905 | 1.494431 | 1.489992 | 54.434 | ASP |
| 18 | −1041.653 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of a plastic material (PMMA: polymethylmethacrylate), and the lens surfaces $S_1$ and $S_2$ are aspheric. The ninth lens $L_9$ is also made of the same PMMA, and the lens surfaces $S_{17}$ and $S_{18}$ are aspheric. The shapes of the lens surfaces $S_1$ and $S_2$ and the lens surfaces $S_{17}$ and $S_{18}$ are represented by the following expression (10).

$$Z = \frac{Y^2/R}{1+\{1-(1+K)Y^2/R^2\}^{\frac{1}{2}}} + DY^4 + EY^6 + FY^8 + GY^{10} + HY^{12} + IY^{14} \qquad (10)$$

where Z is a distance along the optical axis from an apex on the lens surface, Y is a distance from the optical axis in a direction perpendicular to the optical axis, K is a conic constant, R is a radius of curvature, D is an aspheric coefficient of fourth order, E is an aspheric coefficient of sixth order, F is an aspheric coefficient of eighth order, G is an aspheric coefficient of tenth order, H is an aspheric coefficient of twelfth order, and I is an aspheric coefficient of fourteenth order. The values of the aspheric coefficients K, D, E, F, G, H, and I are as indicated in Table 2 below.

TABLE 2

(ASPHERIC COEFFICIENT)

| S | K | D | E | F |
|---|---|---|---|---|
| 1 | −97.93349 | 3.794564e−5 | −9.418119e−8 | 1.419512e−10 |
| 2 | 100.0007 | 3.809485e−5 | −1.332728e−7 | 2.485224e−10 |
| 17 | −99.66243 | 1.159277e−5 | −1.912386e−7 | −5.113205e−10 |
| 18 | −26.54997 | 8.451771e−6 | −1.043664e−7 | −8.103108e−10 |

| S | G | H | I |
|---|---|---|---|
| 1 | −7.244458e−14 | −1.664242e−17 | 4.158138e−20 |
| 2 | −1.759275e−13 | −2.033230e−19 | 3.416992e−20 |

TABLE 2-continued (ASPHERIC COEFFICIENT)

| 17 | 3.327714e-12 | -8.378437e-15 | 1.259487e-17 |
| 18 | 3.984874e-12 | -7.928243e-15 | 8.637377e-18 |

Since the first lens $L_1$ and the ninth lens $L_9$ are aspheric lenses made of plastic materials, spherical aberration, distortion, and off-axis aberrations of various types can be favorably corrected. As expressed by the conditional expressions (3) and (4) indicated above, by providing each plastic lens with a large axial focal distance in comparison with the focal distance of the whole lens system, defocusing accompanying any change in temperature can be suppressed low, and variations in resolution of the whole lens system and other imaging optical properties can be suppressed low even if the temperature of the use environment changes.

The plastic materials of the first lens $L_1$ and the ninth lens $L_9$ certain material other than PMMA, such as ZEONEX-280S (trade name) manufactured by Nippon Zeon Co., Ltd. or OZ-1000 (trade name) manufactured by Hitachi Chemical Co., Ltd., with which the upper limit of the operating temperature range of the whole lens system can be raised.

Figure 49:
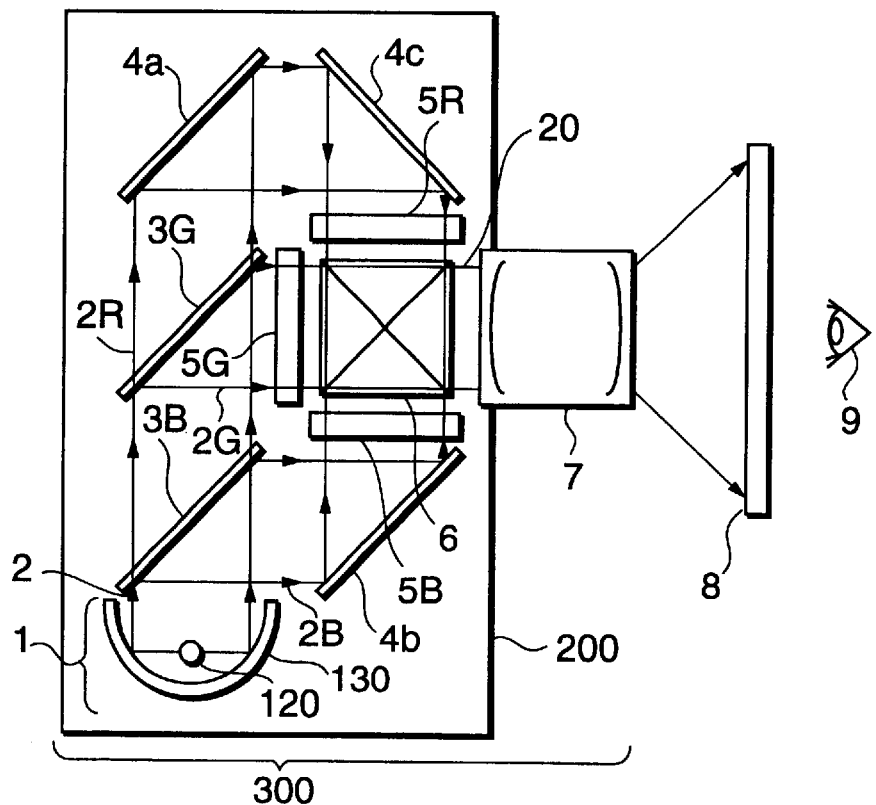
FIG. 49 is a schematic diagram showing a configuration of an optical system of a conventional projection display apparatus.

The stop STO indicated in FIG. 1 and Table 1 is associated with the inclination of the principal ray on the light valve side and adjusts a trade-off between the resolution and brightness of the projected image. For instance, if the light 20 modulated by the light valve of the apparatus shown in FIG. 49 is substantially parallel to the optical axis of the lens, a sufficient brightness can be obtained even when the aperture diameter of the stop STO is small, thanks to the telecentric characteristics of the projection lens 7. However, the illuminating light 2 actually illuminates the light valve surface with an angle distribution. If the aperture diameter of the stop STO is too small, the projected image cannot be produced with a sufficient brightness. Conversely, if the aperture diameter of the stop STO is increased to ensure sufficient brightness, the resolution of the rays striking the light valve surface at an angle because of the telecentric characteristics of the light lens may be impaired. Therefore, it is preferable that the stop STO is configured so that the aperture diameter can be changed as desired in accordance with the combination of the illumination system and the lenses.

The values of $f_2/f_3$, $|f_1|/f$, $|f_4|/f$, $f_5/f$, $|EXP|/f$, and BFL/f of the retrofocus lens system 10 of Embodiment 1 are as indicated in Table 33, which is given later, and the conditional expressions (1) to (9) are satisfied.

Further, the retrofocus lens system 10 of Embodiment 1 has such a long back focal length that a prism (PSM in FIG. 1) and a cover glass (CG in FIG. 1) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance can be obtained and the transmission and reflection in the prism become even in the screen. Therefore, the factors causing inconsistencies in color and brightness of the projected image can be reduced.

Figure 9B:
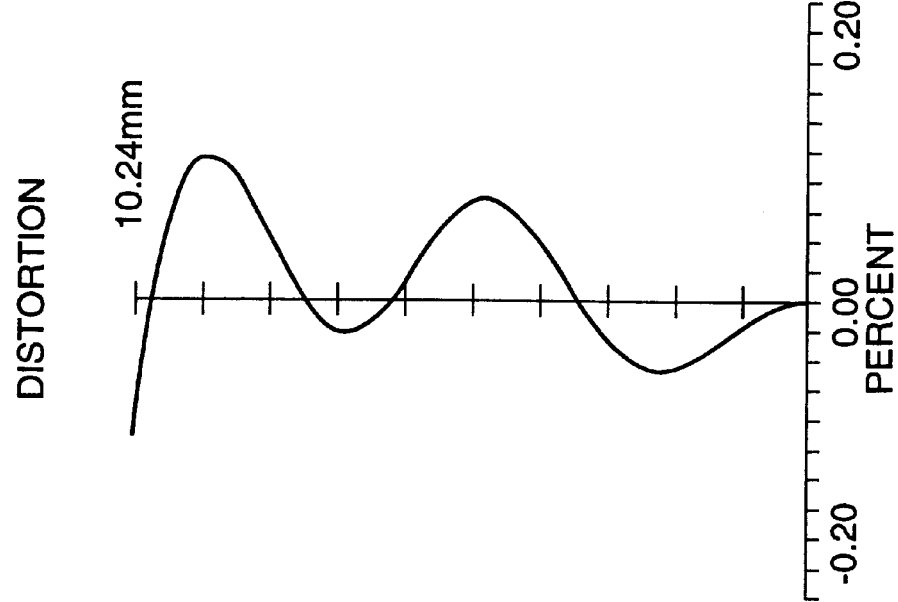
FIGS. 9A and 9B show characteristics of the retrofocus lens system of FIG. 1.
Figure 9A:
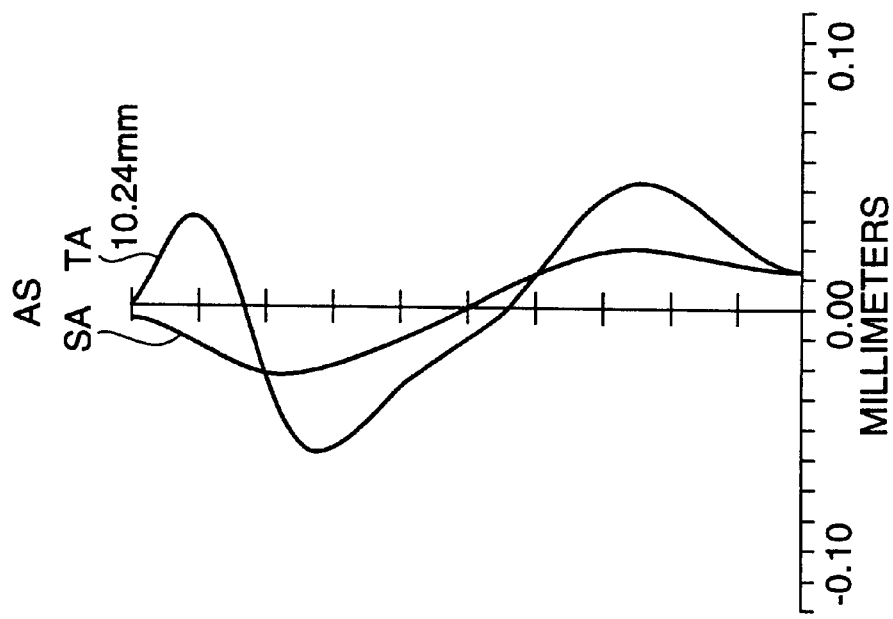

FIGS. 9A and 9B show the characteristics of the retrofocus lens system of Embodiment 1, FIG. 9A shows astigmatism (AS) on the small conjugate side, and FIG. 9B shows distortion. FIGS. 9A and 9B show the plotted astigmatism and distortion of light having a wavelength of 546.1 nm. In FIG. 9A, TA is a tangential ray in a plane containing the principal off-axis ray and optical axis, and SA is a sagittal ray orthogonal to the tangential surface containing the principal off-axis ray.

Figure 10A:
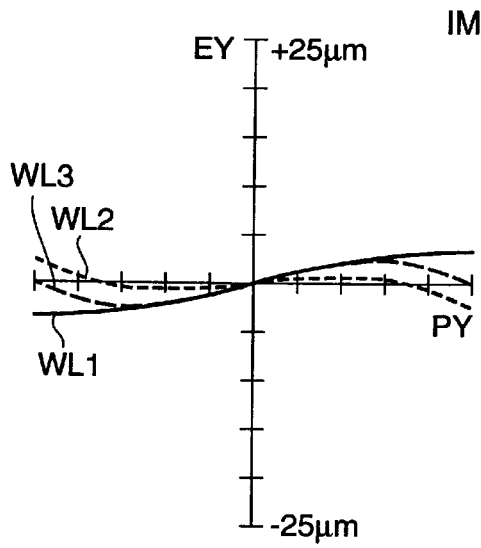
FIGS. 10A to 10D show characteristics of the retrofocus lens system of FIG. 1.
Figure 10B:
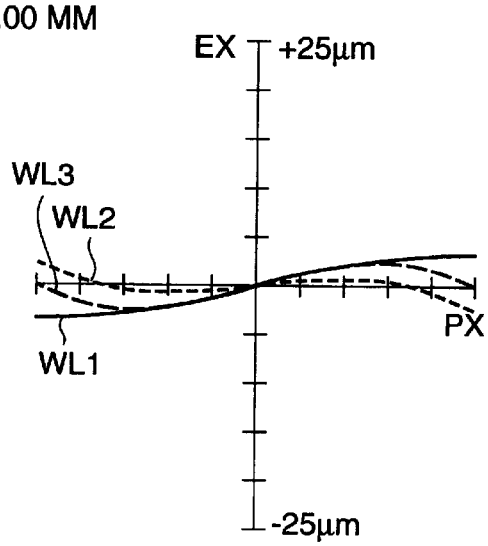
Figure 10C:
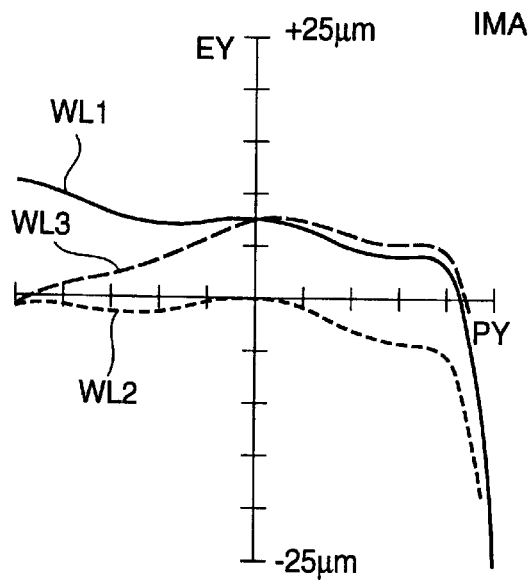
Figure 10D:
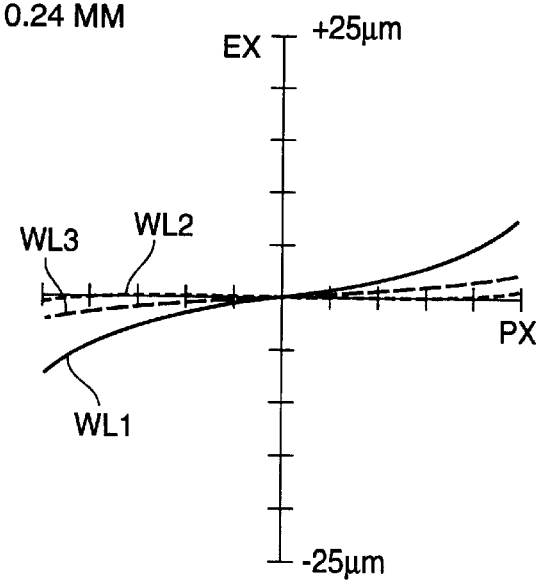

FIGS. 10A–10D show the characteristics of the retrofocus lens system of Embodiment 1. FIGS. 10A and 10B show the axial (that is, at an image height of 0.00 mm) lateral aberration. FIGS. 10C and 10D show the lateral aberration at an image height of 10.24 mm (an angle of view of 40.9° on the screen side). In the figures, PY denotes a direction of the Y-axis perpendicular to the optical axis, and EY denotes a lateral aberration in the direction of the Y-axis. PX denotes a direction of the X-axis perpendicular to the optical axis and Y-axis, and EX denotes the lateral aberration in the direction of the X-axis. The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 1 suppresses the chromatic aberration of the whole lens system, especially magnification chromatic aberration, by limiting the upper limit of the Abbe number of the fifth lens $L_5$, the upper limit of the Abbe number of the sixth lens $L_6$, and the lower limit of the average value of the Abbe numbers of the seventh to ninth lenses $L_7$–$L_9$ in the conditional expressions (7), (8), and (9) indicated above, so that the color convergence of the primary-color images of the projected image is kept under 10 $\mu$m on the light valve surface.

As has been described above, the retrofocus lens system 10 of Embodiment 1 sufficiently corrects both chromatic aberration and distortion and has adequate properties for use in a rear projector. Moreover, the other axial aberrations and off-axis aberrations are also appropriately corrected so that a light valve having many pixels on the order of million pixels can be projected.

Embodiment 2

Figure 2:
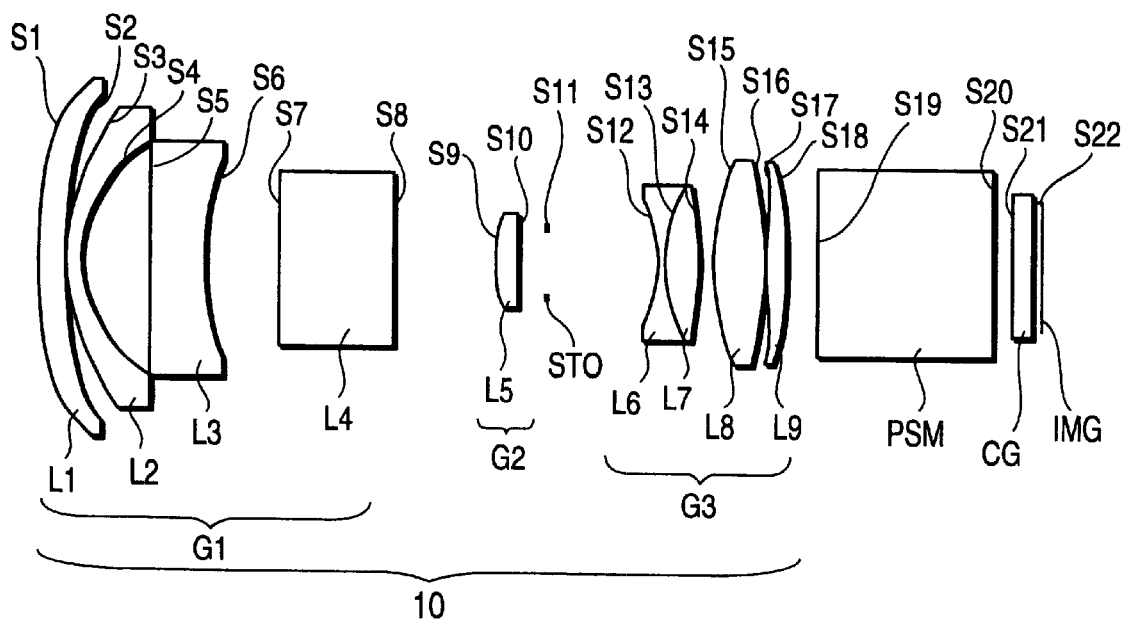
FIG. 2 is a schematic diagram showing a configuration of a retrofocus lens system of Embodiment 2 of the present invention.

FIG. 2 is a schematic diagram showing a configuration of a retrofocus lens system 10 of Embodiment 2 of the present invention. As shown in FIG. 2, the retrofocus lens system 10 of Embodiment 2 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 2).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a third lens $L_3$ having a negative refracting power, both surfaces of which are concave, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are indentified by the sample values indicated in Table 3 below.

TABLE 3

| S | R | T | N | vd | Type |
|---|---|---|---|---|---|
| OBJ | Infinity | 658 | | | |
| 1 | −1710.84 | 4 | 1.491000 | 57.562 | ASP |
| 2 | 411.2035 | 0.2498413 | | | ASP |
| 3 | 36.60318 | 2.1 | 1.834807 | 42.700 | |
| 4 | 19.94054 | 11.04508 | | | |
| 5 | −604.3048 | 7.417911 | 1.651597 | 58.500 | |
| 6 | 37.91543 | 11.40665 | | | |
| 7 | 327.2071 | 16.99859 | 1.834807 | 42.700 | |
| 8 | 6237.36 | 15.47037 | | | |
| 9 | 30.04677 | 3 | 1.846659 | 23.800 | |
| 10 | 109.3535 | 4.394806 | | | |
| 11 | Infinity | 16.47393 | | | STO |
| 12 | −22.77507 | 1.498516 | 1.846660 | 23.830 | |
| 13 | 23.12486 | 5.2 | 1.816000 | 46.570 | |
| 14 | −57.34652 | 2.15917 | | | |
| 15 | 37.80682 | 8 | 1.788000 | 47.490 | |
| 16 | −53.31699 | 0.2514563 | | | |
| 17 | 69.65503 | 2.5 | 1.491000 | 57.562 | ASP |
| 18 | −130.9394 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 4 below.

TABLE 4

| (ASPHERIC COEFFICIENT) | | | | |
|---|---|---|---|---|
| S | K | D | E | F |
| 1 | 99.7967 | 3.558120e−5 | −8.508987e−8 | 1.276517e−10 |
| 2 | −37.5129 | 3.799010e−5 | −1.277095e−7 | 2.387996e−10 |
| 17 | −63.68665 | 6.633412e−6 | −1.871450e−7 | −3.755790e−10 |
| 18 | 1.586652 | 8.736506e−6 | −8.916185e−8 | −6.724678e−10 |

| S | G | H | I |
|---|---|---|---|
| 1 | −6.963811e−14 | −1.025900e−17 | 2.658208e−20 |
| 2 | −1.694814e−13 | −1.924539e−18 | 3.564690e−20 |
| 17 | 2.803074e−12 | −8.248620e−15 | 1.305476e−17 |
| 18 | 3.504180e−12 | −7.944529e−15 | 8.905515e−18 |

The values of $f_2/f_3$, $|f_1|/f$, $|f_4|/f$, $f_5/f$, $|EXP|/f$, and $BFL/f$ of the retrofocus lens system 10 of Embodiment 2 are as indicated in Table 33, which is given later, and the conditional expressions (1) to (9) given above are satisfied.

Further, the retrofocus lens system 10 of Embodiment 2 has such a long back focal length that a prism (PSM in FIG. 2) and a cover glass (CG in FIG. 2) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 11B:
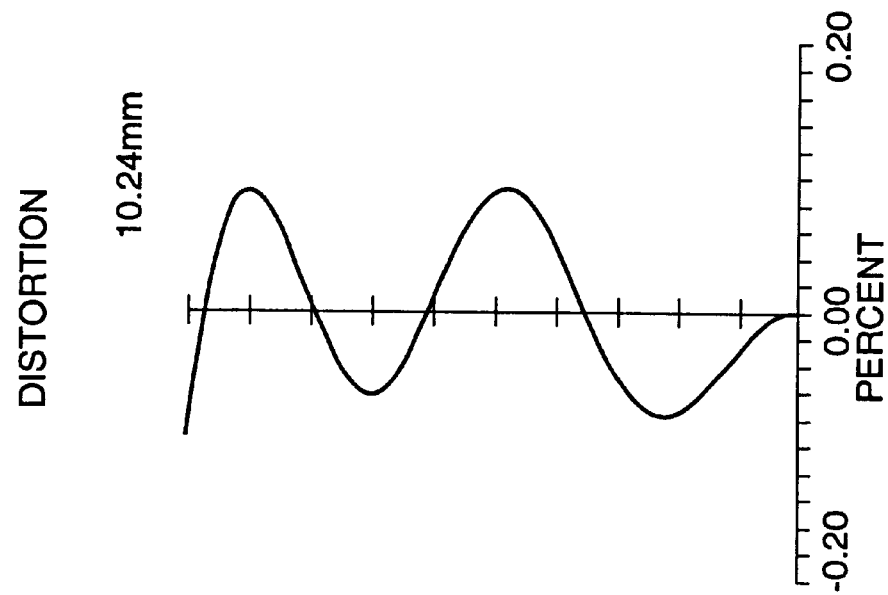
FIGS. 11A and 11B show characteristics of the retrofocus lens system of FIG. 2.
Figure 11A:
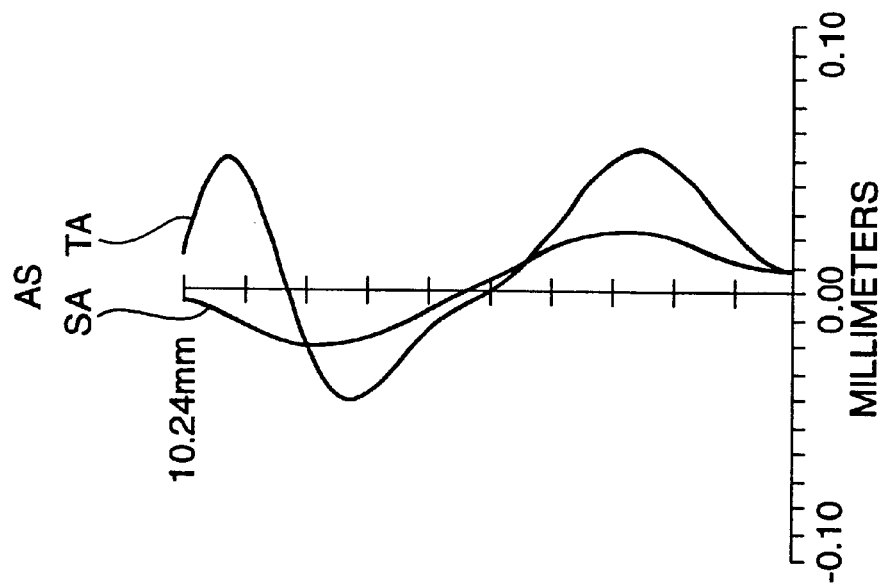

FIGS. 11A and 11B show the characteristics of the retrofocus lens system of Embodiment 2, FIG. 11A shows astigmatism (AS) on the small conjugate side, and FIG. 11B shows distortion. FIGS. 11A and 11B show the plotted astigmatism and distortion of light having a wavelength of 546.1 nm.

Figure 12A:
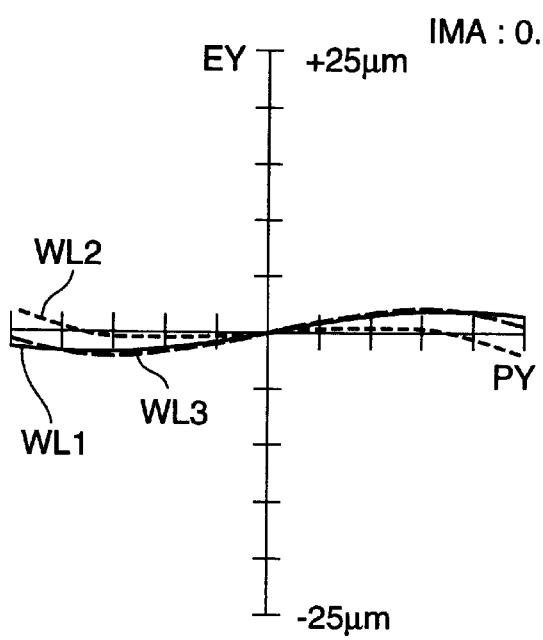
FIGS. 12A to 12D show characteristics of the retrofocus lens system of FIG. 2.
Figure 12B:
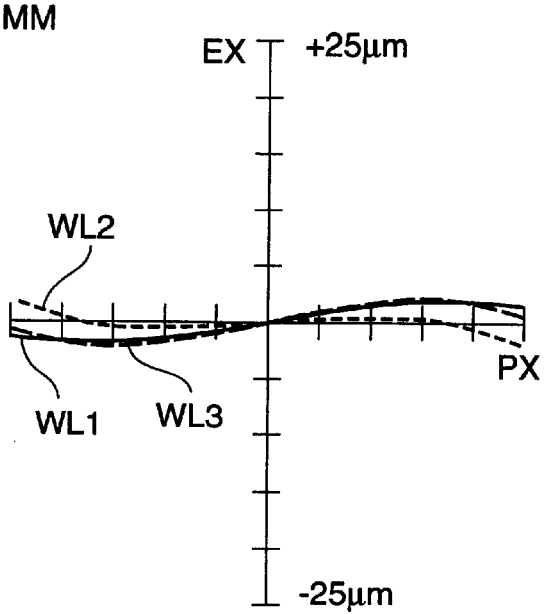
Figure 12C:
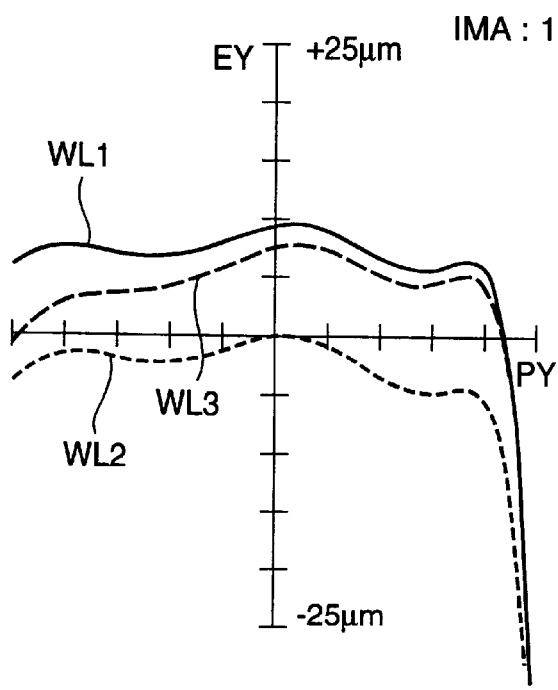
Figure 12D:
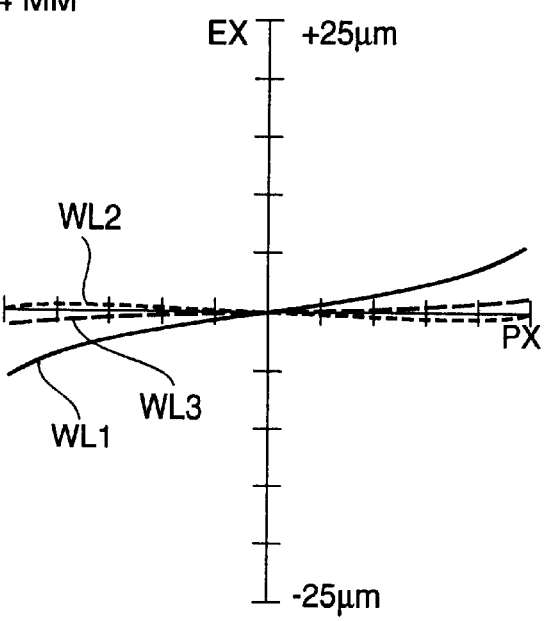

FIGS. 12A–12D show the characteristics of the retrofocus lens system of Embodiment 2. FIGS. 12A and 12B show the axial (that is, at an image height of 0.00 mm) lateral aberration. FIGS. 12C and 12D show the lateral aberration at an image height of 10.24 mm (an angle of view of 40.7° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 2 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 2 is the same as Embodiment 1.

Embodiment 3

Figure 3:
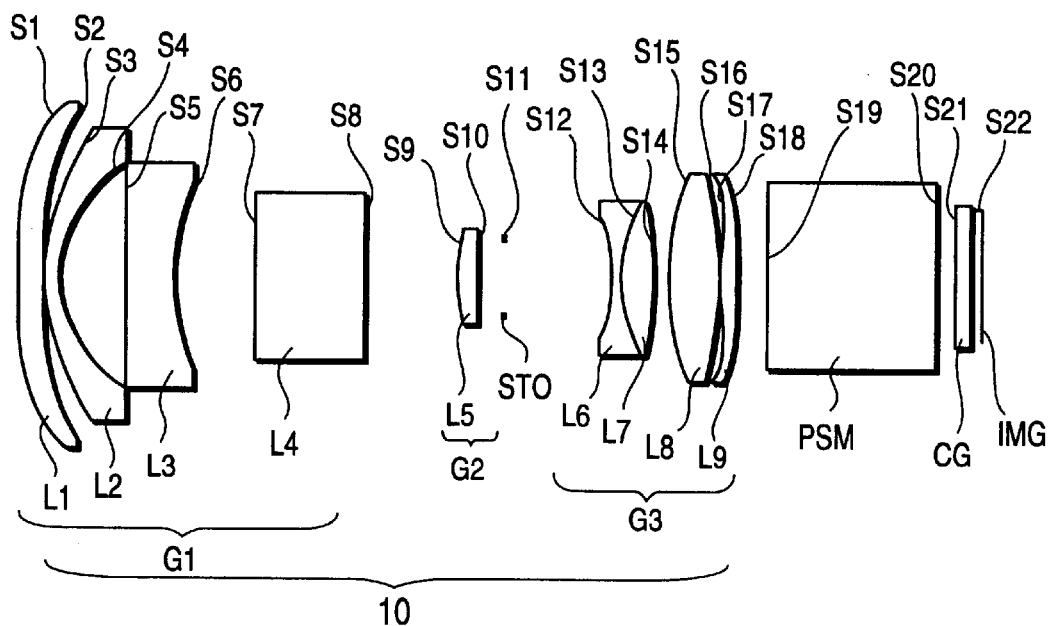
FIG. 3 is a schematic diagram showing a configuration of a retrofocus lens system of Embodiment 3 of the present invention.

FIG. 3 is a schematic diagram showing a configuration of a retrofocus lens system 10 of Embodiment 3 of the present invention. As shown in FIG. 3, the retrofocus lens system 10 of Embodiment 3 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 3).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a third lens $L_3$ having a negative refracting power, both surfaces of which are concave, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 5 below.

TABLE 5

| S | R | T | N | vd | Type |
|---|---|---|---|---|---|
| OBJ | Infinity | 858.55 | | | |
| 1 | −983.365 | 4 | 1.491000 | 57.562 | ASP |
| 2 | 653.741 | 0.2499424 | | | ASP |
| 3 | 36.94893 | 2.1 | 1.834807 | 42.700 | |
| 4 | 19.97813 | 11.22461 | | | |
| 5 | −475.8158 | 7.07271 | 1.651597 | 58.500 | |
| 6 | 38.10695 | 12.69479 | | | |
| 7 | 303.8669 | 17.00057 | 1.834807 | 42.700 | |
| 8 | 20125.23 | 15.03549 | | | |
| 9 | 29.67926 | 3 | 1.846659 | 23.800 | |
| 10 | 103.5221 | 4.459065 | | | |
| 11 | Infinity | 16.34328 | | | STO |
| 12 | −22.87292 | 1.499737 | 1.846660 | 23.830 | |
| 13 | 22.57837 | 5.2 | 1.816000 | 46.570 | |
| 14 | −60.01505 | 2.294606 | | | |
| 15 | 37.30937 | 8 | 1.788000 | 47.490 | |
| 16 | −54.73622 | 0.2497811 | | | |
| 17 | 68.30609 | 2.5 | 1.491000 | 57.562 | ASP |
| 18 | −124.9488 | 4.937 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 6 below.

TABLE 6

(ASPHERIC COEFFICIENT)

| S | K | D | E | F |
|---|---|---|---|---|
| 1 | −74.16547 | 3.579802e−5 | −8.620212e−8 | 1.261877e−10 |
| 2 | −34.29799 | 3.838772e−5 | −1.306040e−7 | 2.414667e−10 |
| 17 | −60.25486 | 5.558487e−6 | −1.878464e−7 | −3.556067e−10 |
| 18 | 1.516725 | 7.666106e−6 | −8.713579e−8 | −6.730022e−10 |

| S | G | H | I |
|---|---|---|---|
| 1 | −6.618258e−14 | −1.028724e−17 | 2.355187e−20 |
| 2 | −1.700690e−13 | −2.008478e−18 | 3.566405e−20 |
| 17 | 2.650949e−12 | −7.783328e−15 | 1.282689e−17 |
| 18 | 3.496107e−12 | −8.021339e−15 | 9.377634e−18 |

The values of $f_2/f_3$, $|f_1|/f$, $|f_4|/f$, $f_5/f$, $|EXP|/f$, and $BFL/f$ of the retrofocus lens system 10 of Embodiment 3 are as indicated in Table 33, which is given later, and the conditional expressions (1) to (9) given above are satisfied.

Further, the retrofocus lens system 10 of Embodiment 3 has such a long back focal length that a prism (PSM in FIG. 3) and a cover glass (CG in FIG. 3) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 13B:
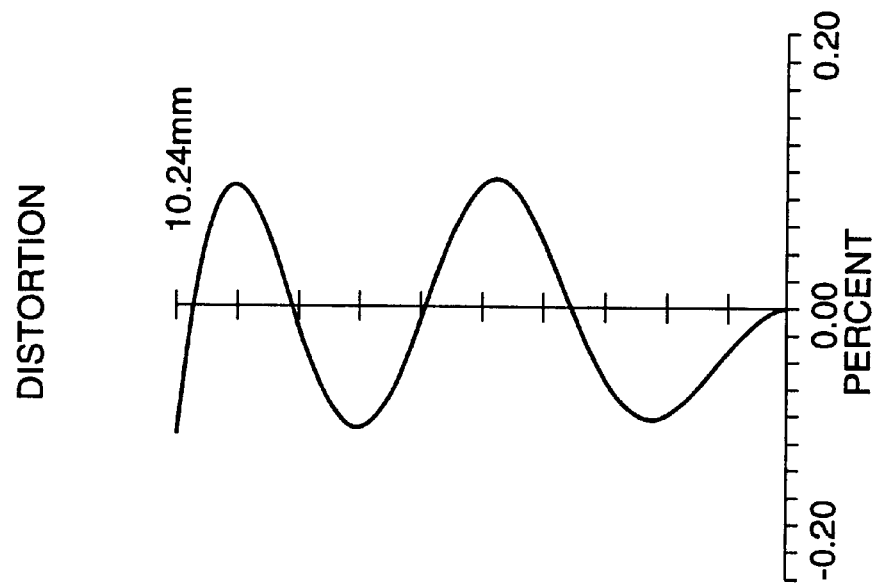
FIGS. 13A and 13B show characteristics of the retrofocus lens system of FIG. 3.
Figure 13A:
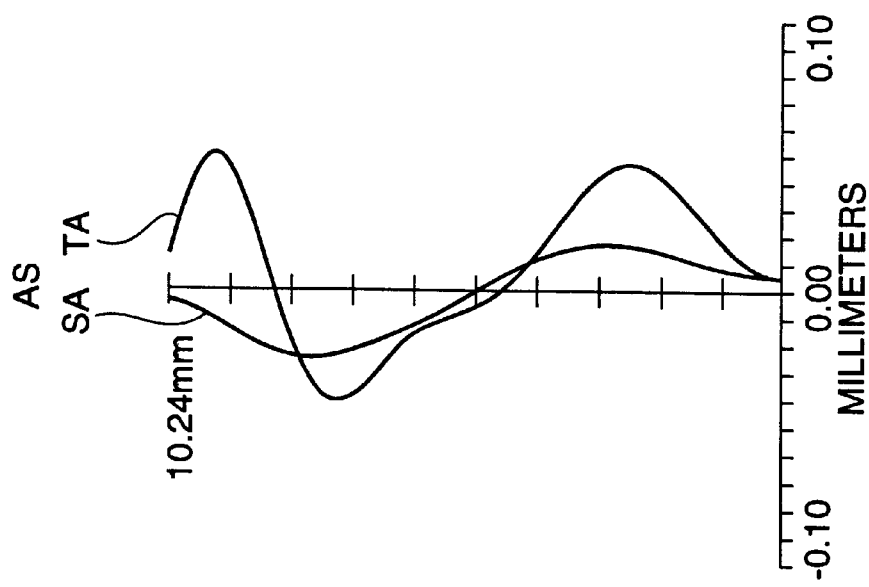

FIGS. 13A and 13B show the characteristics of the retrofocus lens system of Embodiment 3, FIG. 13A shows astigmatism (AS) on the small conjugate side, and FIG. 13B shows distortion. FIGS. 13A and 13B show the plotted astigmatism and distortion of light having a wavelength of 546.1 nm.

Figure 14A:
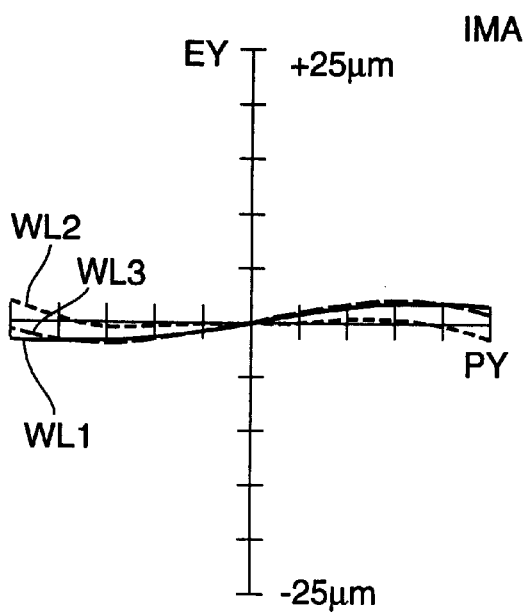
FIGS. 14A to 14D show characteristics of the retrofocus lens system of FIG. 3.
Figure 14B:
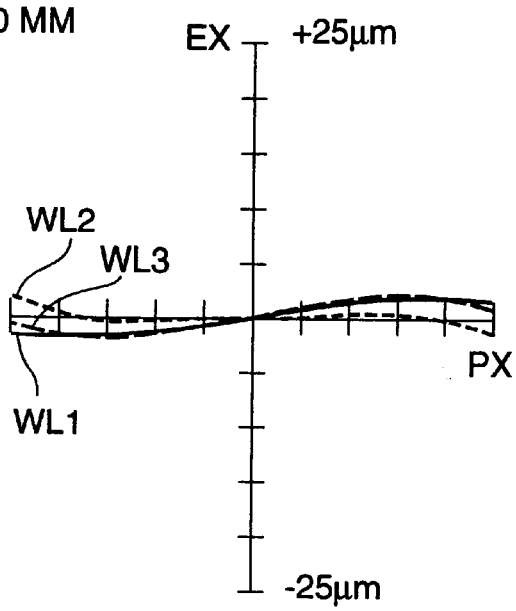
Figure 14C:
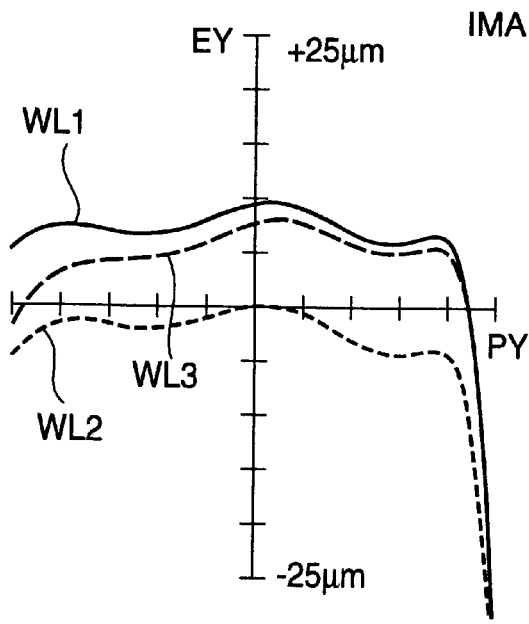
Figure 14D:
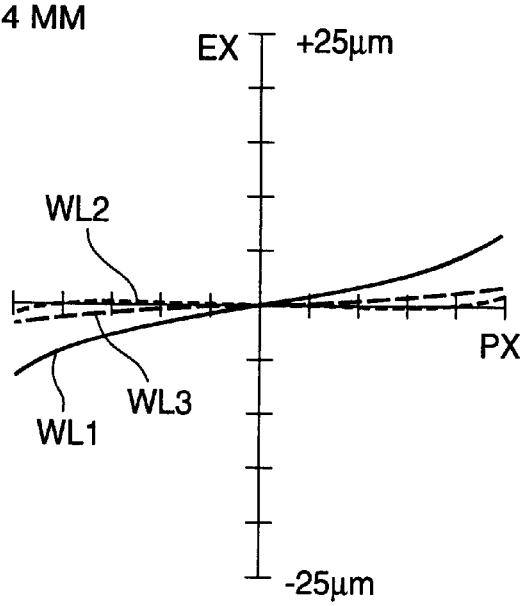

FIGS. 14A–14D show the characteristics of the retrofocus lens system of Embodiment 3. FIGS. 14A and 14B show the axial (that is, at an image height of 0.00 mm) lateral aberration. FIGS. 14C and 14D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 3 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 3 is the same as Embodiment 1.

Embodiment 4

Figure 4:
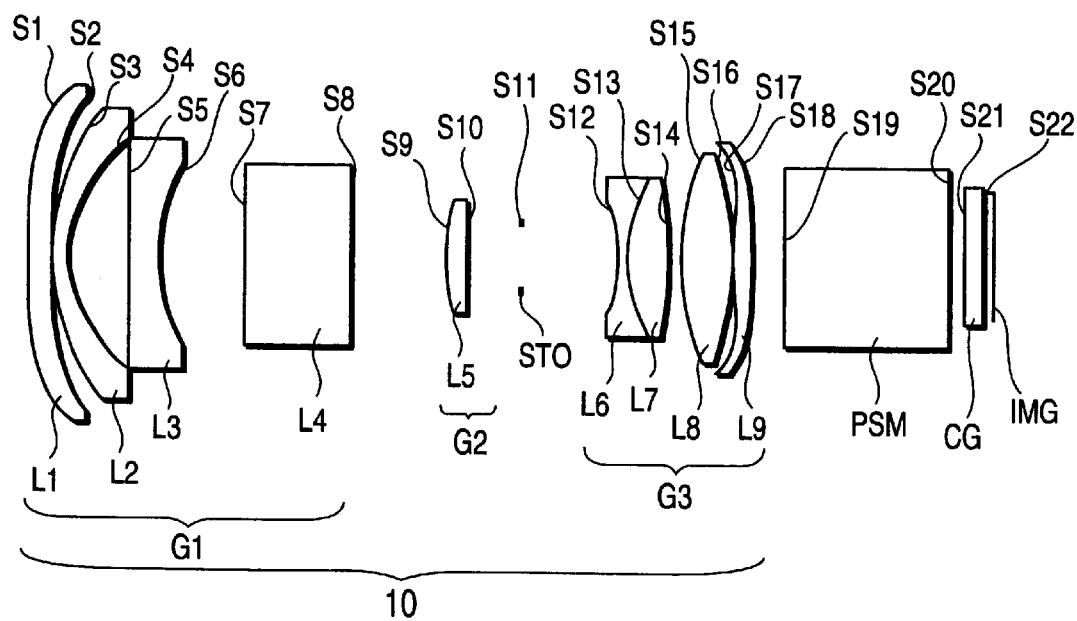
FIG. 4 is a schematic diagram showing a configuration of a retrofocus lens system of Embodiment 4 of the present invention.

FIG. 4 is a schematic diagram showing a configuration of a retrofocus lens system 10 of Embodiment 4 of the present invention. As shown in FIG. 4, the retrofocus lens system 10 of Embodiment 4 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 4).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 7 below.

TABLE 7

| S | R | T | N | vd | Type |
|---|---|---|---|---|---|
| OBJ | Infinity | 858.55 | | | |
| 1 | −857.1902 | 4 | 1.491000 | 57.562 | ASP |
| 2 | 839.5905 | 0.3465107 | | | ASP |

TABLE 7-continued

| S | R | T | N | vd | Type |
|---|---|---|---|---|---|
| 3 | 39.5185 | 2.1 | 1.804000 | 46.600 | |
| 4 | 21.66613 | 10.11072 | | | |
| 5 | 519.9764 | 4.308265 | 1.712995 | 53.900 | |
| 6 | 31.62875 | 13.59448 | | | |
| 7 | 226.9871 | 16.99916 | 1.816000 | 46.600 | |
| 8 | 657.5562 | 15.64538 | | | |
| 9 | 35.46391 | 3 | 1.805180 | 25.460 | |
| 10 | 428.4993 | 8.782068 | | | |
| 11 | Infinity | 14.91222 | | | STO |
| 12 | −22.46445 | 1.499389 | 1.846658 | 23.900 | |
| 13 | 22.46445 | 6.6 | 1.804000 | 46.600 | |
| 14 | −57.64896 | 2.022524 | | | |
| 15 | 41.30102 | 8 | 1.804200 | 46.500 | |
| 16 | −45.14387 | 0.3159966 | | | |
| 17 | 79.84504 | 2.7 | 1.491000 | 57.562 | ASP |
| 18 | −159.4793 | 5.05 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 8 below.

TABLE 8

(ASPHERIC COEFFICIENT)

| S | K | D | E | F |
|---|---|---|---|---|
| 1 | 61.47392 | 3.488096e−5 | −8.556207e−8 | 1.233159e−10 |
| 2 | −2.371598 | 3.810600e−5 | −1.308669e−7 | 2.389220e−10 |
| 17 | −86.91896 | 4.192842e−6 | −1.592260e−7 | −2.239349e−10 |
| 18 | −6.846372 | 5.081868e−6 | −6.216346e−8 | −5.053071e−10 |

| S | G | H | I |
|---|---|---|---|
| 1 | −6.151001e−14 | −1.239872e−17 | 2.221955e−20 |
| 2 | −1.636992e−13 | −1.300786e−18 | 3.143226e−20 |
| 17 | 2.687869e−12 | −9.251255e−15 | 1.213119e−17 |
| 18 | 3.187124e−12 | −8.531660e−15 | 8.608394e−18 |

The values of $f_2/f_3$, $|f_1|/f$, $|f_4|/f$, $f_5/$, $|EXP|/f$, and $BFL/f$ of the retrofocus lens system 10 of Embodiment 4 are as indicated in Table 33, which is given later, and the conditional expressions (1) to (9) given above are satisfied.

Further, the retrofocus lens system 10 of Embodiment 4 has such a long back focal length that a prism (PSM in FIG. 4) and a cover glass (CG in FIG. 4) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 15B:
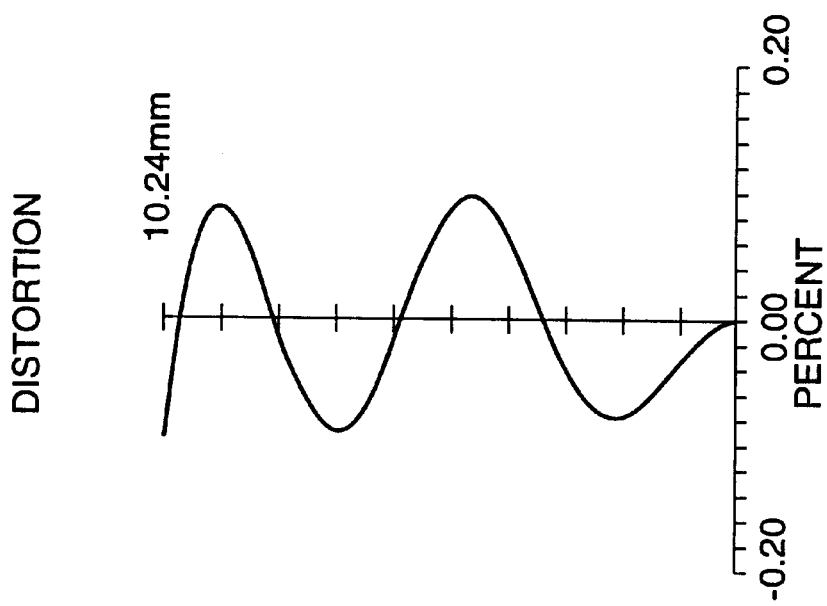
FIGS. 15A and 15B show characteristics of the retrofocus lens system of FIG. 4.
Figure 15A:
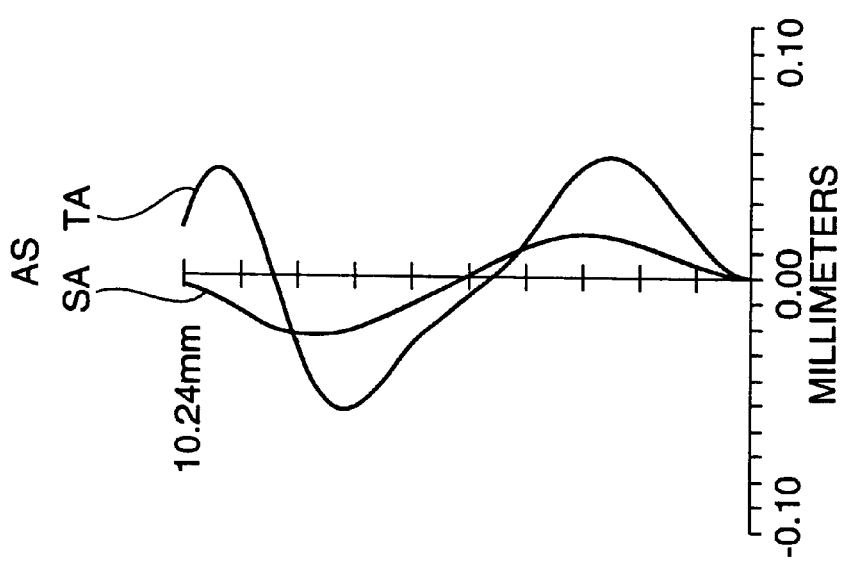

FIGS. 15A and 15B show the characteristics of the retrofocus lens system of Embodiment 4, FIG. 15A shows astigmatism (AS) on the small conjugate side, and FIG. 15B shows distortion. FIGS. 15A and 15B show the plotted astigmatism and distortion of light having a wavelength of 546.1 nm.

Figure 16A:
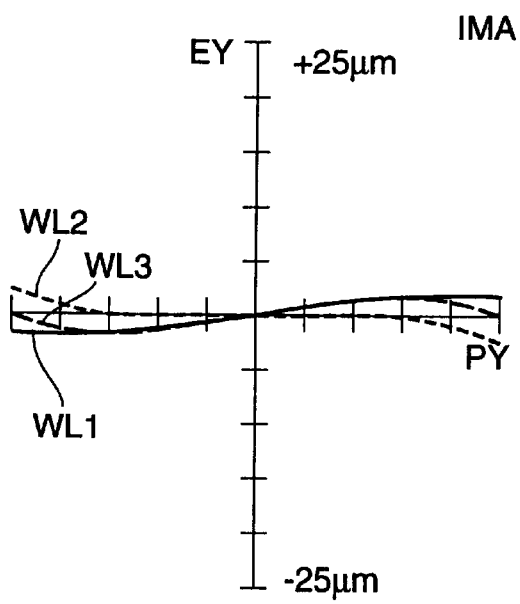
FIGS. 16A to 16D show characteristics of the retrofocus lens system of FIG. 4.
Figure 16B:
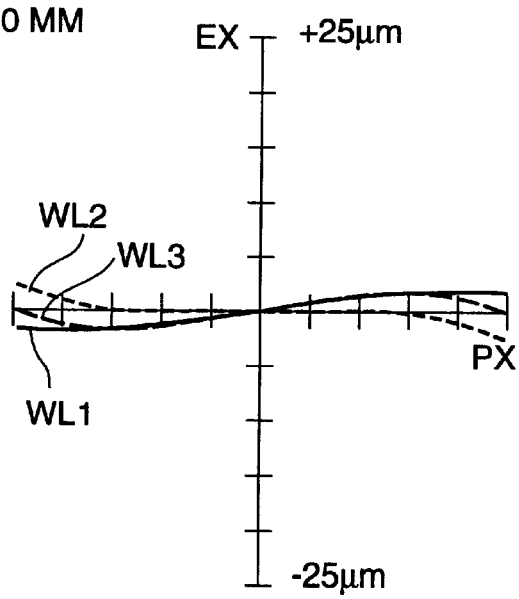
Figure 16C:
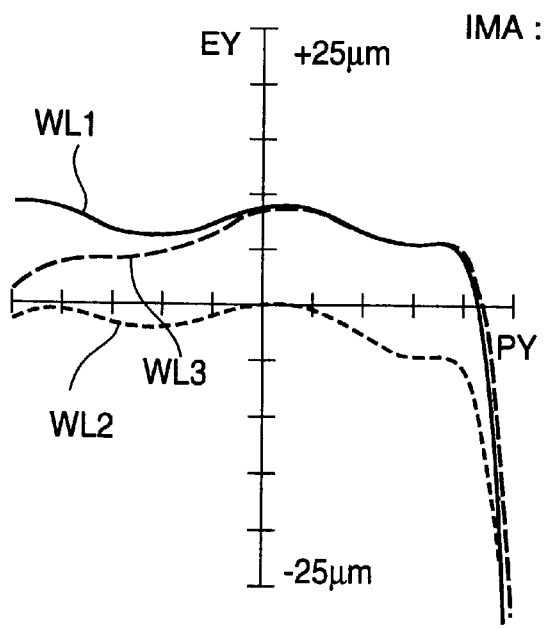
Figure 16D:
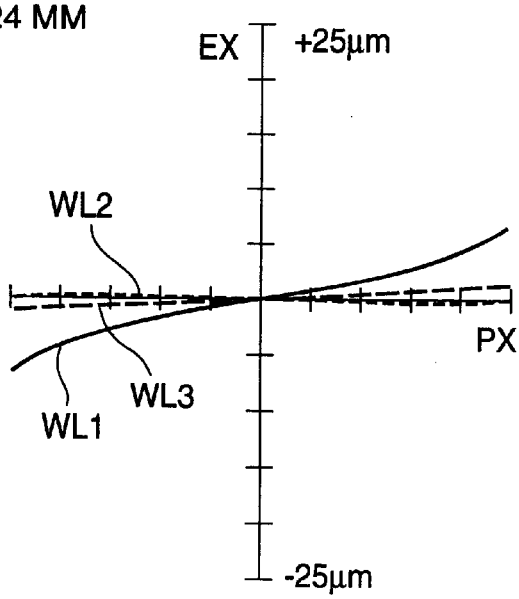

FIGS. 16A–16D show the characteristics of the retrofocus lens system of Embodiment 4. FIGS. 16A and 16B show the axial (that is, at an image height of 0.00 mm) lateral aberration. FIGS. 16C and 16D show the lateral aberration at an image height of 10.24 mm (an angle of view of 40.7° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 4 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 4 is the same as Embodiment 1.

Embodiment 5

Figure 5:
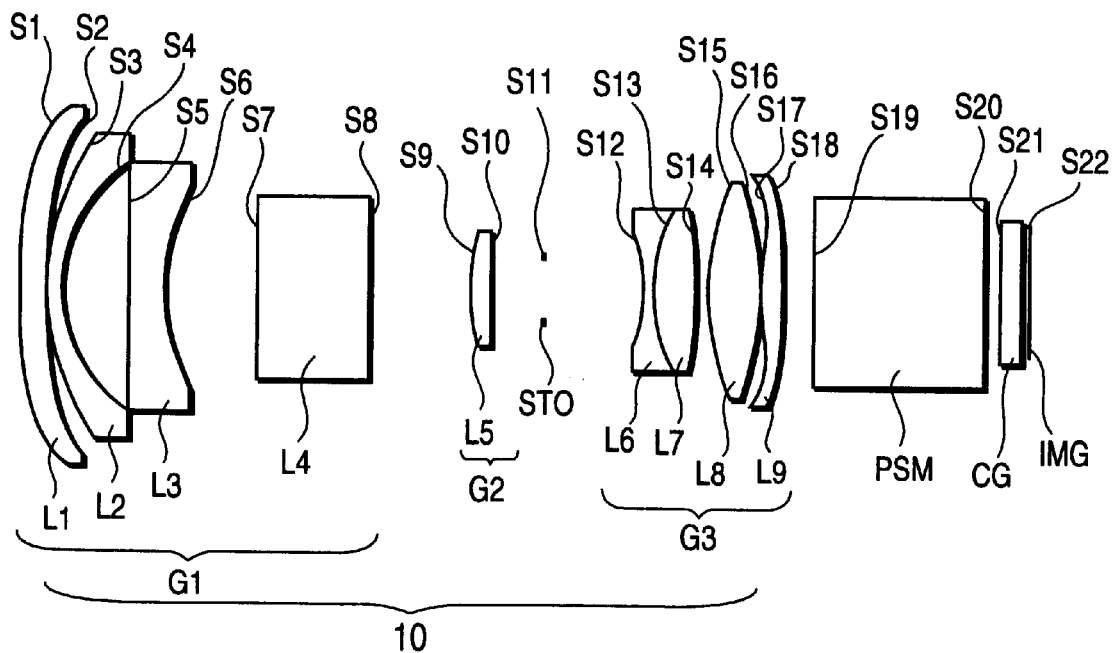
FIG. 5 is a schematic diagram showing a configuration of a retrofocus lens system of Embodiment 5 of the present invention.

FIG. 5 is a schematic diagram showing a configuration of a retrofocus lens system 10 of Embodiment 5 of the present invention. As shown in FIG. 5, the retrofocus lens system 10 of Embodiment 5 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 5).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 9 below.

TABLE 9

| S | R | T | N | vd | Type |
|---|---|---|---|---|---|
| OBJ | Infinity | 858.55 | | | |
| 1 | −601.8854 | 4 | 1.491000 | 57.562 | ASP |
| 2 | 520.4573 | 0.2703166 | | | ASP |
| 3 | 40.02822 | 2.1 | 1.804000 | 46.600 | |
| 4 | 22.41336 | 10.15046 | | | |
| 5 | 498.9752 | 5.784902 | 1.712995 | 53.900 | |

TABLE 9-continued

| S | R | T | N | vd | Type |
|---|---|---|---|----|------|
| 6 | 32.25873 | 14.10595 | | | |
| 7 | 264.9808 | 16.99993 | 1.816000 | 46.600 | |
| 8 | 698.9414 | 15.89897 | | | |
| 9 | 36.24176 | 3 | 1.805180 | 25.460 | |
| 10 | 543.6698 | 8.3939 | | | |
| 11 | Infinity | 15.38992 | | | STO |
| 12 | −22.58841 | 1.544061 | 1.846658 | 23.900 | |
| 13 | 22.58841 | 6.6 | 1.804000 | 46.600 | |
| 14 | −59.80308 | 1.892749 | | | |
| 15 | 41.59889 | 8 | 1.804200 | 46.500 | |
| 16 | −43.25921 | 0.4108565 | | | |
| 17 | 83.96508 | 3 | 1.491000 | 57.562 | ASP |
| 18 | −180.2816 | 5.05 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 10 below.

TABLE 10

(ASPHERIC COEFFICIENT)

| S | K | D | E | F |
|---|---|---|---|---|
| 1 | 37.07323 | 3.466149e−5 | −8.559092e−8 | 1.234039e−10 |
| 2 | −4.342745 | 3.812919e−5 | −1.315087e−7 | 2.409289e−10 |
| 17 | −98.6391 | 4.194747e−6 | −1.523829e−7 | −2.141446e−10 |
| 18 | −5.714724 | 6.472698e−6 | −5.681415e−8 | −5.013798e−10 |

| S | G | H | I |
|---|---|---|---|
| 1 | −6.162899e−14 | −1.299142e−17 | 2.139878e−20 |
| 2 | −1.647443e−13 | −1.138081e−18 | 3.171298e−20 |
| 17 | 2.682498e−12 | −9.288939e−15 | 1.209083e−17 |
| 18 | 3.270290e−12 | −8.951631e−15 | 9.159071e−18 |

The values of $f_2/f_3$, $|f_1|/f$, $|f_4|/f$, $f_5/$, $|EXP|/f$, and $BFL/f$ of the retrofocus lens system 10 of Embodiment 5 are as indicated in Table 33, which is given later, and the conditional expressions (1) to (9) given above are satisfied.

Further, the retrofocus lens system 10 of Embodiment 5 has such a long back focal length that a prism (PSM in FIG. 5) and a cover glass (CG in FIG. 5) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 17B:
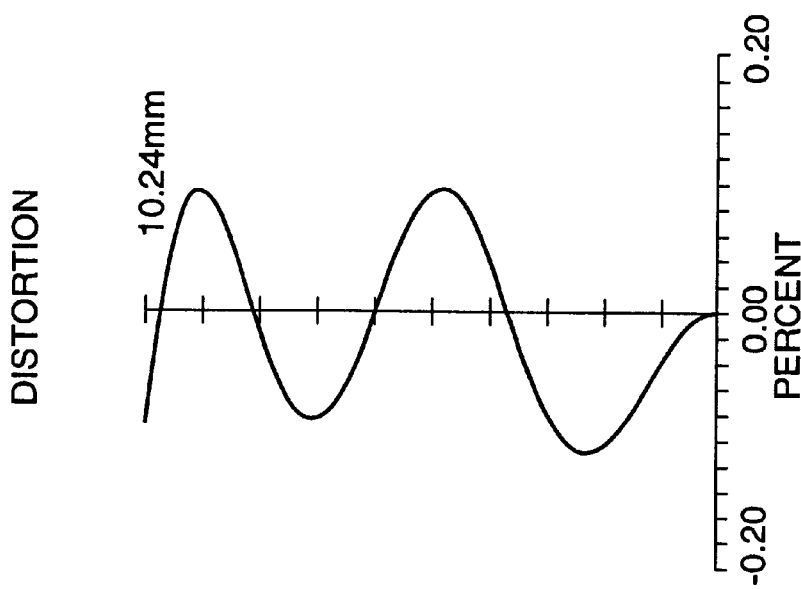
FIGS. 17A and 17B show characteristics of the retrofocus lens system of FIG. 5.
Figure 17A:
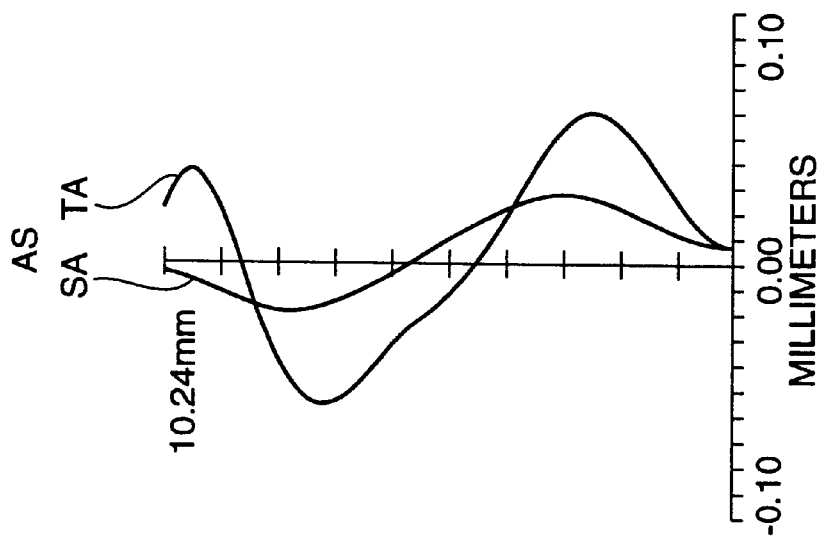

FIGS. 17A and 17B show the characteristics of the retrofocus lens system of Embodiment 5, FIG. 17A shows astigmatism (AS) on the small conjugate side, and FIG. 17B shows distortion. FIGS. 17A and 17B show the plotted astigmatism and distortion of light having a wavelength of 546.1 nm.

Figure 18A:
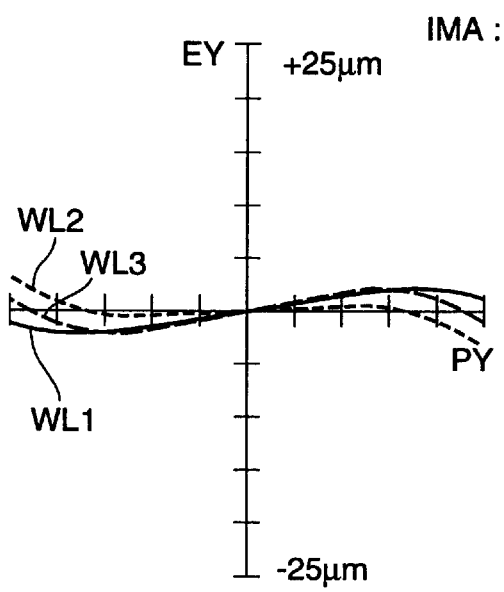
FIGS. 18A to 18D show characteristics of the retrofocus lens system of FIG. 5.
Figure 18B:
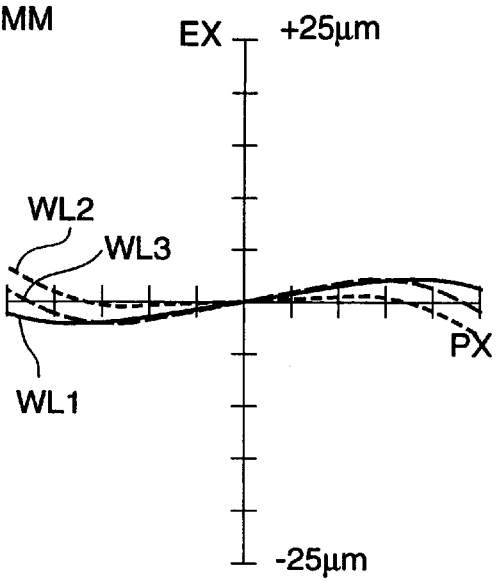
Figure 18C:
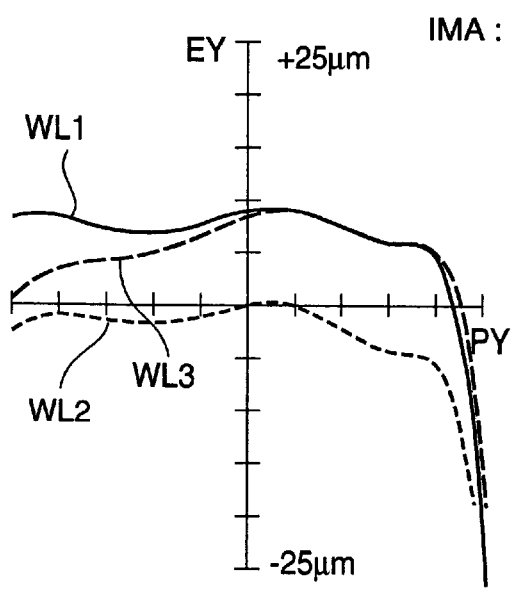
Figure 18D:
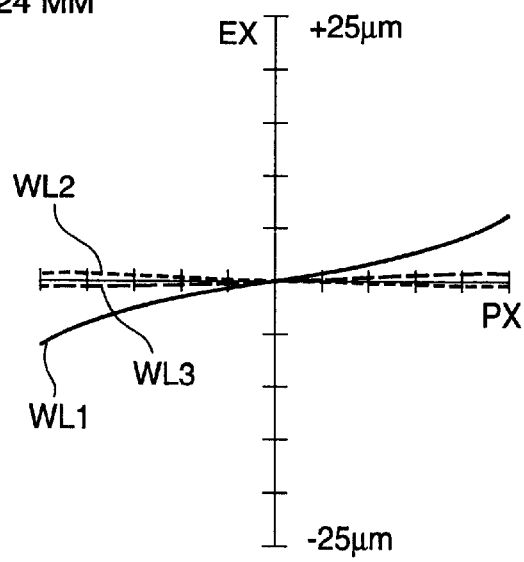

FIGS. 18A–18D show the characteristics of the retrofocus lens system of Embodiment 5. FIGS. 18A and 18B show the axial (that is, at an image height of 0.00 mm) lateral aberration. FIGS. 18C and 18D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 5 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 5 is the same as Embodiment 1.

Embodiment 6

Figure 6:
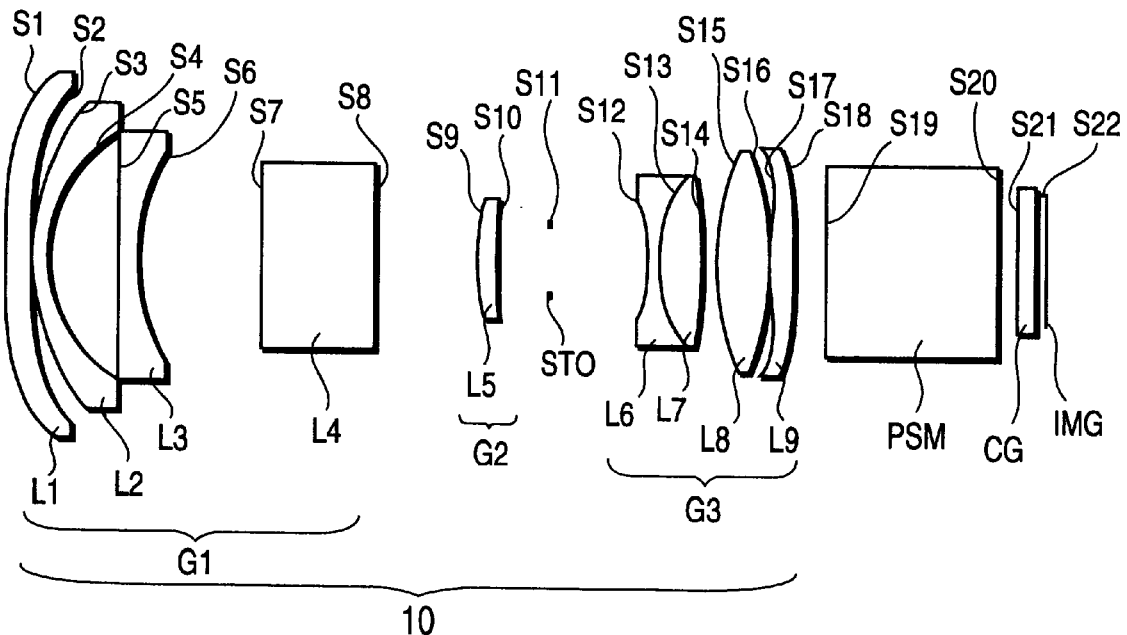
FIG. 6 is a schematic diagram showing a configuration of a retrofocus lens system of Embodiment 6 of the present invention.

FIG. 6 is a schematic diagram showing a configuration of a retrofocus lens system 10 of Embodiment 6 of the present invention. As shown in FIG. 6, the retrofocus lens system 10 of Embodiment 6 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 6).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 11 below.

TABLE 11

| S | R | T | N | vd | Type |
|---|---|---|---|----|------|
| OBJ | Infinity | 858.55 | | | |
| 1 | −509.144 | 4 | 1.491000 | 57.562 | ASP |
| 2 | 501.634 | 0.2498593 | | | ASP |
| 3 | 37.54287 | 2.1 | 1.804000 | 46.600 | |
| 4 | 21.76233 | 10.76568 | | | |
| 5 | 2231.883 | 3.135127 | 1.712995 | 53.900 | |

TABLE 11-continued

| S | R | T | N | vd | Type |
|---|---|---|---|---|---|
| 6 | 35.37868 | 18.25084 | | | |
| 7 | 313.367 | 17.00064 | 1.816000 | 46.600 | |
| 8 | 1909.378 | 15.55713 | | | |
| 9 | 33.12202 | 3 | 1.805180 | 25.460 | |
| 10 | 201.5731 | 8.016883 | | | |
| 11 | Infinity | 15.17681 | | | STO |
| 12 | −22.02969 | 1.499535 | 1.846658 | 23.900 | |
| 13 | 22.02969 | 6.6 | 1.804000 | 46.600 | |
| 14 | −62.34574 | 2.161838 | | | |
| 15 | 41.2278 | 8 | 1.804200 | 46.500 | |
| 16 | −45.19019 | 0.2527504 | | | |
| 17 | 83.1779 | 3.280524 | 1.491000 | 57.562 | ASP |
| 18 | −136.2782 | 5.05 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 12 below.

TABLE 12

(ASPHERIC COEFFICIENT)

| S | K | D | E | F |
|---|---|---|---|---|
| 1 | 35.99297 | 3.550727e−5 | −8.608519e−8 | 1.234223e−10 |
| 2 | −16.67316 | 3.890915e−5 | −1.305022e−7 | 2.352367e−10 |
| 17 | −96.396 | 2.032791e−6 | −1.338339e−7 | −1.477365e−10 |
| 18 | −4.653719 | 3.755977e−6 | −3.333157e−8 | −4.677662e−10 |

| S | G | H | I |
|---|---|---|---|
| 1 | −6.299764e−14 | −1.204586e−17 | 2.133438e−20 |
| 2 | −1.601313e−13 | −2.449284e−18 | 3.279995e−20 |
| 17 | 2.661889e−12 | −9.91988e−15 | 1.195667e−17 |
| 18 | 3.349598e−12 | −9.915828e−15 | 9.690964e−18 |

The values of $f_2/f_3$, $|f_1|/f$, $|f_4|/f$, $f_5/f$, $|EXP|/f$, and $BFL/f$ of the retrofocus lens system 10 of Embodiment 6 are as indicated in Table 33, which is given later, and the conditional expressions (10) to (9) given above are satisfied.

Further, the retrofocus lens system 10 of Embodiment 6 has such a long back focal length that a prism (PSM in FIG. 6) and a cover glass (CG in FIG. 6) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 19B:
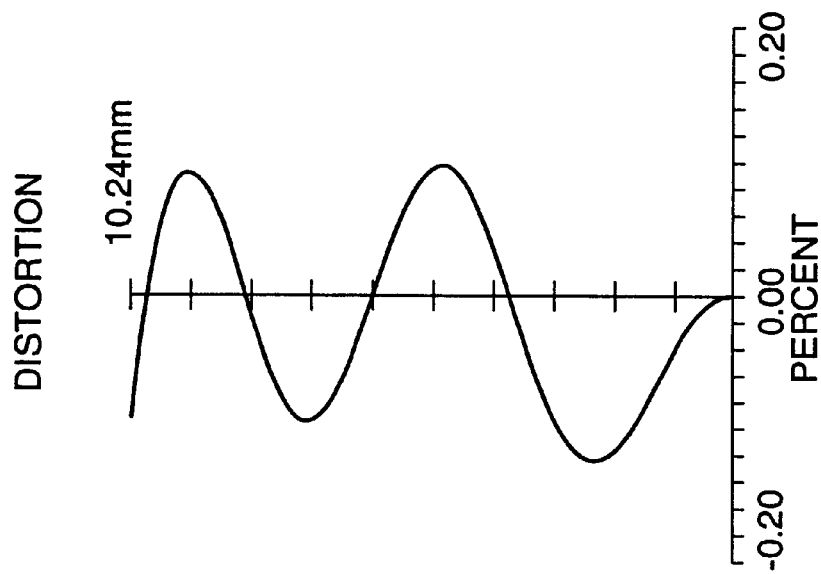
FIGS. 19A and 19B show characteristics of the retrofocus lens system of FIG. 6.
Figure 19A:
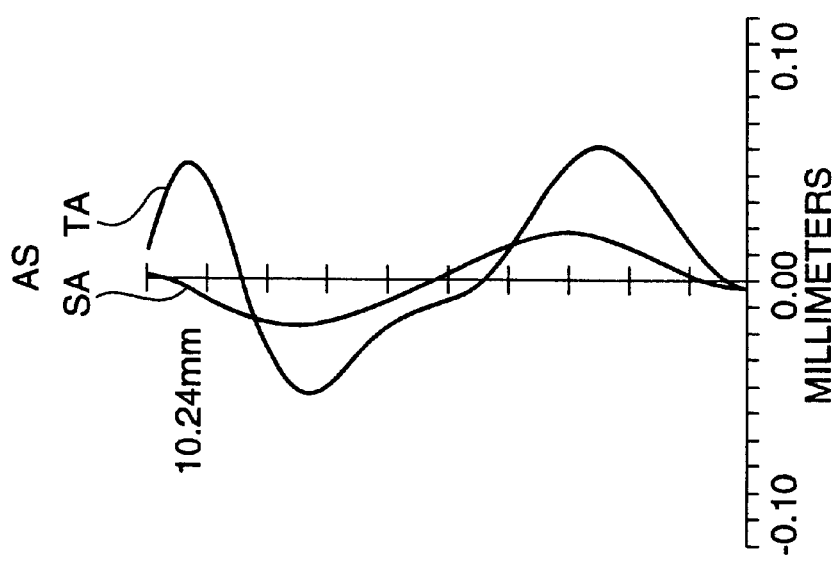

FIGS. 19A and 19B show the characteristics of the retrofocus lens system of Embodiment 6, FIG. 19A shows astigmatism (AS) on the small conjugate side, and FIG. 19B shows distortion. FIGS. 19B show the plotted astigmatism and distortion of light having a wavelength of 546.1 nm.

Figure 20A:
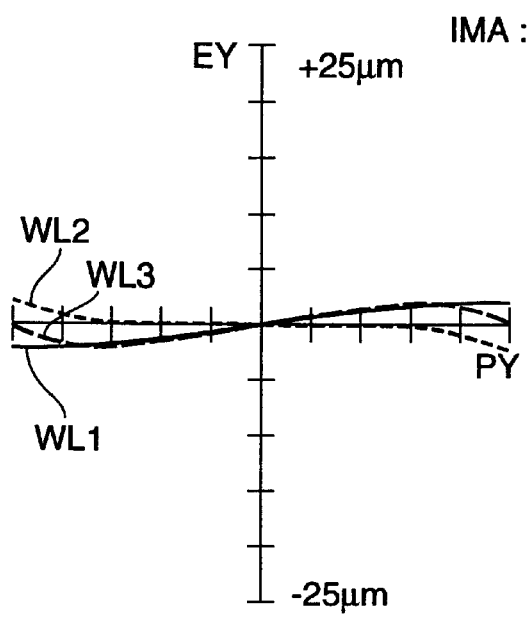
FIGS. 20A to 20D show characteristics of the retrofocus lens system of FIG. 6.
Figure 20B:
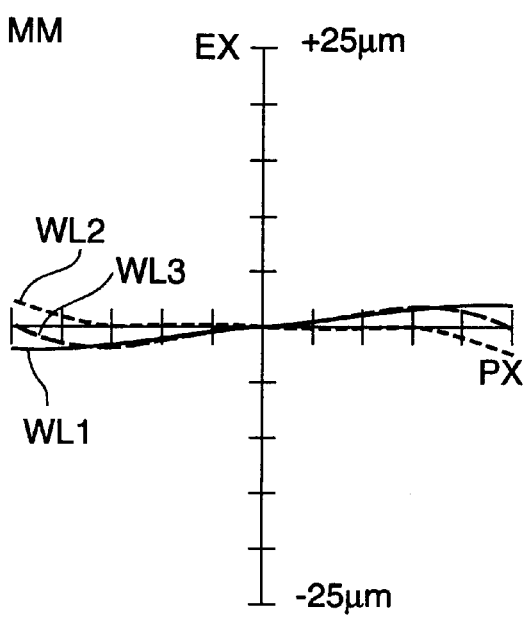
Figure 20C:
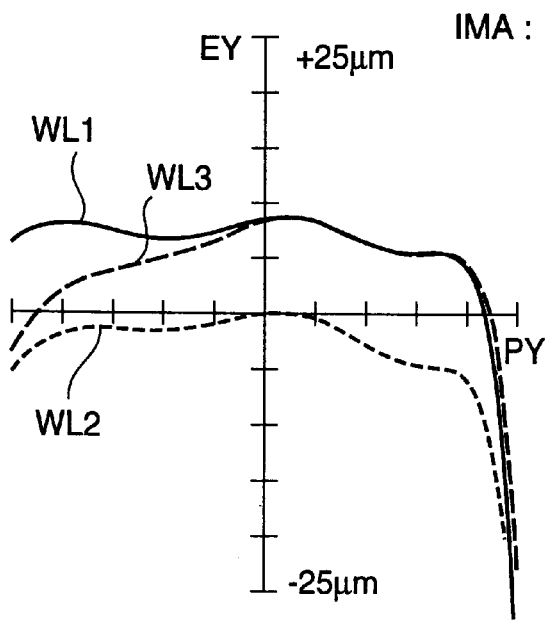
Figure 20D:
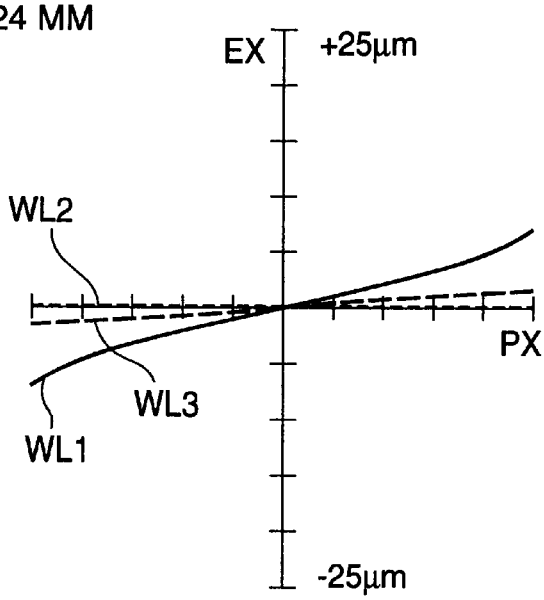

FIGS. 20A–20D show the characteristics of the retrofocus lens system of Embodiment 6. FIGS. 20A and 20B show the axial (that is, at an image height of 0.00 mm) lateral aberration. FIGS. 20C and 20D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 6 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 6 is the same as Embodiment 1.

Embodiment 7

Figure 7:
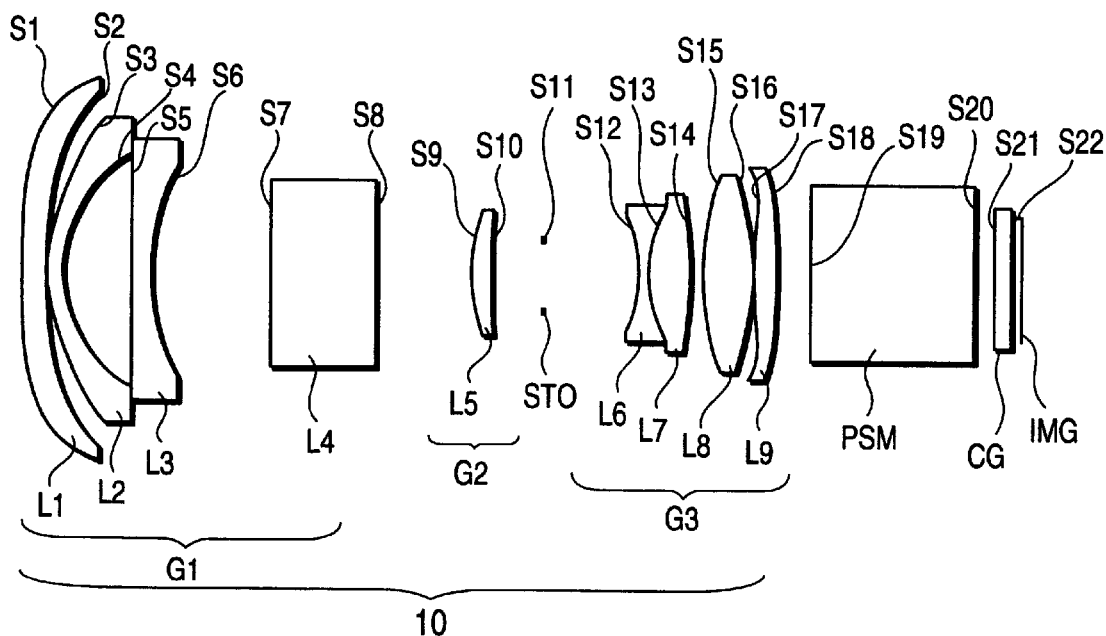
FIG. 7 is a schematic diagram showing a configuration of a retrofocus lens system of Embodiment 7 of the present invention.

FIG. 7 is a schematic diagram showing a configuration of a retrofocus lens system 10 of Embodiment 7 of the present invention. As shown in FIG. 7, the retrofocus lens system 10 of Embodiment 7 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 7).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 13 below.

TABLE 13

| S | R | T | N | vd | Type |
|---|---|---|---|---|---|
| OBJ | Infinity | 858.55 | | | |
| 1 | −523.6556 | 4 | 1.491000 | 57.562 | ASP |
| 2 | 514.0728 | 0.25 | | | ASP |
| 3 | 37.515 | 2.1 | 1.804000 | 46.600 | |
| 4 | 21.736 | 10.77 | | | |
| 5 | 2217.9 | 3.14 | 1.712995 | 53.900 | |
| 6 | 35.336 | 18.25 | | | |
| 7 | 313.31 | 17 | 1.816000 | 46.600 | |

TABLE 13-continued

| S | R | T | N | vd | Type |
|---|---|---|---|---|---|
| 8 | 1904.3 | 15.56 | | | |
| 9 | 33.114 | 3 | 1.805180 | 25.460 | |
| 10 | 201.15 | 8.02 | | | |
| 11 | Infinity | 15.18 | | | STO |
| 12 | −22.032 | 1.5 | 1.846658 | 23.900 | |
| 13 | 22.032 | 6.6 | 1.804000 | 46.600 | |
| 14 | −62.301 | 2.16 | | | |
| 15 | 41.22 | 8 | 1.804200 | 46.500 | |
| 16 | −45.149 | 0.25 | | | |
| 17 | 83.18422 | 3.34 | 1.491000 | 57.562 | ASP |
| 18 | −137.8496 | 5.03 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 14 below.

TABLE 14

(ASPHERIC COEFFICIENT)

| S | K | D | E | F |
|---|---|---|---|---|
| 1 | 32.79982 | 3.502097e−5 | −8.659474e−8 | 1.254221e−10 |
| 2 | −3.143952 | 3.812891e−5 | −1.303601e−7 | 2.349004e−10 |
| 17 | −96.65446 | 1.881046e−6 | −1.372124e−7 | −1.411683e−10 |
| 18 | −2.165457 | 3.451288e−6 | −3.241644e−8 | −4.953759e−10 |

| S | G | H | I |
|---|---|---|---|
| 1 | −6.621484e−14 | −1.058320e−17 | 2.183465e−20 |
| 2 | −1.595244e−13 | −2.334303e−18 | 3.338646e−20 |
| 17 | 2.626272e−12 | −9.930887e−15 | 1.444762e−17 |
| 18 | 3.387749e−12 | −9.614840e−15 | 1.106609e−17 |

The values of $f_2/f_3$, $|f_1|/f$, $|f_4|/f$, $f_5/f$, $|EXP|/f$, and $BFL/f$ of the retrofocus lens system 10 of Embodiment 7 are as indicated in Table 33, which is given later, and the conditional expressions (1) to (9) given above are satisfied.

Further, the retrofocus lens system 10 of Embodiment 7 has such a long back focal length that a prism (PSM in FIG. 7) and a cover glass (CG in FIG. 7) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 21B:
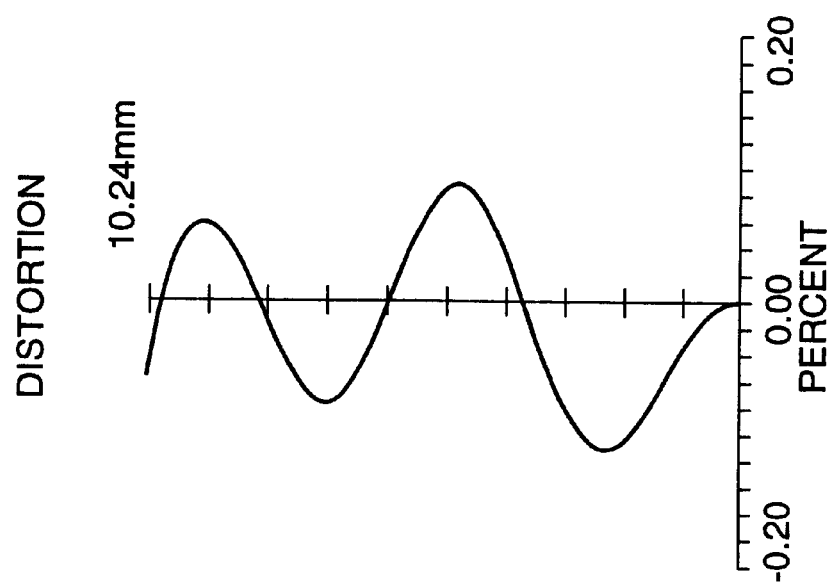
FIGS. 21A and 21B show characteristics of the retrofocus lens system of FIG. 7.
Figure 21A:
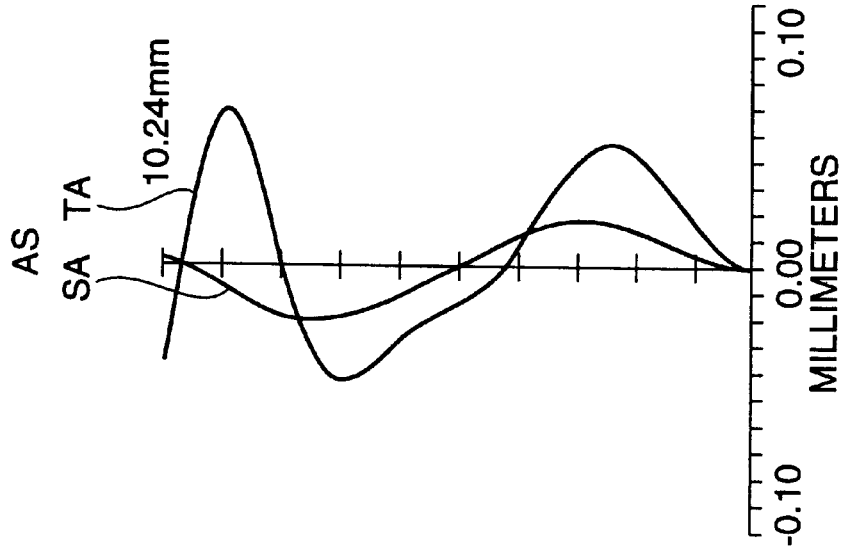

FIGS. 21A and 21B show the characteristics of the retrofocus lens system of Embodiment 7, FIG. 21A shows astigmatism (AS) on all conjugate side, and FIG. 21B shows distortion. FIGS. 21A and 21B show the plotted astigmatism and distortion of light having a wavelength of 546.1 nm.

Figure 22A:
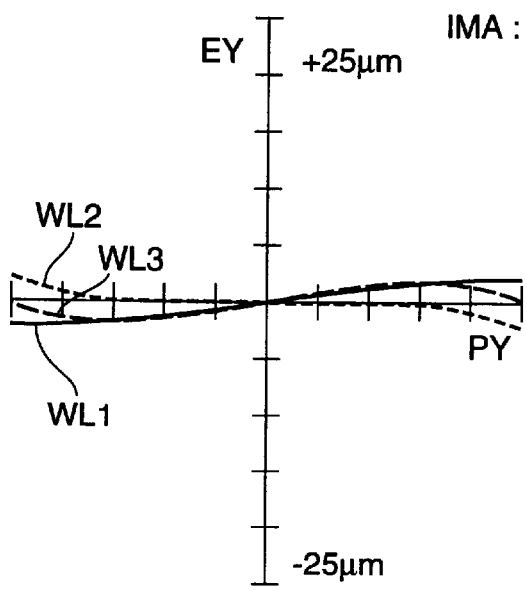
FIGS. 22A to 22D show characteristics of the retrofocus lens system of FIG. 7.
Figure 22B:
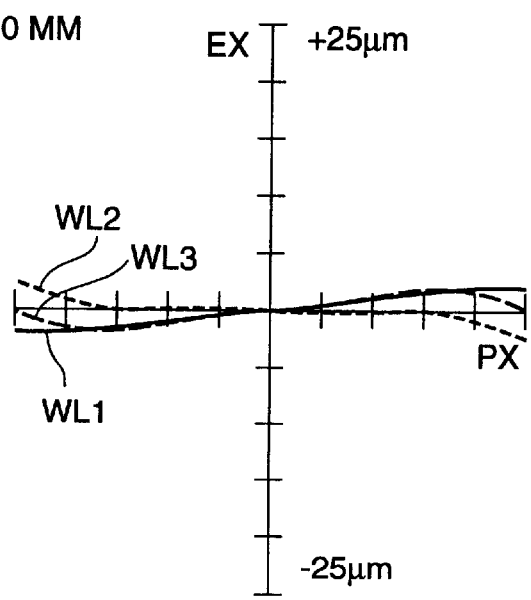
Figure 22C:
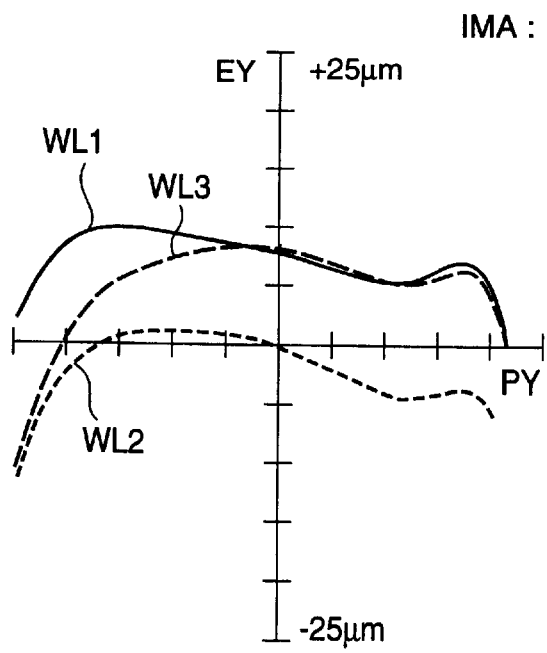
Figure 22D:
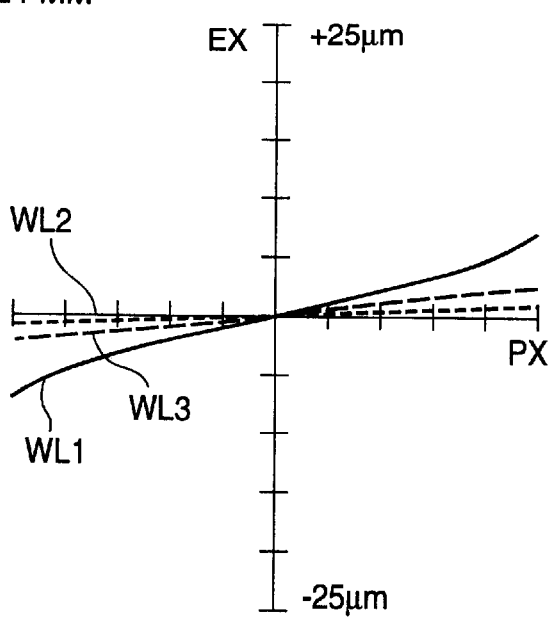

FIGS. 22A–22D show the characteristics of the retrofocus lens system of Embodiment 7. FIGS. 22A and 22B show the axial (that is, at an image height of 0.00 mm) lateral aberration. FIGS. 22C and 22D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 7 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 7 is the same as Embodiment 1.

Embodiment 8

Figure 8:
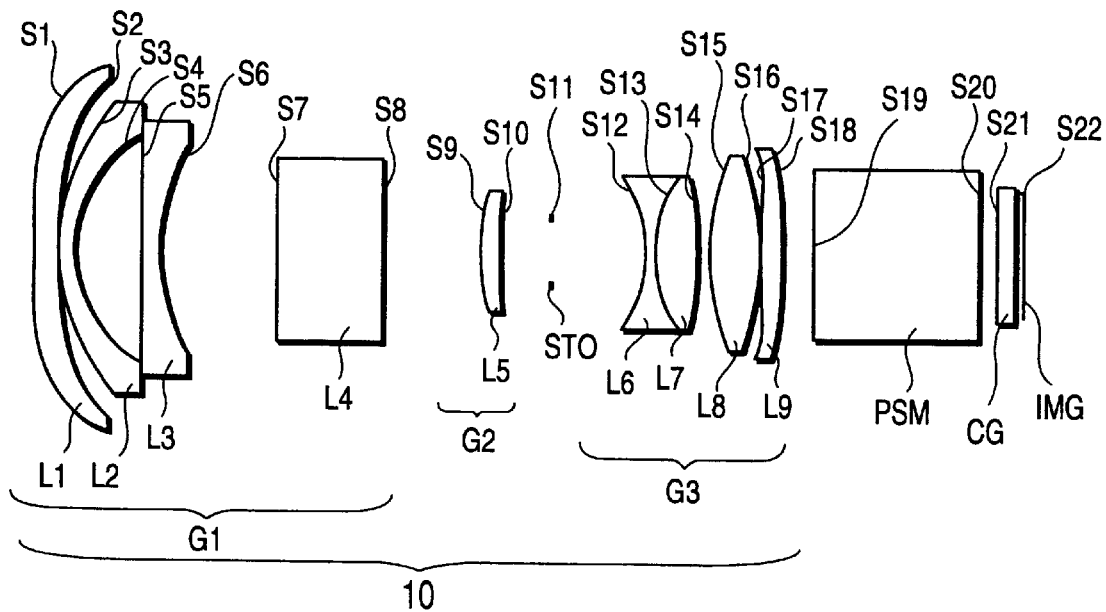
FIG. 8 is a schematic diagram showing a configuration of a retrofocus lens system of Embodiment 8 of the present invention.

FIG. 8 is a schematic diagram showing a configuration of a retrofocus lens system 10 of Embodiment 8 of the present invention. As shown in FIG. 8, the retrofocus lens system 10 of Embodiment 8 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 8).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a weak positive refracting power and a convex surface facing the large conjugate side.

The second lens group $G_2$ includes a meniscus-shaped fifth lens $L_5$ having a convex surface facing the large conjugate side and a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 15 below.

TABLE 15

| S | R | T | N | vd | Type |
|---|---|---|---|---|---|
| OBJ | Infinity | 858.55 | | | |
| 1 | −674.0964 | 4 | 1.491130 | 56.979 | ASP |
| 2 | 402.8421 | 0.25 | | | ASP |
| 3 | 37.515 | 2.1 | 1.804000 | 46.600 | |
| 4 | 21.736 | 10.77 | | | |
| 5 | 2217.9 | 3.14 | 1.712995 | 53.900 | |
| 6 | 35.336 | 18.25 | | | |
| 7 | 313.31 | 17 | 1.816000 | 46.600 | |

TABLE 15-continued

| S | R | T | N | vd | Type |
|---|---|---|---|---|---|
| 8 | 1904.3 | 15.56 | | | |
| 9 | 33.114 | 3 | 1.805180 | 25.460 | |
| 10 | 201.15 | 8.02 | | | |
| 11 | Infinity | 15.18 | | | STO |
| 12 | −22.032 | 1.5 | 1.846658 | 23.900 | |
| 13 | 22.032 | 6.6 | 1.804000 | 46.600 | |
| 14 | −62.301 | 2.16 | | | |
| 15 | 41.22 | 8 | 1.804200 | 46.500 | |
| 16 | −45.149 | 0.25 | | | |
| 17 | 82.62639 | 3.336405 | 1.491130 | 56.979 | ASP |
| 18 | −139.4015 | 5.03 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA such as ACRYPETVH#001 (trade name) manufactured by Mitsubishi Rayon Co., Ltd., and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 16 below.

TABLE 16

(ASPHERIC COEFFICIENT)

| S | K | D | E | F |
|---|---|---|---|---|
| 1 | 36.78808 | 3.465484e−5 | −8.599250e−8 | 1.243466e−10 |
| 2 | −14.46703 | 3.777526e−5 | −1.302444e−7 | 2.354844e−10 |
| 17 | −94.0057 | 1.792592e−6 | −1.355208e−7 | −1.394953e−10 |
| 18 | −2.357306 | 3.537117e−6 | −3.292247e−8 | −4.805973e−10 |

| S | G | H | I |
|---|---|---|---|
| 1 | −6.474087e−14 | −1.184398e−17 | 2.229138e−20 |
| 2 | −1.60596e−13 | −2.031669e−18 | 3.358394e−20 |
| 17 | 2.656068e−12 | −1.030218e−14 | 1.494789e−17 |
| 18 | 3.393695e−12 | −1.007321e−14 | 1.186190e−17 |

The values of $f_2/f_3$, $|f_1|/f$, $|f_4|/f$, $f_5/f$, $|EXP|/f$, and BFL/f of the retrofocus lens system 10 of Embodiment 8 are as indicated in Table 33, which is given later, and the conditional expressions (1) to (9) given above are satisfied.

Further, the retrofocus lens system 10 of Embodiment 8 has such a long back focal length that a prism (PSM in FIG. 8) and a cover glass (CG in FIG. 8) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 23B:
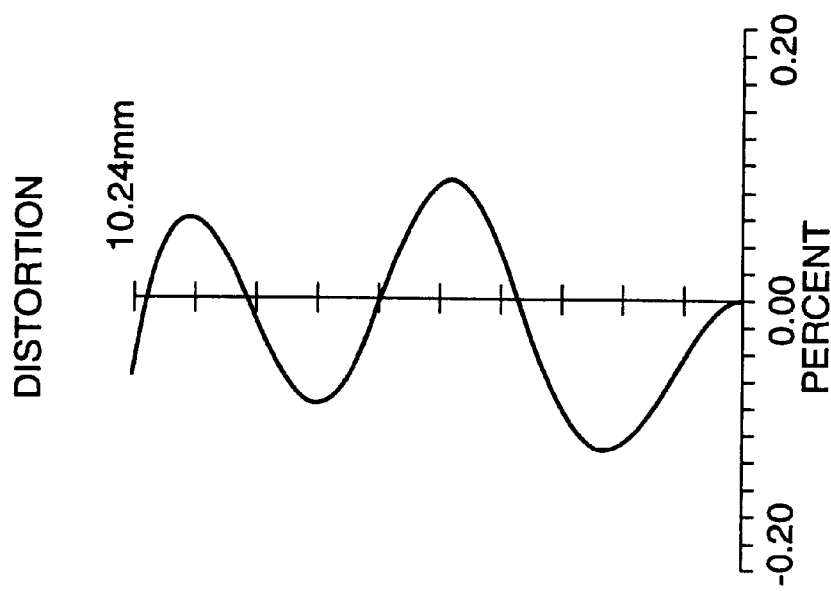
FIGS. 23A and 23B show characteristics of the retrofocus lens system of FIG. 8.
Figure 23A:
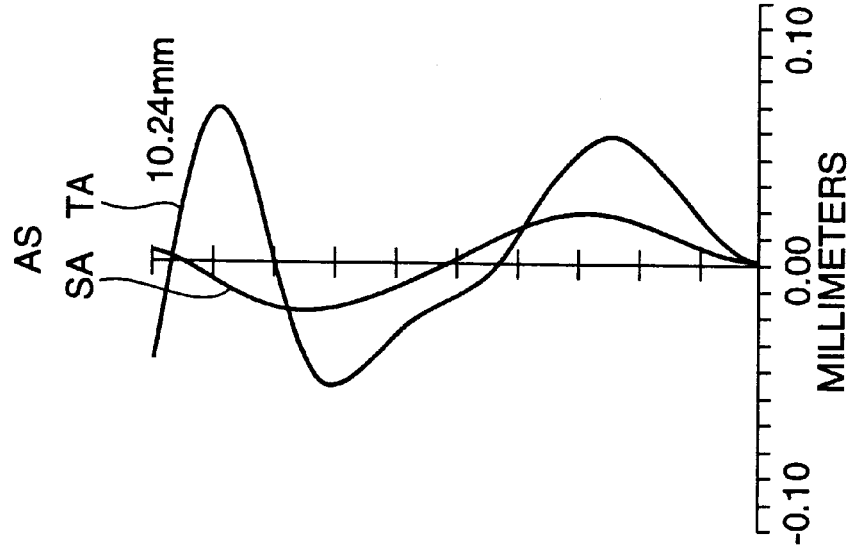

FIGS. 23A and 23B show the characteristics of the retrofocus lens system of Embodiment 8, FIG. 23A shows astigmatism (AS) on the small conjugate side, and FIG. 23B shows distortion. FIGS. 23A and 23B show the plotted astigmatism and distortion of light having a wavelength of 546.1 nm.

Figure 24A:
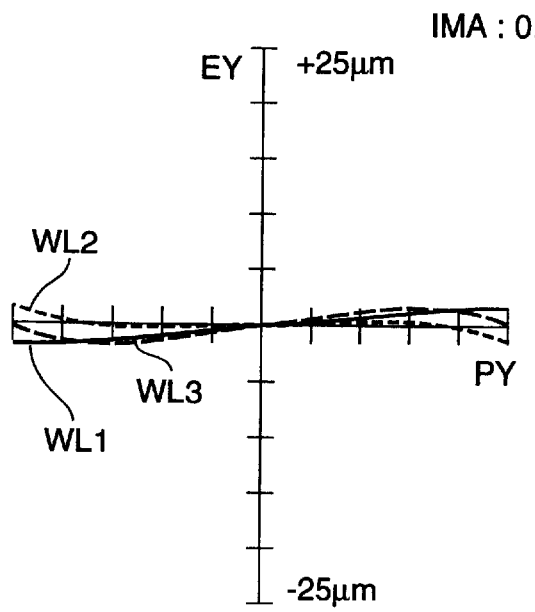
FIGS. 24A to 24D show characteristics of the retrofocus lens system of FIG. 8.
Figure 24B:
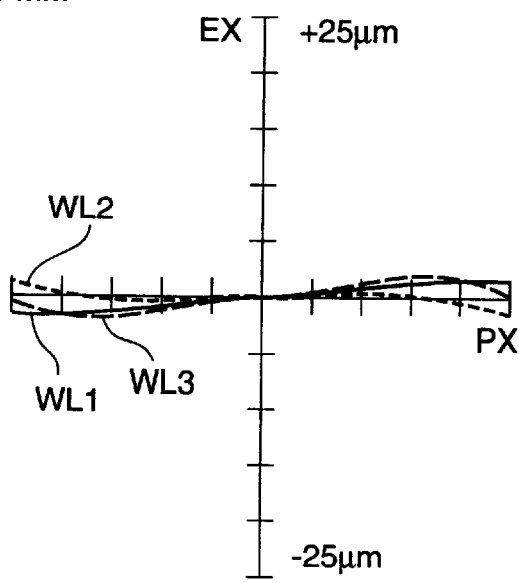
Figure 24C:
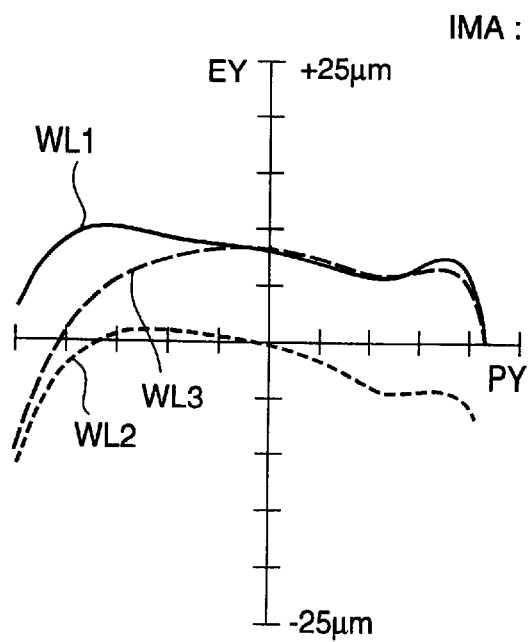
Figure 24D:
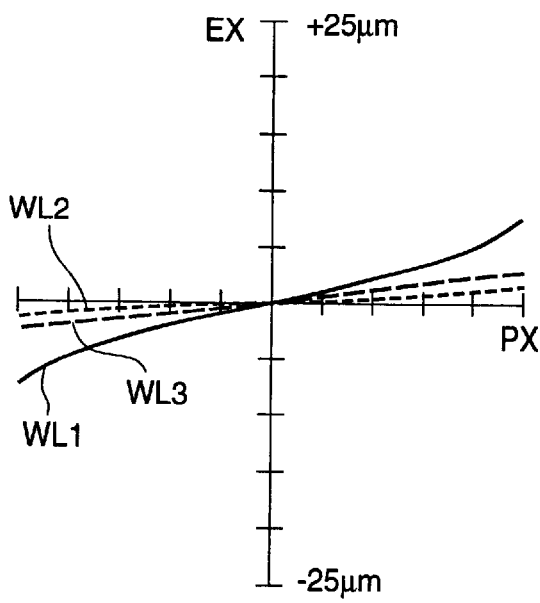

FIGS. 24A–24D show the characteristics of the retrofocus lens system of Embodiment 8. FIGS. 24A and 24B show the axial (that is, at an image height of 0.00 mm) lateral aberration. FIGS. 24C and 24D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 8 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 8 is the same as Embodiment 1.

Embodiment 9

Figure 25:
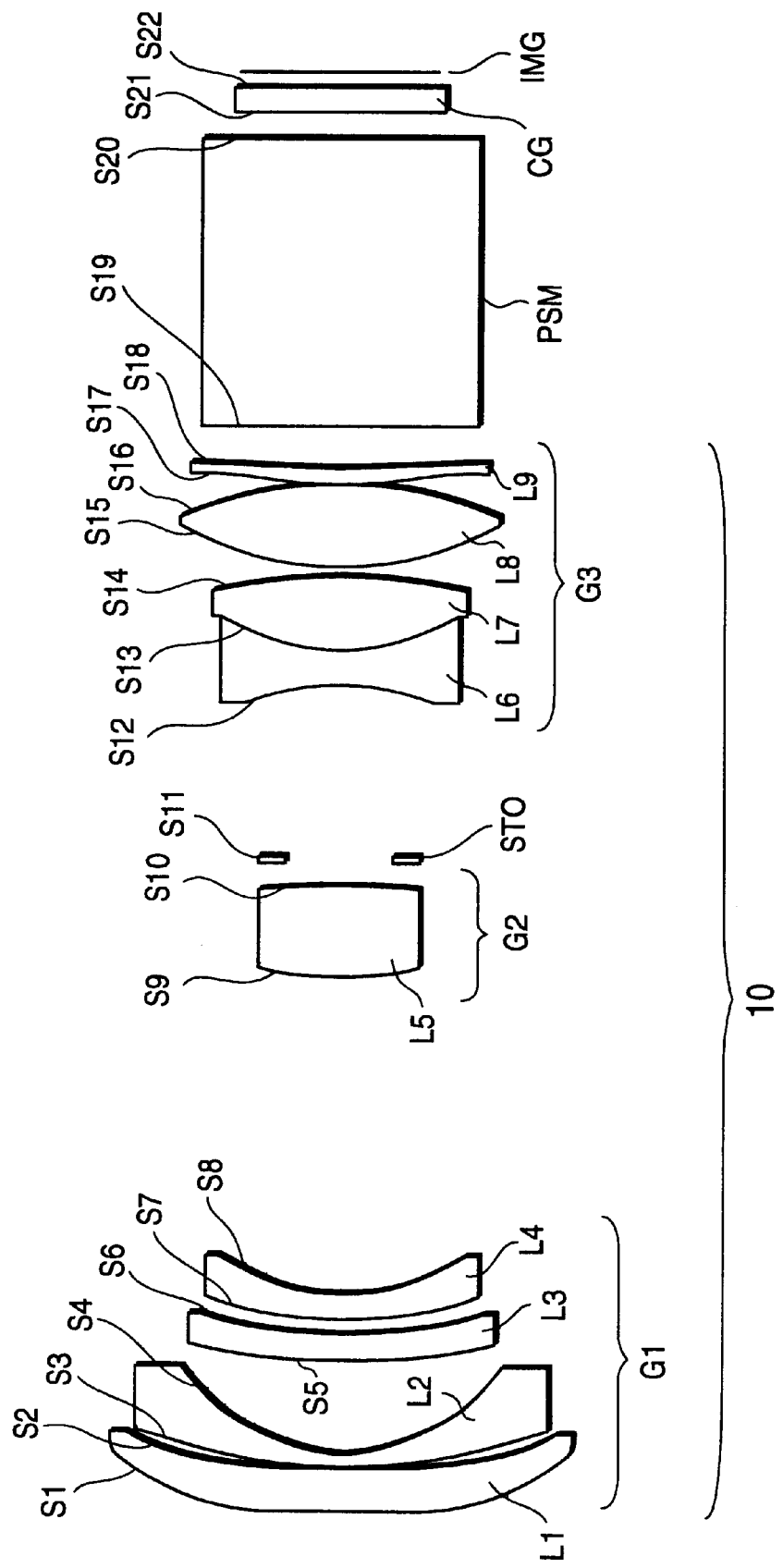
FIG. 25 is a schematic diagram showing a configuration of a retrofocus lens system of Embodiment 9 of the present invention.

FIG. 25 is a schematic diagram showing a configuration of a retrofocus lens system 10 of Embodiment 9 of the present invention. As shown in FIG. 25, the retrofocus lens system 10 of Embodiment 9 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 25).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the large conjugate side, and a meniscus-shaped fourth lens $L_4$ having a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 17 below.

TABLE 17

| S | R | T | N | vd | Type |
|---|---|---|---|---|---|
| OBJ | Infinity | 637 | | | |
| 1 | 4494.27 | 4.650422 | 1.489992 | 54.434 | ASP |
| 2 | 1456.582 | 0.245643 | | | ASP |
| 3 | 71.2524 | 1.297247 | 1.696800 | 55.460 | |
| 4 | 22.21056 | 10.53273 | | | |
| 5 | 106.661 | 2.845912 | 1.612930 | 36.960 | |
| 6 | 64.49724 | 1.563557 | | | |

TABLE 17-continued

| S | R | T | N | vd | Type |
|---|---|---|---|---|---|
| 7 | 52.84431 | 2.664931 | 1.638540 | 55.450 | |
| 8 | 25.63078 | 36.21167 | | | |
| 9 | 45.55582 | 10.079 | 1.698950 | 30.050 | |
| 10 | −98.05225 | 2.977628 | | | |
| 11 | Infinity | 20.33078 | | | STO |
| 12 | −28.83125 | 4.114032 | 1.784720 | 25.700 | |
| 13 | 25.46096 | 8.342249 | 1.696800 | 55.460 | |
| 14 | −61.86268 | 1.199754 | | | |
| 15 | 37.6032 | 9.396622 | 1.638540 | 55.450 | |
| 16 | −47.60497 | 0.2506909 | | | |
| 17 | 66.75076 | 1.753369 | 1.489992 | 54.434 | ASP |
| 18 | 363.9572 | 5 | | | ASP |
| 19 | Infinity | 32.5 | 1.516800 | 64.200 | |
| 20 | Infinity | 3 | | | |
| 21 | Infinity | 2.75 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 18 below.

TABLE 18

(ASPHERIC COEFFICIENT)

| S | K | D | E | F |
|---|---|---|---|---|
| 1 | −92.22774 | 1.971099e−5 | −2.475828e−8 | 2.896435e−11 |
| 2 | −7.69473 | 1.683886e−5 | −2.895817e−8 | 4.193713e−11 |
| 17 | −29.60278 | 2.255141e−5 | −8.837630e−8 | −1.650042e−10 |
| 18 | −63.02929 | 2.609136e−5 | −6.655522e−8 | −1.643520e−10 |

| S | G | H | I |
|---|---|---|---|
| 1 | −1.109442e−14 | 3.375709e−19 | 1.911005e−21 |
| 2 | −2.624312e−14 | 7.529653e−19 | 1.776388e−21 |
| 17 | 4.092086e−13 | −1.785349e−17 | 7.020797e−20 |
| 18 | 4.358646e−13 | −1.166587e−17 | −1.896072e−23 |

The values of $f_2/f_3$, $|f_1|/f$, $|f_4|/f$, $f_5/f$, $|EXP|/f$, and $BFL/f$ of the retrofocus lens system 10 of Embodiment 9 are as indicated in Table 35, which is given later, and the conditional expressions (1) to (9) given above are satisfied.

Further, the retrofocus lens system 10 of Embodiment 9 has such a long back focal length that a prism (PSM in FIG. 25) and a cover glass (CG in FIG. 25) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 33B:
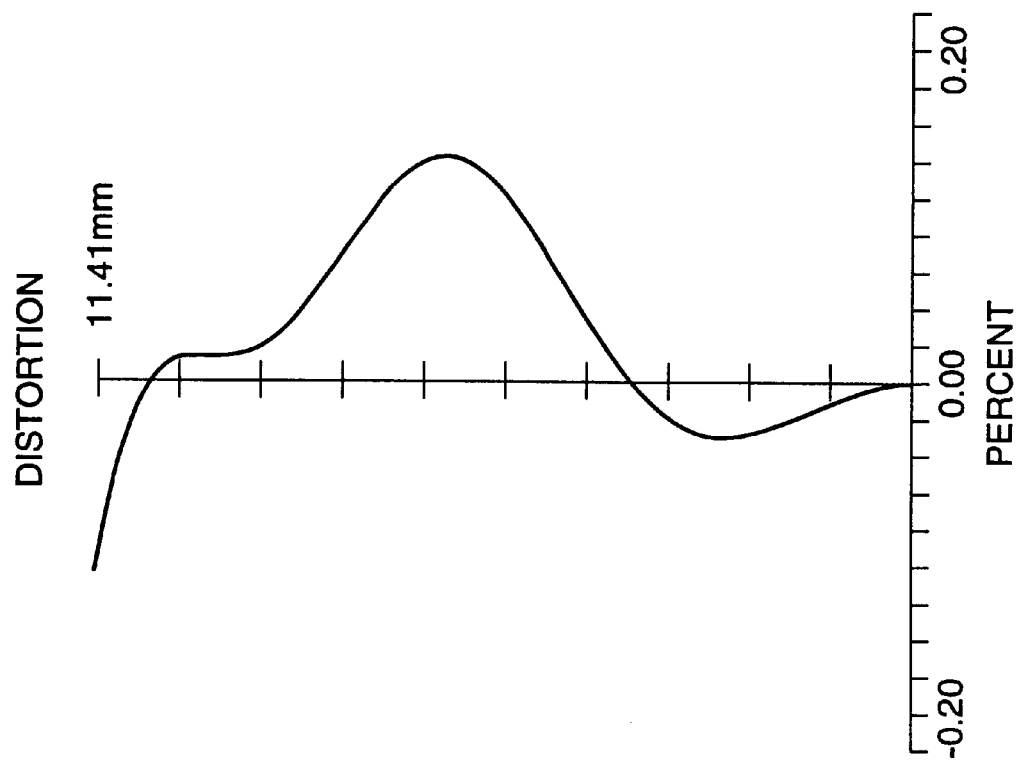
FIGS. 33A and 33B show characteristics of the retrofocus lens system of FIG. 25.
Figure 33A:
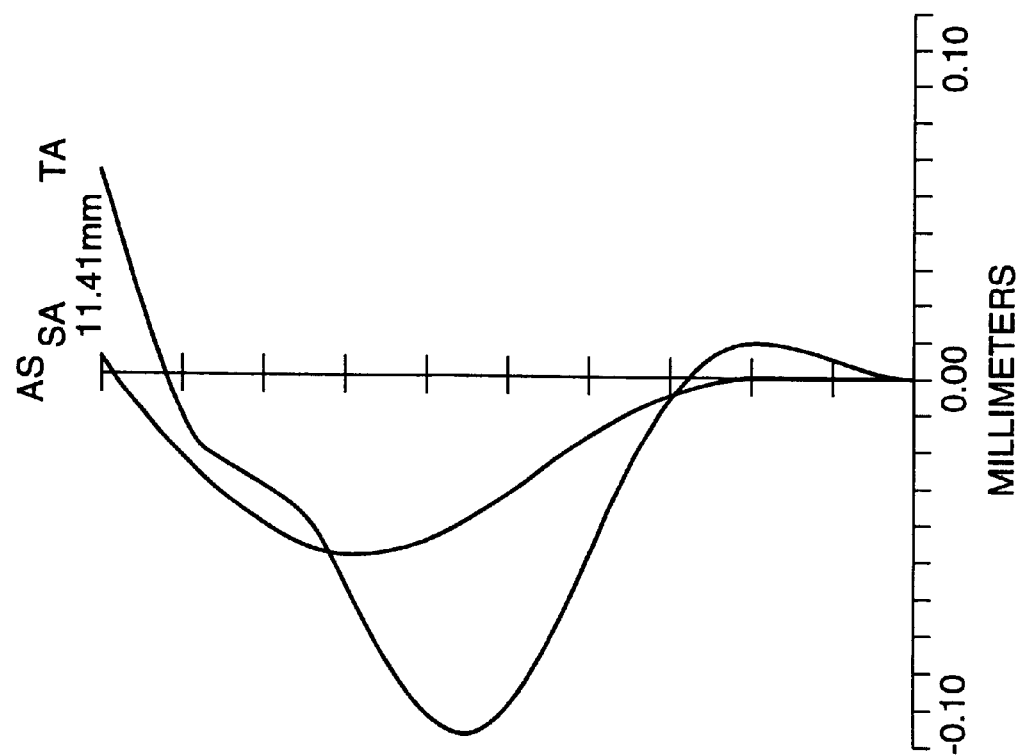

FIGS. 33A and 33B show the characteristics of the retrofocus lens system of Embodiment 9, FIG. 33A shows astigmatism (AS) on the small conjugate side, and FIG. 33B shows distortion. FIGS. 33A and 33B show the plotted astigmatism and distortion of light having a wavelength of 546.1 nm.

Figure 34A:
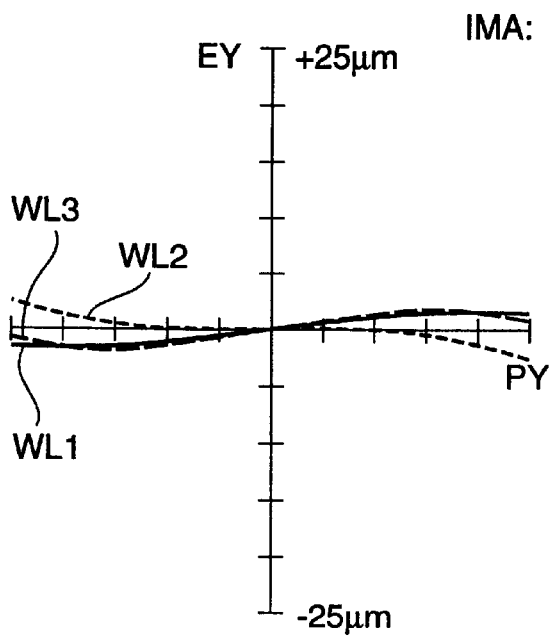
FIGS. 34A to 34D show characteristics of the retrofocus lens system of FIG. 25.
Figure 34B:
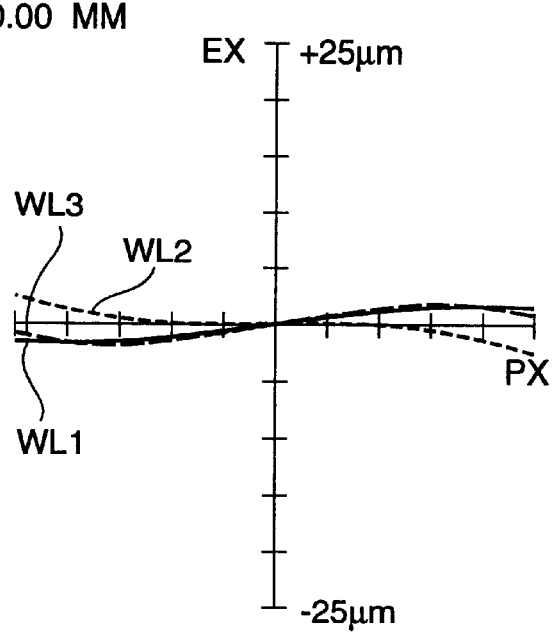
Figure 34C:
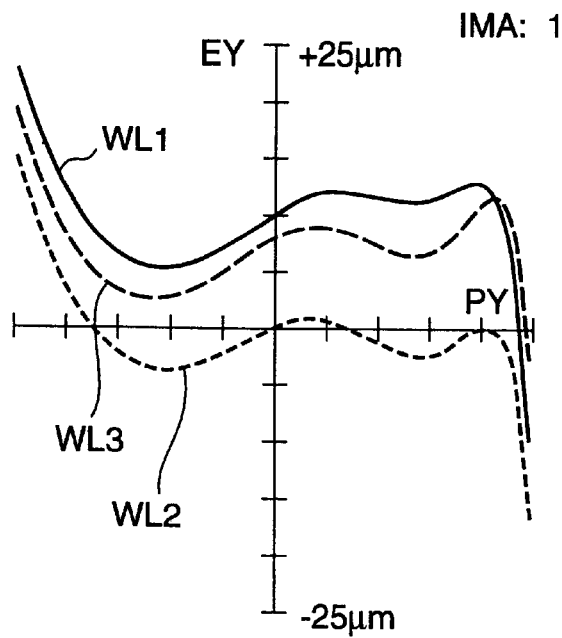
Figure 34D:
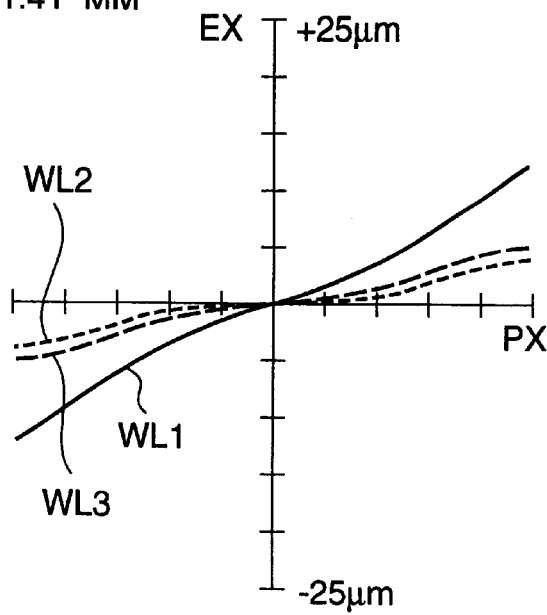

FIGS. 34A–34D show the characteristics of the retrofocus lens system of Embodiment 9. FIGS. 34A and 34B show the axial (that is, at an image height of 0.00 mm) lateral aberration. FIGS. 34C and 34D show the lateral aberration at an image height of 11.41 mm (an angle of view of 40.80 on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 9 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 9 is the same as Embodiment 1.

Embodiment 10

Figure 26:
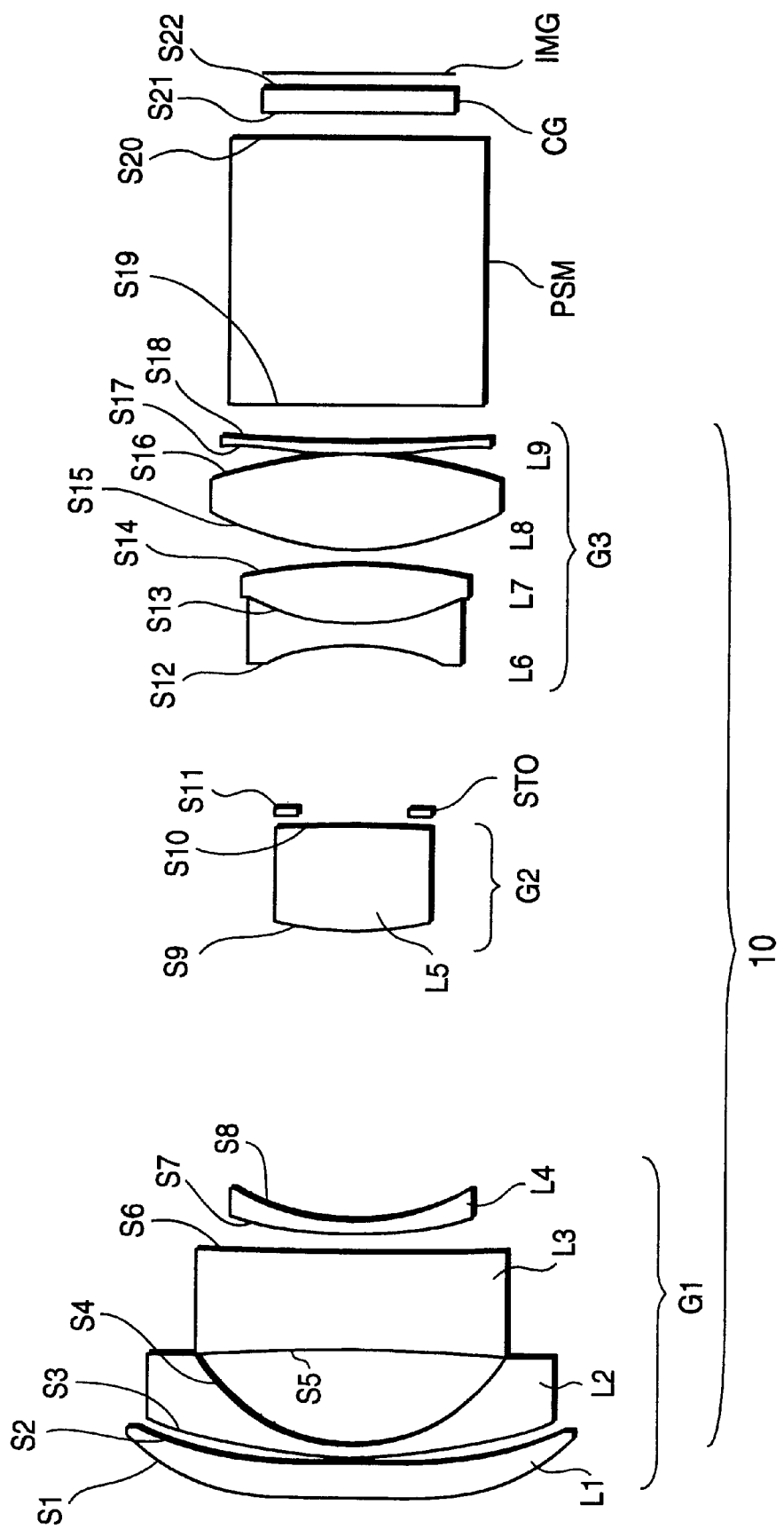
FIG. 26 is a schematic diagram showing a configuration of a retrofocus lens system of Embodiment 10 of the present invention.

FIG. 26 is a schematic diagram showing a configuration of a retrofocus lens system 10 of Embodiment 10 of the present invention. As shown in FIG. 26, the retrofocus lens system 10 of Embodiment 10 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 26).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a third lens $L_3$ having a negative refracting power, both surfaces of which are concave, and a meniscus-shaped negative fourth lens $L_4$ having a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 19 below.

TABLE 19

| S | R | T | N | vd | Type |
|---|---|---|---|---|---|
| OBJ | Infinity | 635 | | | |
| 1 | −2317.91 | 4.061196 | 1.489992 | 54.434 | ASP |
| 2 | −7685.313 | 0.7536351 | | | ASP |
| 3 | 72.50679 | 1.298605 | 1.696800 | 55.460 | |
| 4 | 22.72697 | 11.74987 | | | |
| 5 | −252.8271 | 11.66906 | 1.612930 | 36.960 | |
| 6 | 577.1316 | 2.551327 | | | |
| 7 | 59.3177 | 1.299789 | 1.638540 | 55.450 | |
| 8 | 27.64018 | 36.12846 | | | |
| 9 | 42.35997 | 13.00024 | 1.698950 | 30.050 | |

TABLE 19-continued

| S | R | T | N | vd | Type |
|---|---|---|---|---|---|
| 10 | −117.676 | 1.640229 | | | |
| 11 | Infinity | 20.71258 | | | STO |
| 12 | −28.87555 | 2.810199 | 1.784720 | 25.700 | |
| 13 | 25.23108 | 7.411813 | 1.696800 | 55.460 | |
| 14 | −61.88349 | 2.11826 | | | |
| 15 | 36.03857 | 11.61748 | 1.638540 | 55.450 | |
| 16 | −50.65724 | 0.2496512 | | | |
| 17 | 72.67479 | 1.303835 | 1.489992 | 54.434 | ASP |
| 18 | 384.2801 | 5 | | | ASP |
| 19 | Infinity | 32.5 | 1.516800 | 64.200 | |
| 20 | Infinity | 3 | | | |
| 21 | Infinity | 2.75 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 20 below.

TABLE 20

(ASPHERIC COEFFICIENT)

| S | K | D | E | F |
|---|---|---|---|---|
| 1 | 99.89908 | 1.928159e−5 | −2.423915e−8 | 2.869503e−11 |
| 2 | −79.41187 | 1.687649e−5 | −2.943213e−8 | 4.16205e−11 |
| 17 | −32.94878 | 2.168022e−5 | −8.968070e−8 | −1.661546e−10 |
| 18 | 99.95861 | 2.640798e−5 | −6.685668e−8 | −1.659298e−10 |

| S | G | H | I |
|---|---|---|---|
| 1 | −1.222559e−14 | −2.652584e−19 | 3.001476e−21 |
| 2 | −2.641613e−14 | 9.629678e−19 | 3.470043e−21 |
| 17 | 4.029354e−13 | −3.612867e−17 | 2.230396e−19 |
| 18 | 4.341009e−13 | −3.596126e−17 | −2.461449e−21 |

The values of $f_2/f_3$, $|f_1|/f$, $|f_4|/f$, $f_5/f$, $|EXP|/f$, and BFL/f of the retrofocus lens system 10 of Embodiment 9 are as indicated in Table 35, which is given later, and the conditional expressions (1) to (9) given above are satisfied.

Further, the retrofocus lens system 10 of Embodiment 10 has such a long back focal length that a prism (PSM in FIG. 26) and a cover glass (CG in FIG. 26) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 35B:
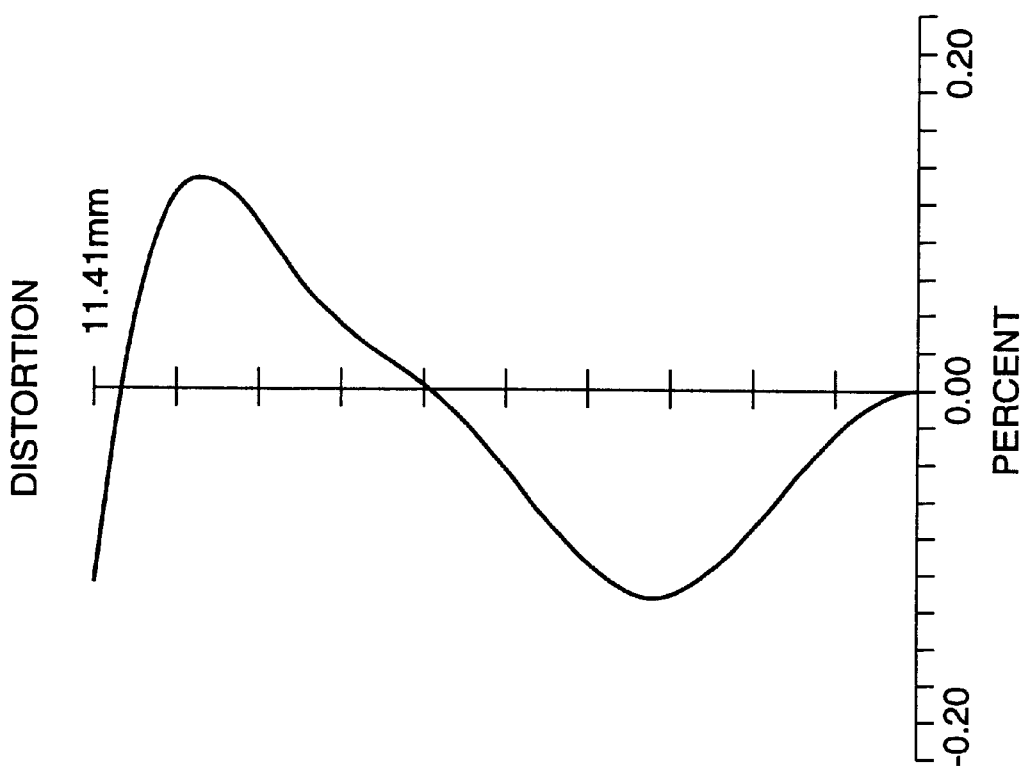
FIGS. 35A and 35B show characteristics of the retrofocus lens system of FIG. 26.
Figure 35A:
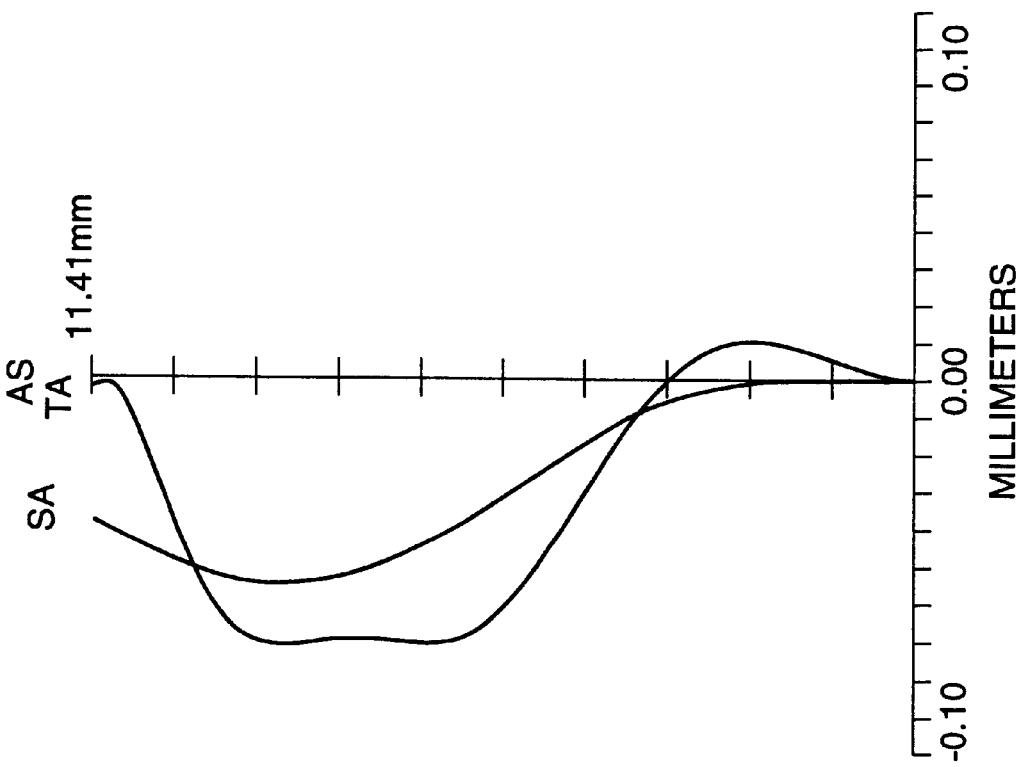

FIGS. 35A and 35B show the characteristics of the retrofocus lens system of Embodiment 10, FIG. 35A shows astigmatism (AS) on the small conjugate side, and FIG. 35B shows distortion. FIGS. 35A and 35B show the plotted astigmatism and distortion of light having a wavelength of 546.1 nm.

Figure 36A:
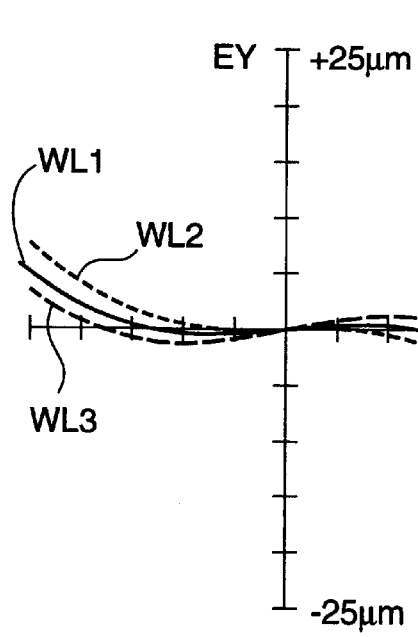
FIGS. 36A to 36D show characteristics of the retrofocus lens system of FIG. 26.
Figure 36B:
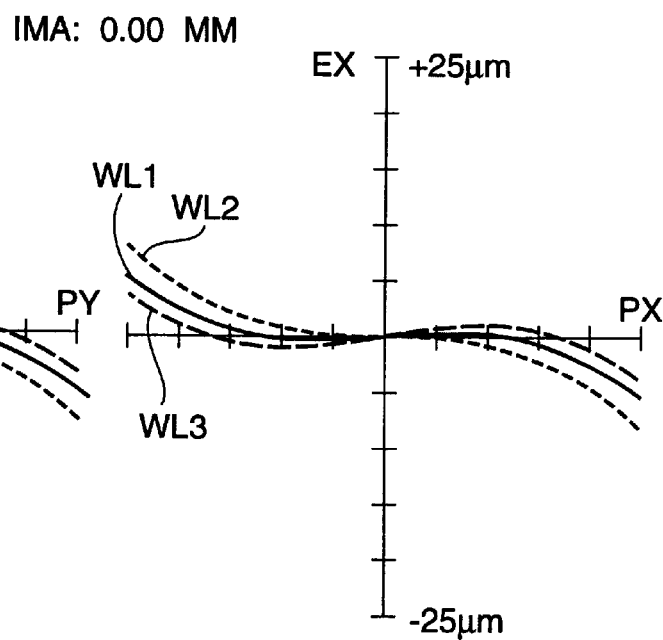
Figure 36C:
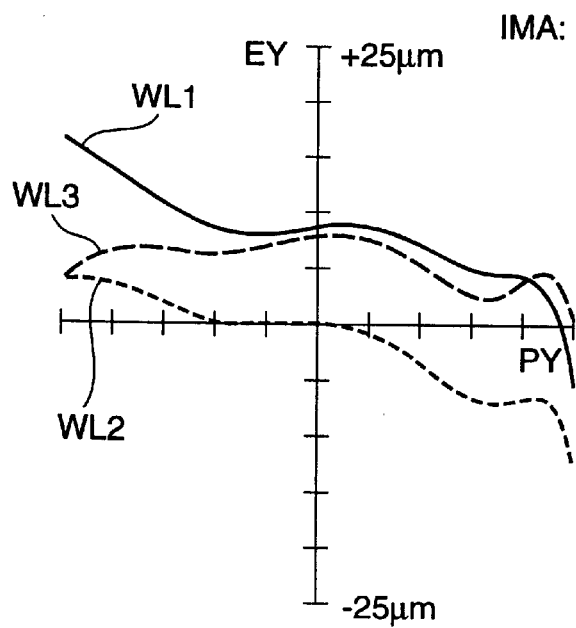
Figure 36D:
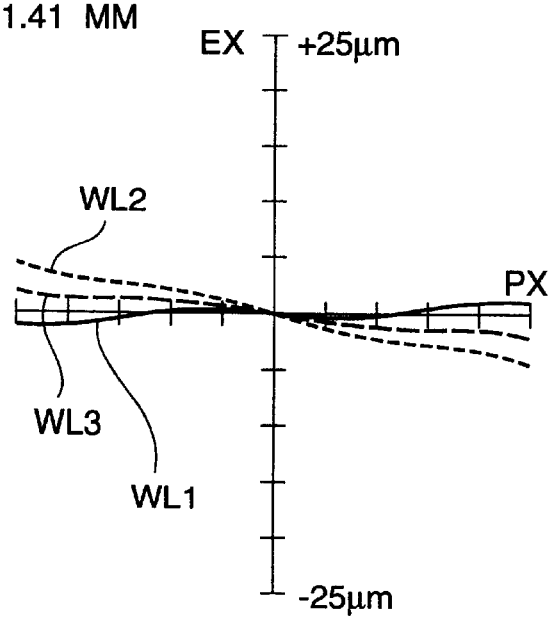

FIGS. 36A–36D show the characteristics of the retrofocus lens system of Embodiment 10. FIGS. 36A and 36B show the axial (that is, at an image height of 0.00 mm) lateral aberration. FIGS. 36C and 36D show the lateral aberration at an image height of 11.41 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 10 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 10 is the same as Embodiment 1.

Embodiment 11

Figure 27:
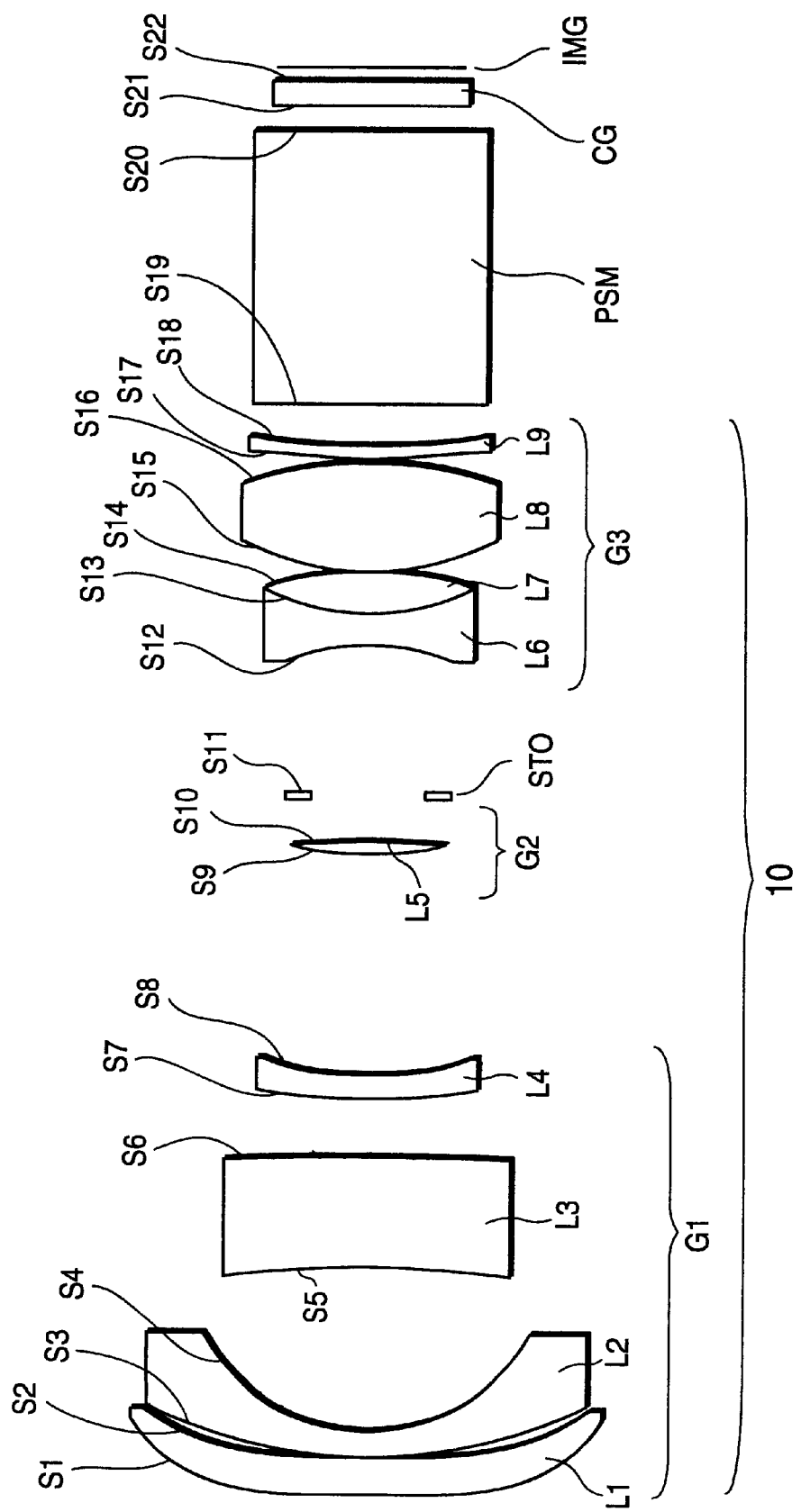
FIG. 27 is a schematic diagram showing a configuration of a retrofocus lens system of Embodiment 11 of the present invention.

FIG. 27 is a schematic diagram showing a configuration of a retrofocus lens system 10 of Embodiment 11 of the present invention. As shown in FIG. 27, the retrofocus lens system 10 of Embodiment 11 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 27).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the small conjugate side, and a meniscus-shaped negative fourth lens $L_4$ having a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 21 below.

TABLE 21

| S | R | T | N | vd | Type |
|---|---|---|---|---|---|
| OBJ | Infinity | 635 | | | |
| 1 | −1390.67 | 4.185881 | 1.489992 | 54.434 | ASP |
| 2 | 805.1359 | 0.2918614 | | | ASP |
| 3 | 62.0464 | 2.839725 | 1.788000 | 47.490 | |
| 4 | 22.24512 | 19.59418 | | | |
| 5 | −129.6011 | 12.99994 | 1.728250 | 28.320 | |
| 6 | −699.6454 | 7.187816 | | | |
| 7 | 84.56022 | 2.861461 | 1.713000 | 53.940 | |
| 8 | 39.86477 | 26.90172 | | | |
| 9 | 39.24201 | 1.500029 | 1.761820 | 26.610 | |
| 10 | −205.7601 | 5.74705 | | | |

TABLE 21-continued

| S | R | T | N | vd | Type |
|---|---|---|---|---|---|
| 11 | Infinity | 18.18225 | | | STO |
| 12 | −26.56824 | 3.932377 | 1.846660 | 23.780 | |
| 13 | 27.55332 | 5.010506 | 1.734000 | 51.050 | |
| 14 | −52.04682 | 0.2502205 | | | |
| 15 | 34.51878 | 13.00213 | 1.666720 | 48.300 | |
| 16 | −46.2861 | 0.5637651 | | | |
| 17 | 83.21754 | 1.492744 | 1.489992 | 54.434 | ASP |
| 18 | 201.1324 | 5 | | | ASP |
| 19 | Infinity | 32.5 | 1.516800 | 64.200 | |
| 20 | Infinity | 3 | | | |
| 21 | Infinity | 2.75 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 22 below.

TABLE 22

(ASPHERIC COEFFICIENT)

| S | K | D | E | F | G | H | I |
|---|---|---|---|---|---|---|---|
| 1 | 93.10387 | 2.044687e-5 | −2.458899e-8 | 3.178228e-11 | −1.567616e-14 | −4.721763e-19 | 4.565291e-21 |
| 2 | 99.98684 | 1.834117e-5 | −2.535183e-8 | 3.541249e-11 | −2.374629e-14 | 6.133367e-19 | 3.367383e-21 |
| 17 | −32.15951 | 1.809774e-5 | −8.305159e-8 | −1.415711e-10 | 2.892582e-13 | −7.282812e-16 | −1.749714e-19 |
| 18 | −57.91904 | 3.210501e-5 | −5.833339e-8 | −1.429583e-10 | 3.494210e-13 | −3.386451e-16 | −2.418731e-18 |

The values of $f_2/f_3$, $|f_1|/f$, $|f_4|/f$, $f_5/f$, $|EXP|/f$, and $BFL/f$ of the retrofocus lens system 10 of Embodiment 9 are as indicated in Table 35, which is given later, and the conditional expressions (1) to (9) given above are satisfied.

Further, the retrofocus lens system 10 of Embodiment 11 has such a long back focal length that a prism (PSM in FIG. 27) and a cover glass (CG in FIG. 27) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 37A:
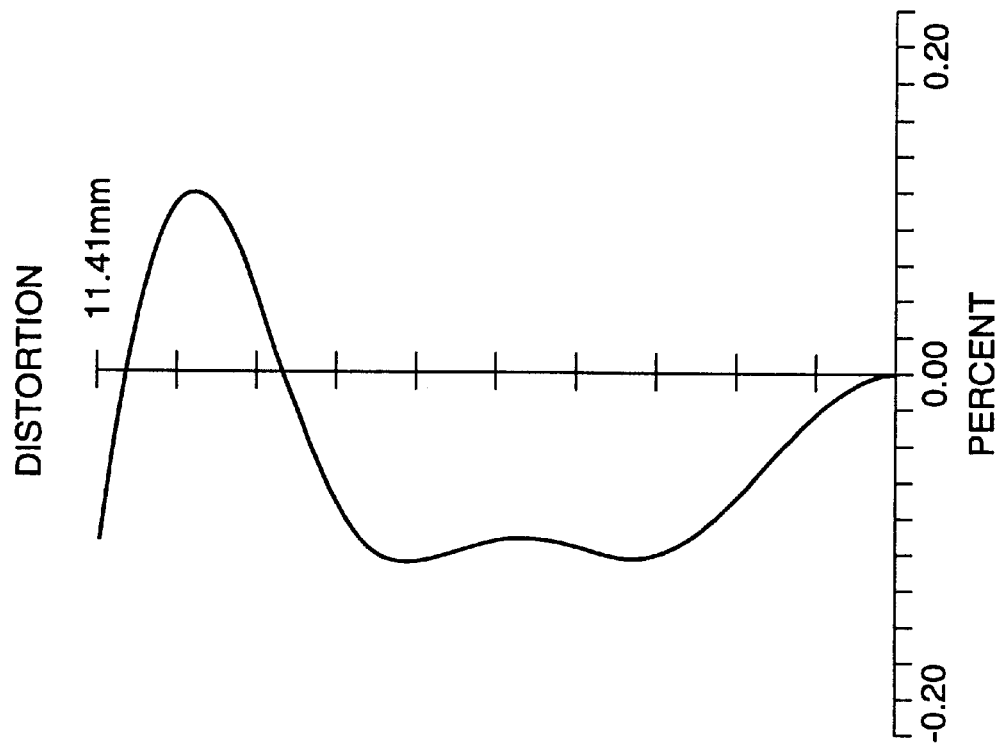
FIGS. 37A and 37B show characteristics of the retrofocus lens system of FIG. 27.
Figure 37B:
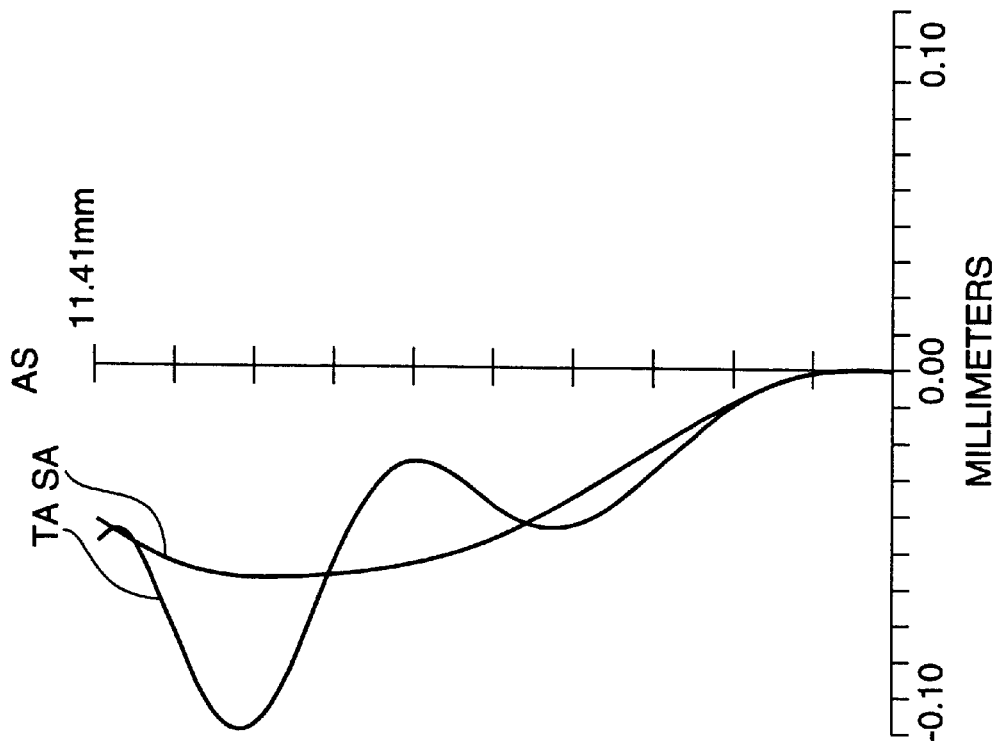

FIGS. 37A and 37B show the characteristics of the retrofocus lens system of Embodiment 11, FIG. 37A shows astigmatism (AS) on the small conjugate side, and FIG. 37B shows distortion. FIGS. 37A and 37B show the plotted astigmatism and distortion of light having a wavelength of 546.1 nm.

Figure 38A:
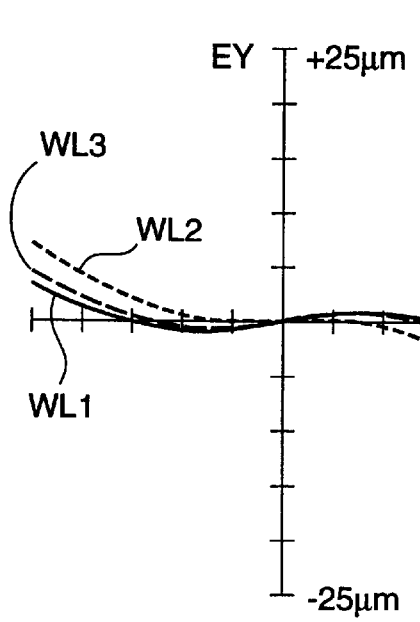
FIGS. 38A to 38D show characteristics of the retrofocus lens system of FIG. 27.
Figure 38B:
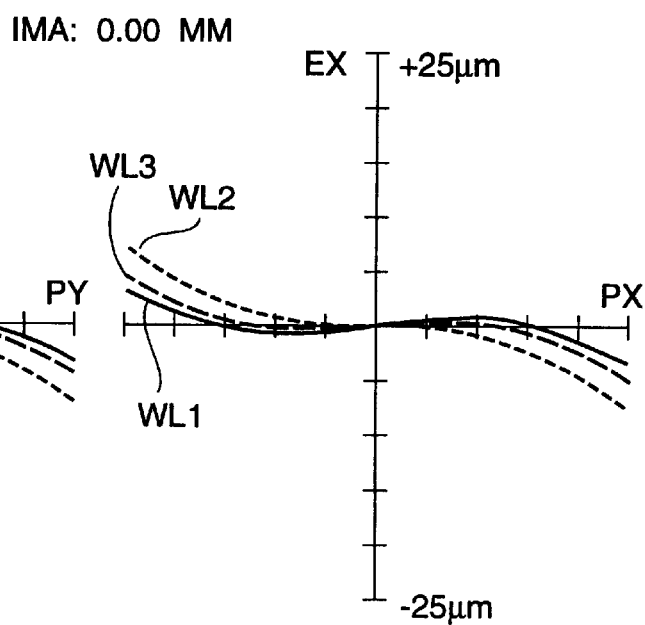
Figure 38C:
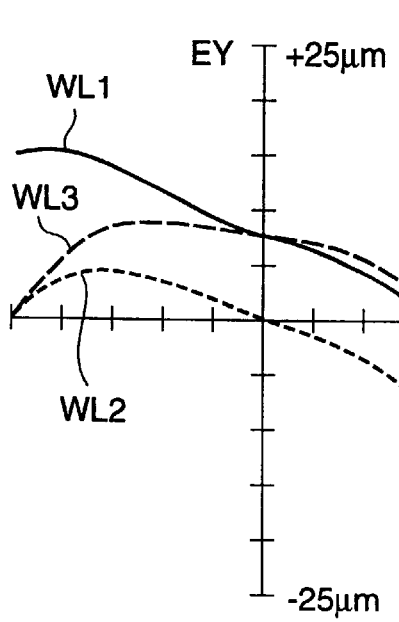
Figure 38D:
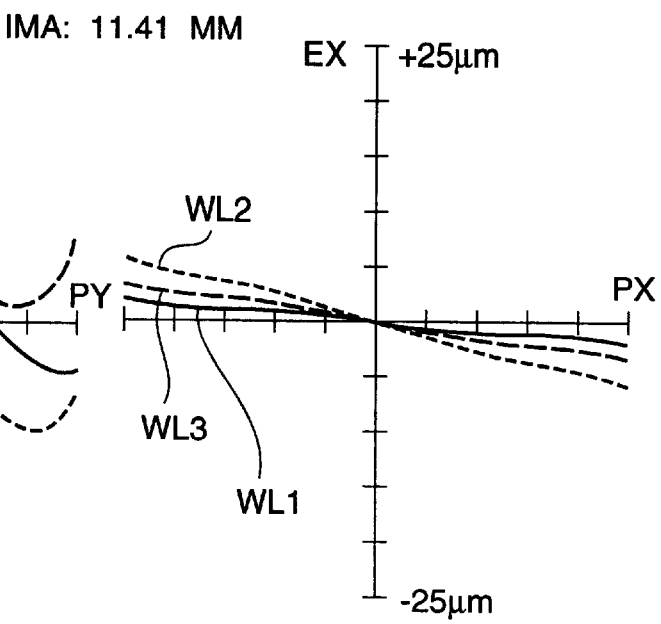

FIGS. 38A–38D show the characteristics of the retrofocus lens system of Embodiment 11. FIGS. 38A and 38B show the axial (that is, at an image height of 0.00 mm) lateral aberration. FIGS. 38C and 38D show the lateral aberration at an image height of 11.41 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 11 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 11 is the same as Embodiment 1.

Embodiment 12

Figure 28:
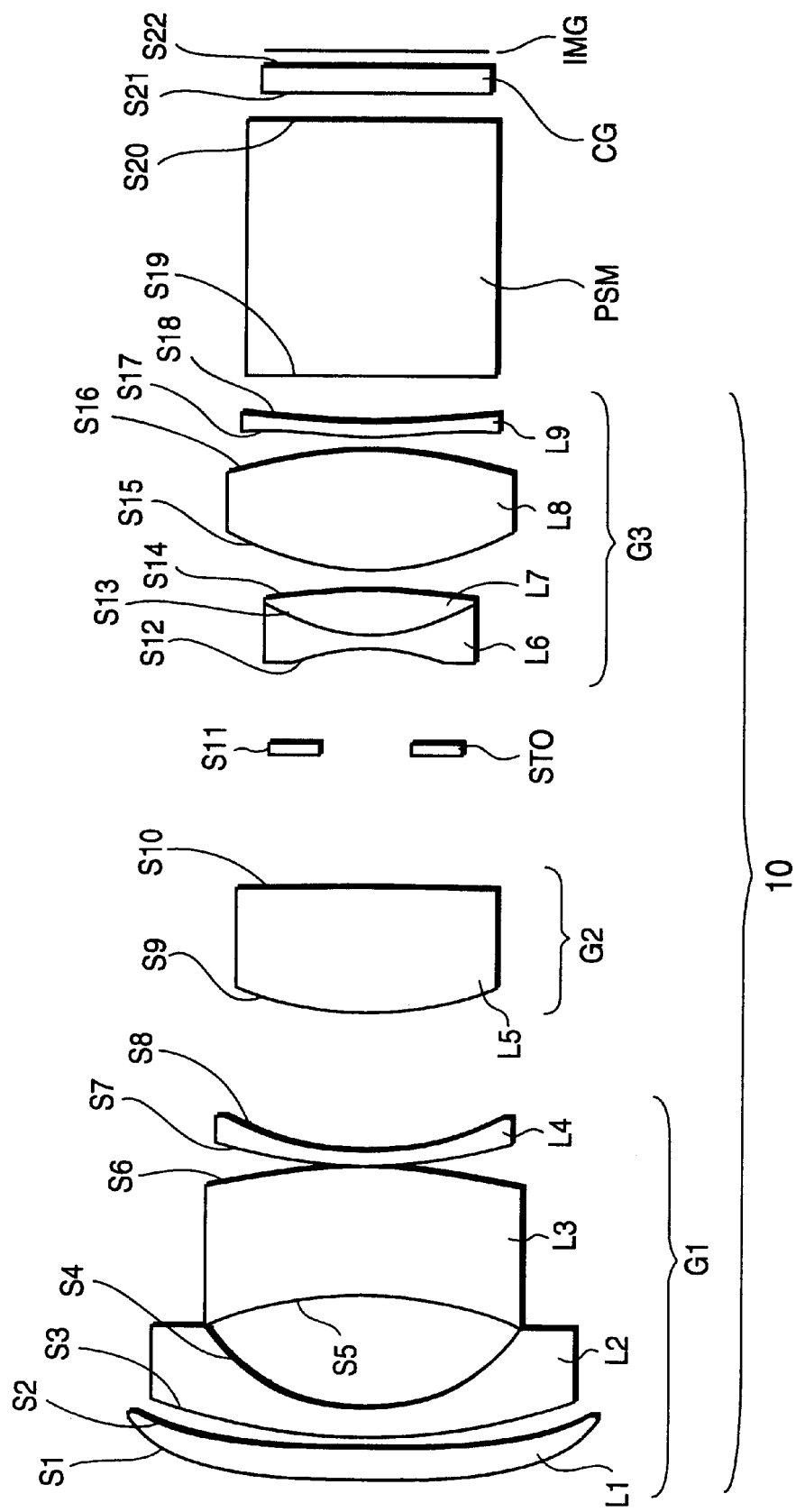
FIG. 28 is a schematic diagram showing a configuration of a retrofocus lens system of Embodiment 12 of the present invention.

FIG. 28 is a schematic diagram showing a configuration of a retrofocus lens system 10 of Embodiment 12 of the present invention. As shown in FIG. 28, the retrofocus lens system 10 of Embodiment 12 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 28).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the small conjugate side, and a meniscus-shaped fourth lens $L_4$ having a negative refracting power and a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 23 below.

TABLE 23

| S | R | T | N | vd | Type |
|---|---|---|---|---|---|
| OBJ | Infinity | 635 | | | |
| 1 | −841.9209 | 3.203478 | 1.489992 | 54.434 | ASP |
| 2 | −5231.554 | 1.095062 | | | ASP |
| 3 | 69.51901 | 2.734992 | 1.835000 | 42.980 | |

TABLE 23-continued

| S | R | T | N | vd | Type |
|---|---|---|---|---|---|
| 4 | 20.32793 | 11.6905 | | | |
| 5 | -43.21449 | 12.99298 | 1.740779 | 27.760 | |
| 6 | -65.22959 | 0.2498337 | | | |
| 7 | 53.61654 | 1.500052 | 1.720000 | 50.340 | |
| 8 | 32.30624 | 14.56074 | | | |
| 9 | 37.5226 | 12.9999 | 1.761820 | 26.550 | |
| 10 | -331.5616 | 14.39014 | | | |
| 11 | Infinity | 10.73627 | | | STO |
| 12 | -21.70731 | 1.514359 | 1.755200 | 27.530 | |
| 13 | 19.60065 | 4.571194 | 1.757000 | 47.710 | |
| 14 | -52.34443 | 2.161839 | | | |
| 15 | 28.50746 | 12.52248 | 1.691000 | 54.700 | |
| 16 | -45.47605 | 1.647272 | | | |
| 17 | 67.77147 | 1.494541 | 1.489992 | 54.434 | ASP |
| 18 | 387.8449 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 24 below.

TABLE 24

(ASPHERIC COEFFICIENT)

| S | K | D | E | F | G | H | I |
|---|---|---|---|---|---|---|---|
| 1 | 83.51789 | 2.996011e-5 | -5.603350e-8 | 8.894339e-11 | -5.843887e-14 | -3.640388e-18 | 3.114481e-20 |
| 2 | -31.94053 | 2.445142e-5 | -6.103844e-8 | 1.027784e-10 | -7.754485e-14 | 7.957140e-18 | 1.208113e-20 |
| 17 | -31.27388 | 1.877552e-5 | -1.893499e-7 | -3.406045e-10 | 7.957195e-13 | -3.597344e-15 | 1.302733e-17 |
| 18 | -0.1752637 | 4.354253e-5 | -1.080345e-7 | -3.745958e-10 | 1.359597e-12 | -8.899236e-16 | -2.429771e-18 |

The values of $f_2/f_3$, $|f_1|/f$, $|f_4|/f$, $f_5/f$, $|EXP|/f$, and BFL/f of the retrofocus lens system 10 of Embodiment 12 are as indicated in Table 35, which is given later, and the conditional expressions (1) to (9) given above are satisfied.

Further, the retrofocus lens system 10 of Embodiment 12 has such a long back focal length that a prism (PSM in FIG. 28) and a cover glass (CG in FIG. 28) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 39B:
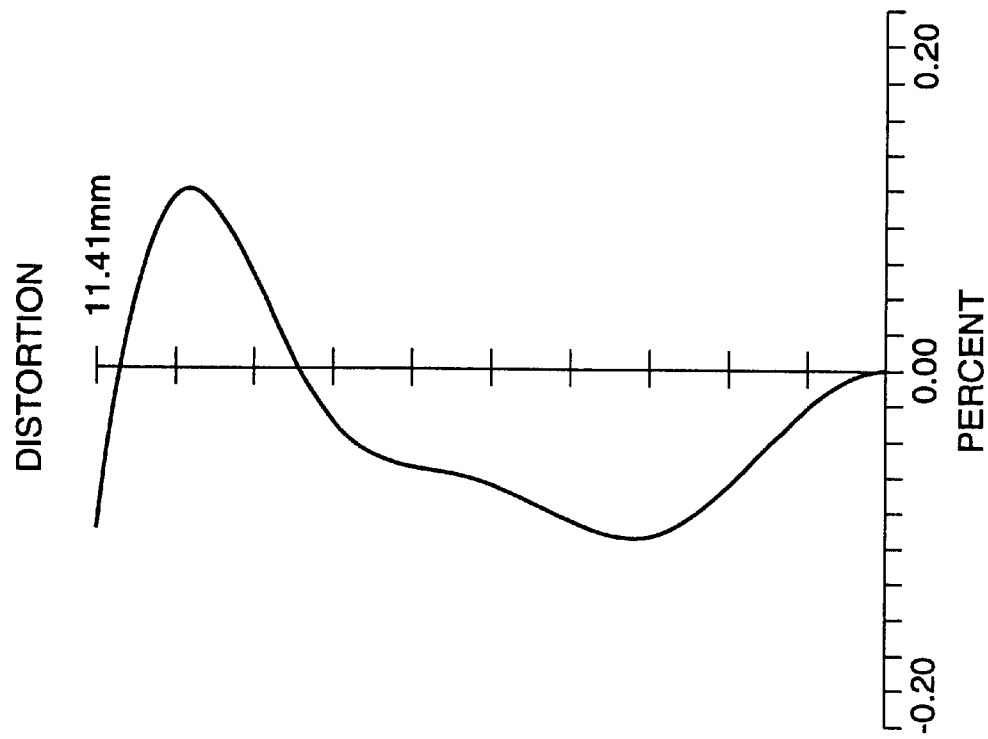
FIGS. 39A and 39B show characteristics of the retrofocus lens system of FIG. 28.
Figure 39A:
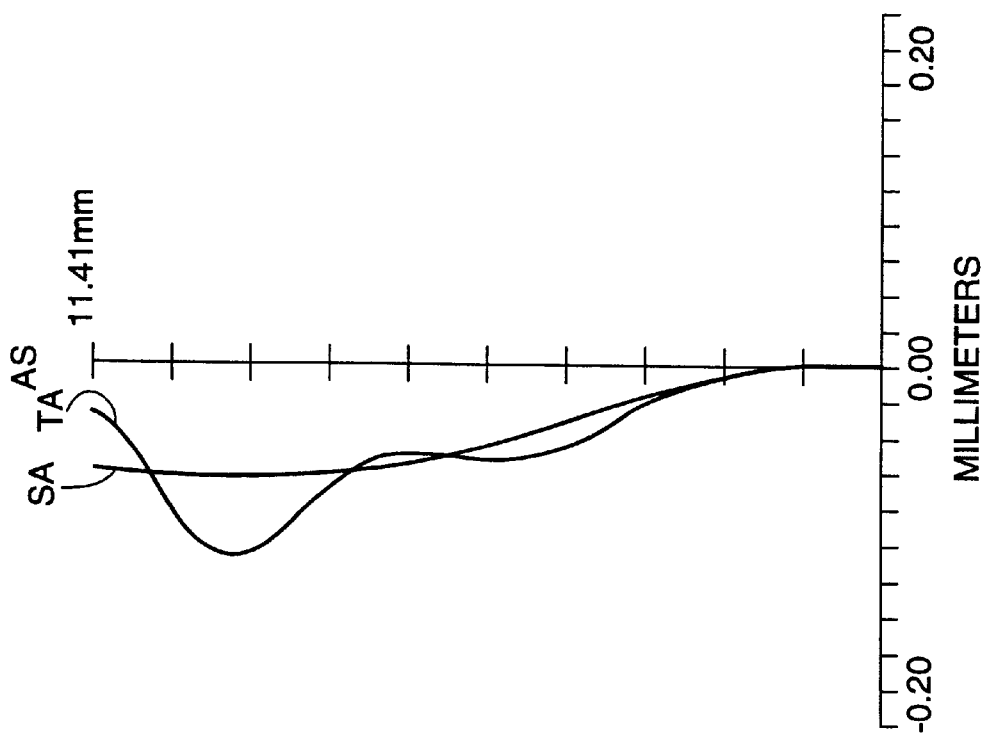

FIGS. 39A and 39B show the characteristics of the retrofocus lens system of Embodiment 12, FIG. 39A shows astigmatism (AS) on the small conjugate side, and FIG. 39B shows distortion. FIGS. 39A and 39B show the plotted astigmatism and distortion of light having a wavelength of 546.1 nm.

Figure 40A:
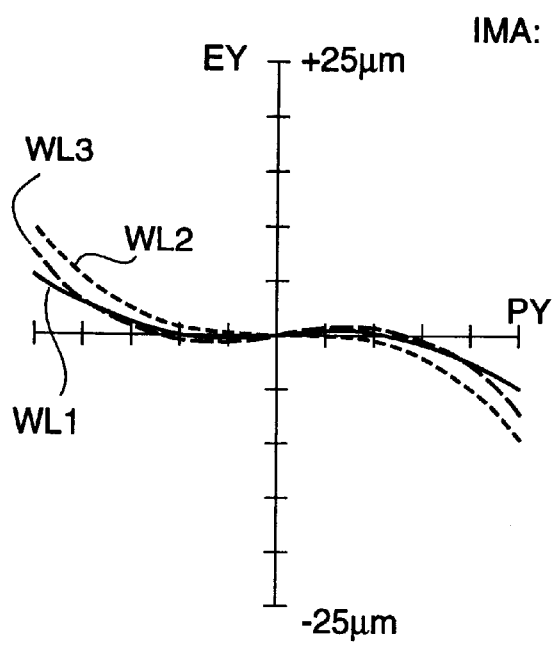
FIGS. 40A to 40D show characteristics of the retrofocus lens system of FIG. 28.
Figure 40B:
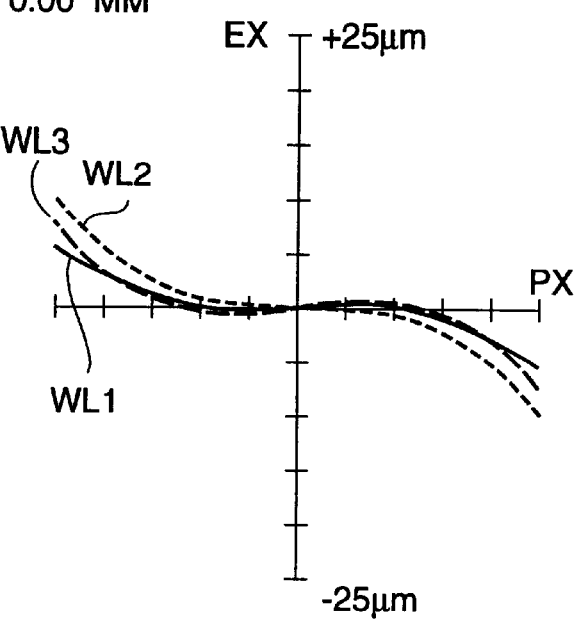
Figure 40C:
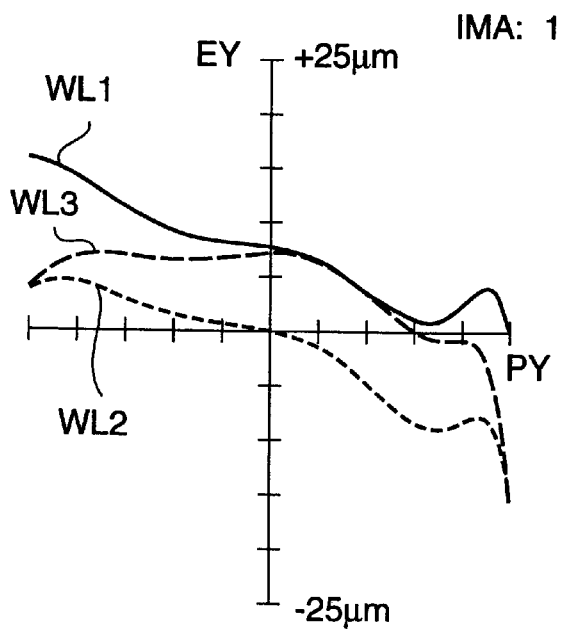
Figure 40D:
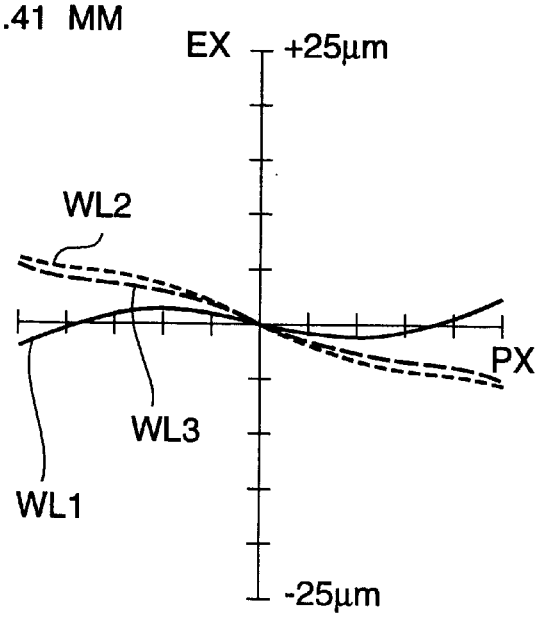

FIGS. 40A–40D show the characteristics of the retrofocus lens system of Embodiment 12. FIGS. 40A and 40B show the axial (that is, at an image height of 0.00 mm) lateral aberration. FIGS. 40C and 40D show the lateral aberration at an image height of 11.41 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 12 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 12 is the same as Embodiment 1.

Embodiment 13

Figure 29:
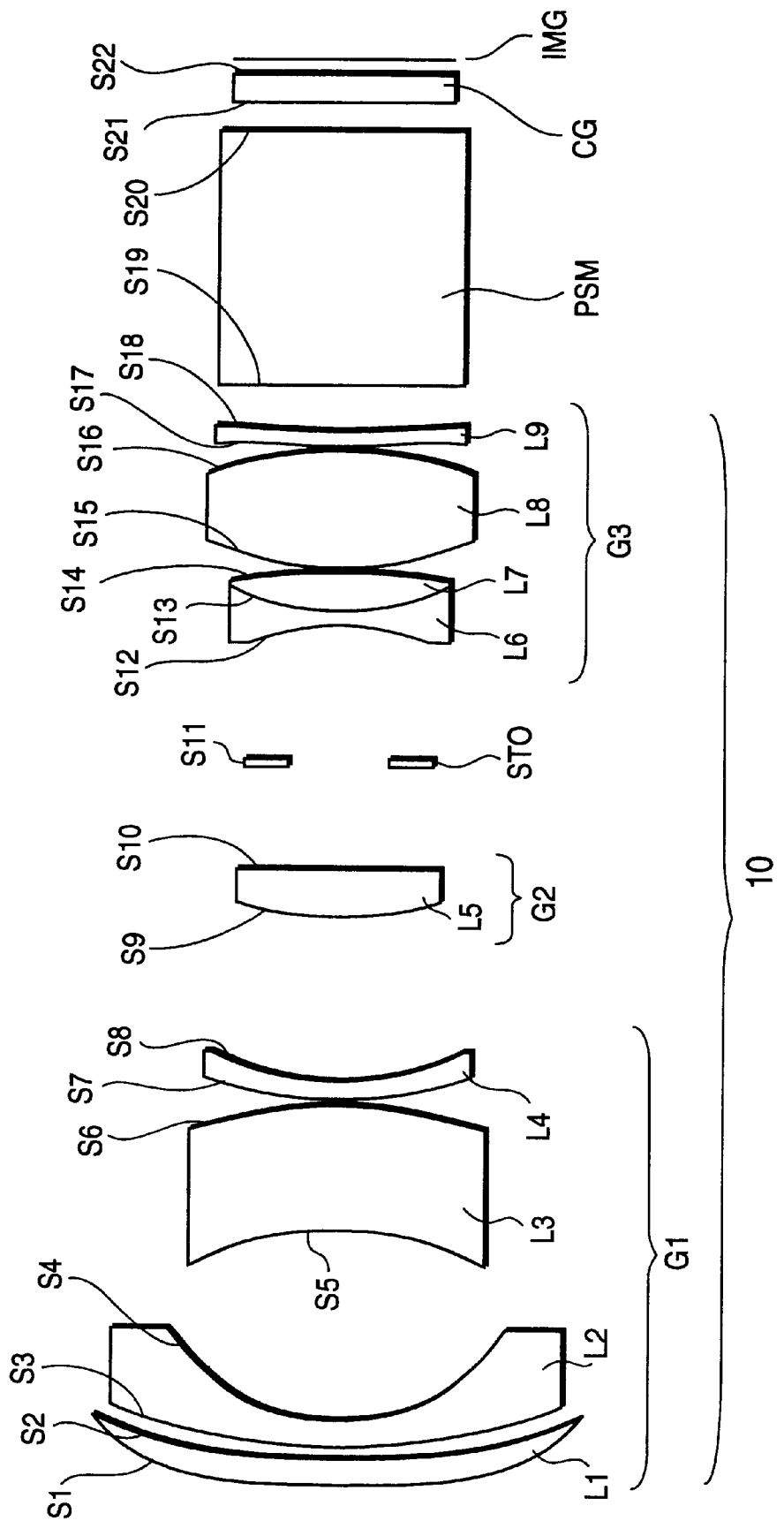
FIG. 29 is a schematic diagram showing a configuration of a retrofocus lens system of Embodiment 13 of the present invention.

FIG. 29 is a schematic diagram showing a configuration of a retrofocus lens system 10 of Embodiment 13 of the present invention. As shown in FIG. 29, the retrofocus lens system 10 of Embodiment 13 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 29).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the small conjugate side, and a meniscus-shaped fourth lens $L_4$ having a negative refracting power and a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 25 below.

TABLE 25

| S | R | T | N | vd | Type |
|---|---|---|---|---|---|
| OBJ | Infinity | 635 | | | |
| 1 | −599.2092 | 2.676792 | 1.489992 | 54.434 | ASP |
| 2 | 1391.308 | 1.257861 | | | ASP |
| 3 | 66.66451 | 2.647799 | 1.816000 | 46.570 | |
| 4 | 21.26742 | 19.55055 | | | |
| 5 | −35.03642 | 13.00301 | 1.784460 | 25.700 | |
| 6 | −47.82944 | 0.6216297 | | | |
| 7 | 41.01784 | 2.029422 | 1.743065 | 49.300 | |
| 8 | 30.87222 | 17.37111 | | | |
| 9 | 37.60808 | 5.001567 | 1.740770 | 27.760 | |
| 10 | −1593.841 | 11.22675 | | | |
| 11 | Infinity | 14.70783 | | | STO |
| 12 | −24.7878 | 1.500387 | 1.805180 | 25.460 | |
| 13 | 26.28332 | 4.117082 | 1.787854 | 47.400 | |
| 14 | −56.46642 | 0.3882194 | | | |
| 15 | 34.20678 | 12.38591 | 1.755000 | 52.320 | |
| 16 | −40.88545 | 0.5457473 | | | |
| 17 | 86.75544 | 1.495717 | 1.489992 | 54.434 | ASP |
| 18 | 186.7659 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 26 below.

TABLE 26

(ASPHERIC COEFFICIENT)

| S | K | D | E | F | G | H | I |
|---|---|---|---|---|---|---|---|
| 1 | 100.0001 | 3.248251e-5 | −6.08689e-8 | 8.837601e-11 | −5.154080e-14 | −1.035071e-17 | 3.153386e-20 |
| 2 | 44.0595 | 2.743487e-5 | −6.547972e-8 | 9.606841e-11 | −6.205737e-14 | 6.565884e-18 | 5.537783e-21 |
| 17 | −65.98609 | 1.411972e-5 | −1.725094e-7 | −2.775721e-10 | 1.083998e-12 | −3.542026e-15 | 1.195860e-17 |
| 18 | −41.30937 | 3.367615e-5 | −9.468725e-8 | −4.292242e-10 | 1.309160e-12 | −9.331098e-16 | 7.748371e-19 |

The values of $f_2/f_3$, $|f_1|/f$, $|f_4|/f$, $f_5/f$, $|EXP|/f$, and $BFL/f$ of the retrofocus lens system 10 of Embodiment 13 are as indicated in Table 35, which is given later, and the conditional expressions (1) to (9) given above are satisfied.

Further, the retrofocus lens system 10 of Embodiment 13 has such a long back focal length that a prism (PSM in FIG. 29) and a cover glass (CG in FIG. 29) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 41B:
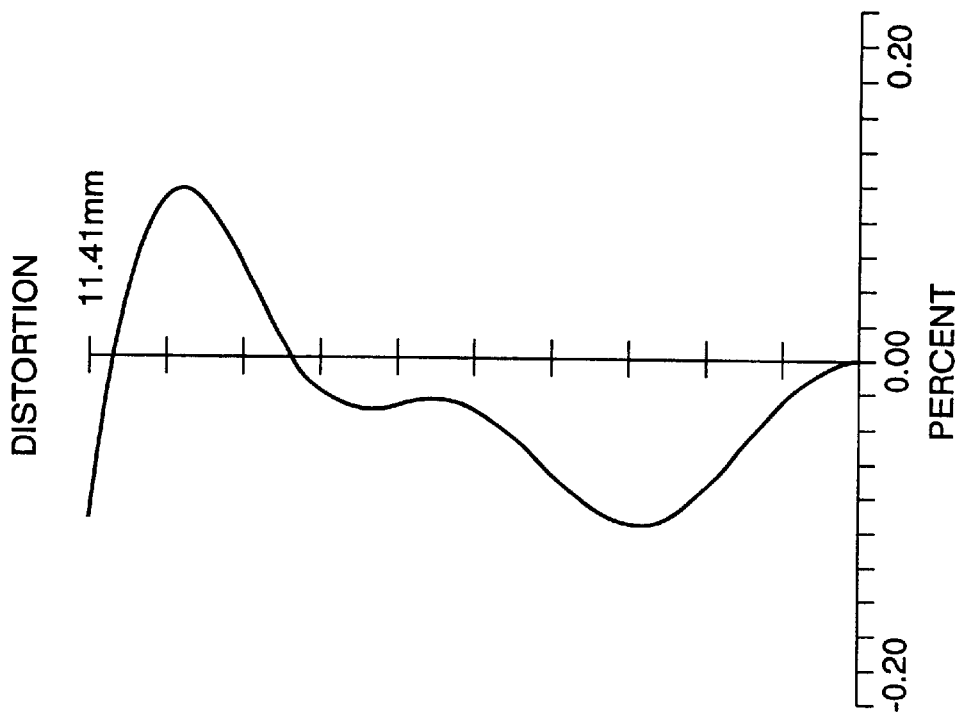
FIGS. 41A and 41B show characteristics of the retrofocus lens system of FIG. 29.
Figure 41A:
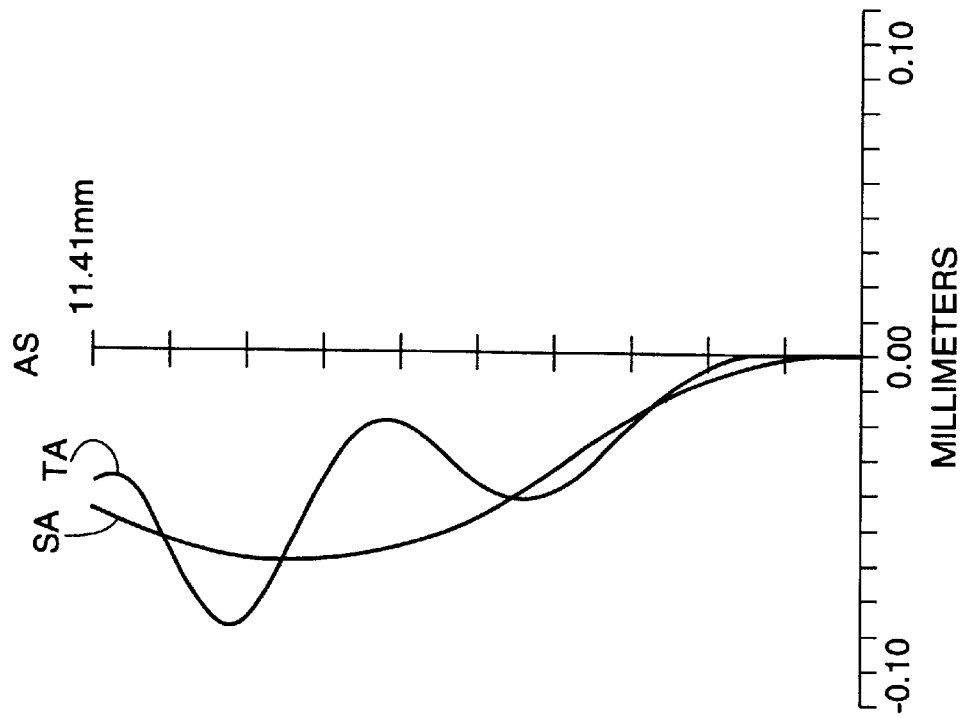

FIGS. 41A and 41B show the characteristics of the retrofocus lens system of Embodiment 13, FIG. 41A shows astigmatism (AS) on the small conjugate side, and FIG. 41B shows distortion. FIGS. 41A and 41B show the plotted astigmatism and distortion of light having a wavelength of 546.1 nm.

Figure 42A:
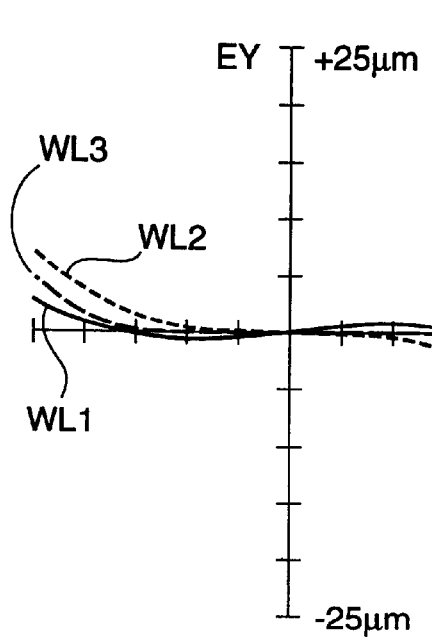
FIGS. 42A to 42D show characteristics of the retrofocus lens system of FIG. 29.
Figure 42B:
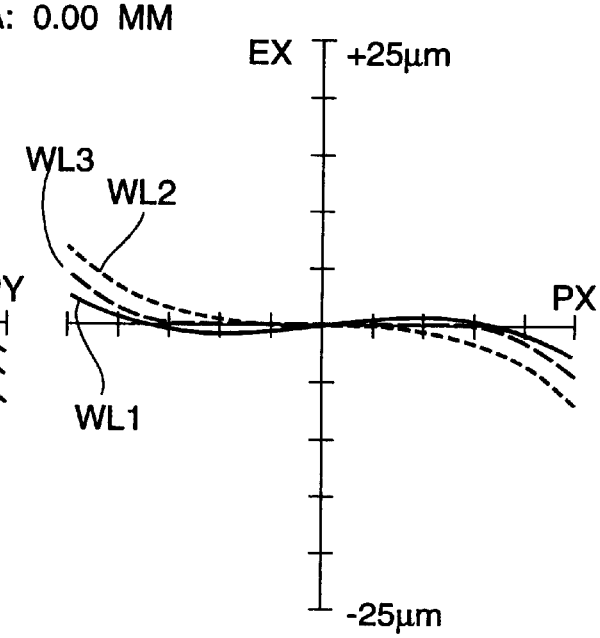
Figure 42C:
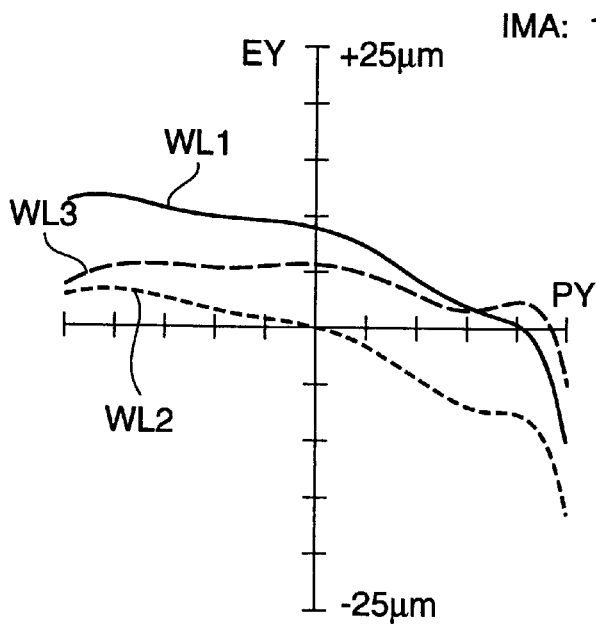
Figure 42D:
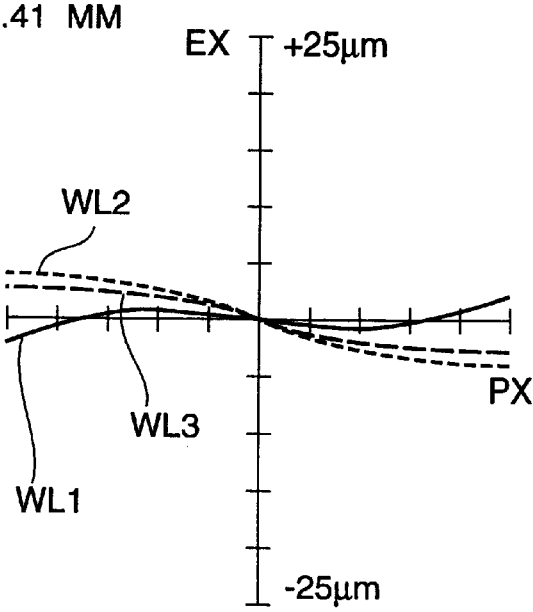

FIGS. 42A–42D show the characteristics of the retrofocus lens system of Embodiment 13. FIGS. 42A and 42B show the axial (that is, at an image height of 0.00 mm) lateral aberration. FIGS. 42C and 42D show the lateral aberration at an image height of 11.41 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 13 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 13 is the same as Embodiment 1.

Embodiment 14

Figure 30:
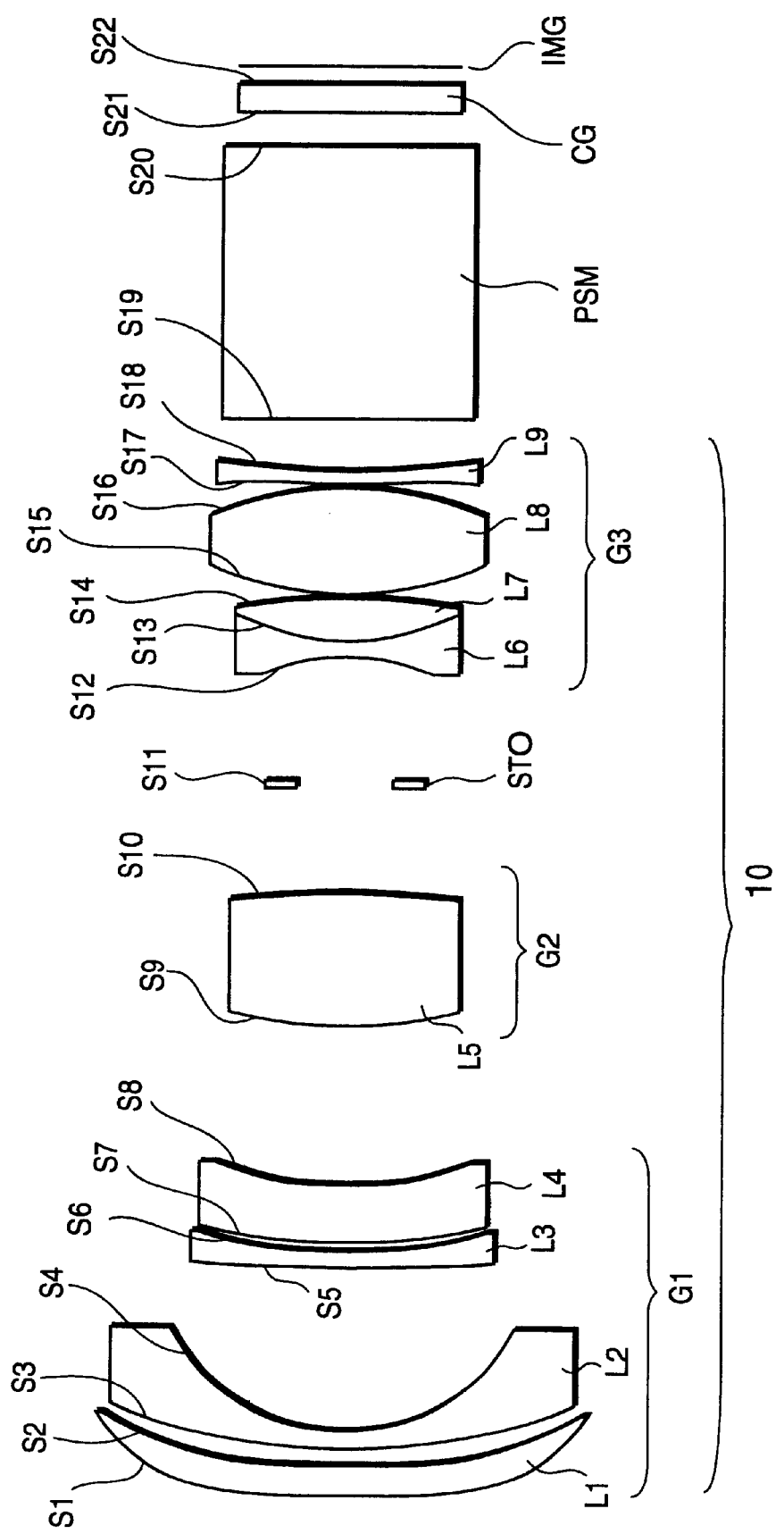
FIG. 30 is a schematic diagram showing a configuration of a retrofocus lens system of Embodiment 14 of the present invention.

FIG. 30 is a schematic diagram showing a configuration of a retrofocus lens system 10 of Embodiment 14 of the present invention. As shown in FIG. 30, the retrofocus lens system 10 of Embodiment 14 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 30).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power and a convex surface facing the small conjugate side, and a meniscus-shaped negative fourth lens $L_4$ having a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 27 below.

TABLE 27

| S | R | T | N | vd | Type |
|---|---|---|---|---|---|
| OBJ | Infinity | 658 | | | |
| 1 | −603.1793 | 2.955373 | 1.489992 | 54.434 | ASP |
| 2 | −1252.088 | 1.387986 | | | ASP |
| 3 | 60.69826 | 1.726508 | 1.788000 | 47.490 | |
| 4 | 18.98092 | 15.47505 | | | |
| 5 | 227.6034 | 1.510625 | 1.539875 | 59.500 | |
| 6 | 49.67085 | 0.9771814 | | | |
| 7 | 63.10602 | 5.374711 | 1.757000 | 47.710 | |
| 8 | 38.44805 | 15.32823 | | | |
| 9 | 42.82509 | 13.00048 | 1.761820 | 26.610 | |
| 10 | −114.9597 | 10.55714 | | | |
| 11 | Infinity | 12.39753 | | | STO |
| 12 | −21.24778 | 1.500236 | 1.805180 | 25.460 | |
| 13 | 22.53205 | 4.233733 | 1.799349 | 42.200 | |
| 14 | −48.86455 | 0.2497661 | | | |
| 15 | 32.98936 | 10.18058 | 1.754870 | 52.300 | |
| 16 | −33.90229 | 0.2819121 | | | |
| 17 | 79.17403 | 1.495547 | 1.489992 | 54.434 | ASP |
| 18 | 225.3868 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 28 below.

TABLE 28

(ASPHERIC COEFFICIENT)

| S | K | D | E | F | G | H | I |
|---|---|---|---|---|---|---|---|
| 1 | −26.16893 | 4.227432e-5 | −9.466499e-8 | 1.842539e-10 | −1.319885e-13 | −4.221653e-17 | 1.419174e-19 |
| 2 | −1.930807 | 3.871608e-5 | −1.018586e-7 | 2.019807e-10 | −1.701488e-13 | 2.013130e-17 | 1.637545e-20 |
| 17 | −68.23142 | 2.283620e-5 | −2.708870e-7 | −6.283583e-10 | 2.837882e-12 | −1.158778e-14 | 4.216551e-17 |
| 18 | −99.99808 | 4.451478e-5 | −1.447993e-7 | −9.556536e-10 | 3.473324e-12 | −4.533846e-15 | 1.169178e-17 |

The values of $f_2/f_3$, $|f_1|/f$, $|f_4|/f$, $f_5/f$, $|EXP|/f$, and $BFL/f$ of the retrofocus lens system 10 of Embodiment 13 are as indicated in Table 35, which is given later, and the conditional expressions (1) to (9) given above are satisfied.

Further, the retrofocus lens system 10 of Embodiment 14 has such a long back focal length that a prism (PSM in FIG. 30) and a cover glass (CG in FIG. 30) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 43A:
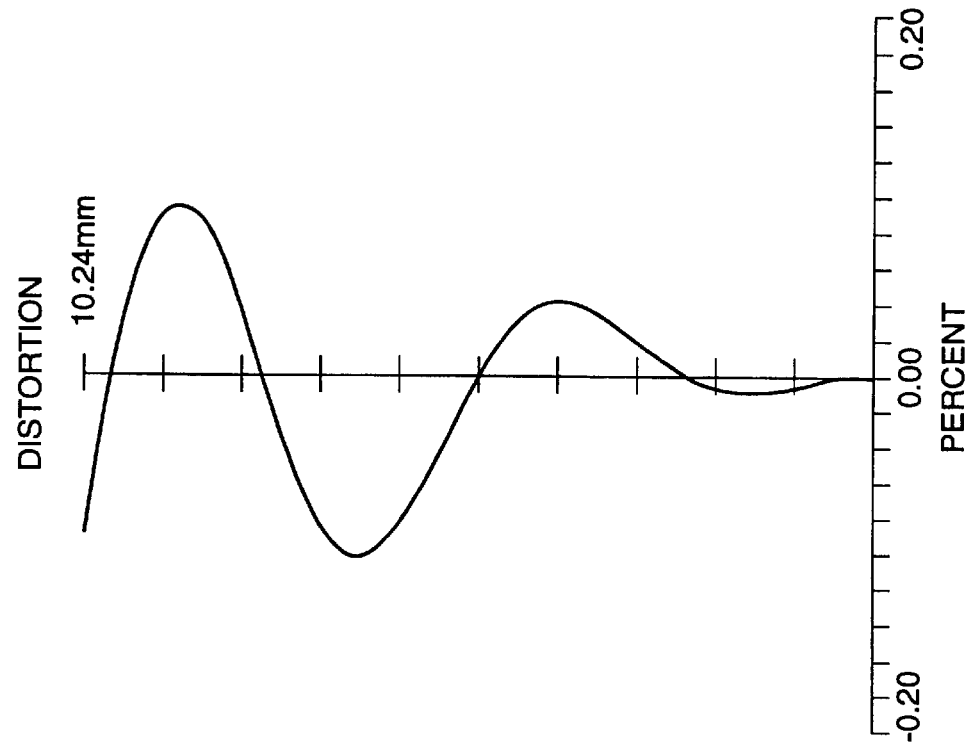
FIGS. 43A and 43B show characteristics of the retrofocus lens system of FIG. 30.
Figure 43B:
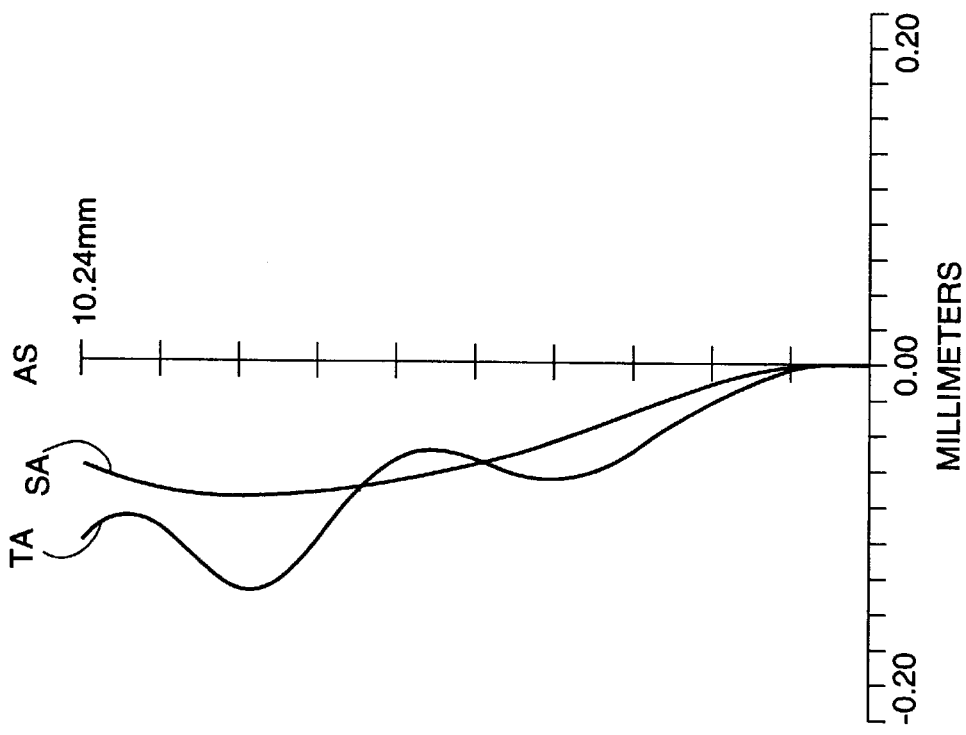

FIGS. 43A and 43B show the characteristics of the retrofocus lens system of Embodiment 14, FIG. 43A shows astigmatism (AS) on the small conjugate side, and FIG. 43B shows distortion. FIGS. 43A and 43B show the plotted astigmatism and distortion of light having a wavelength of 546.1 nm.

Figure 44A:
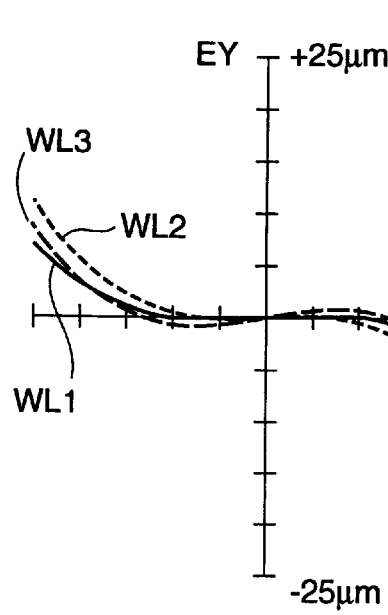
FIGS. 44A to 44D show characteristics of the retrofocus lens system of FIG. 30.
Figure 44B:
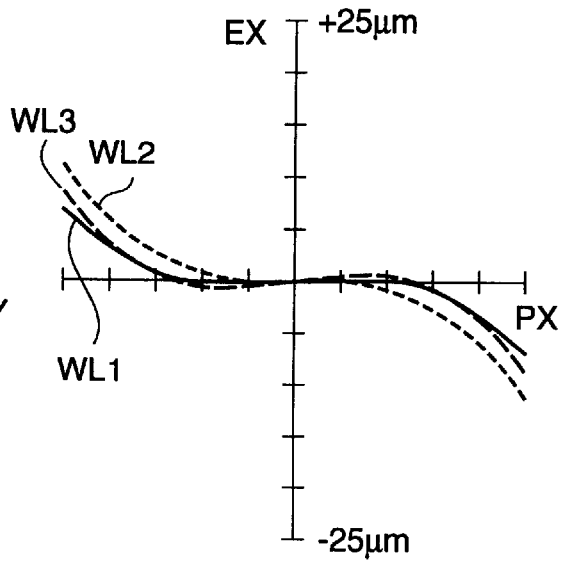
Figure 44C:
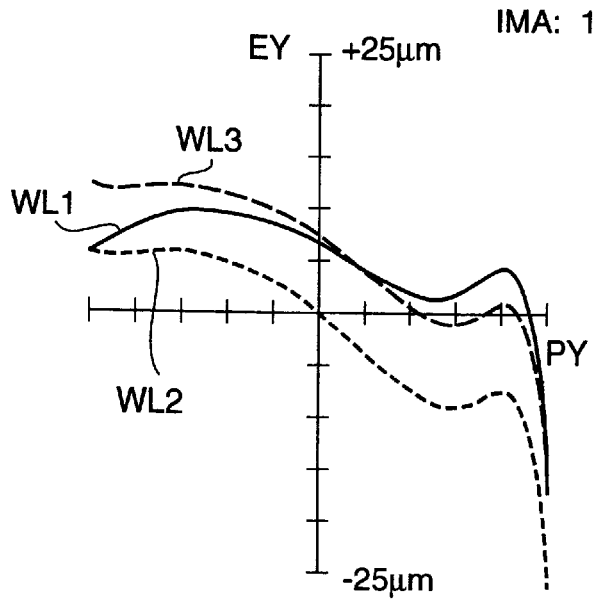
Figure 44D:
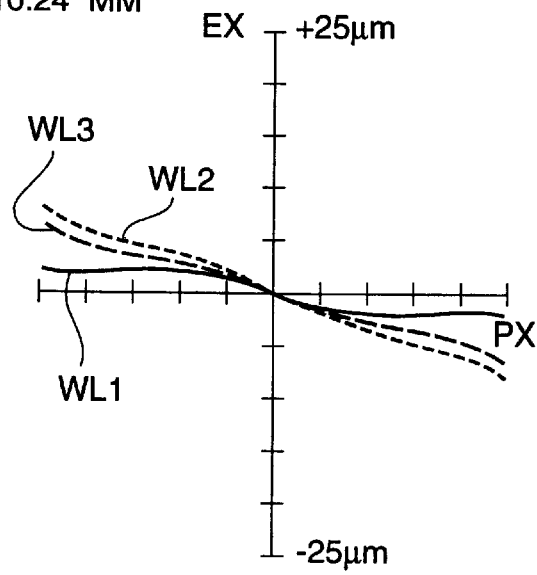

FIGS. 44A–44D show the characteristics of the retrofocus lens system of Embodiment 14. FIGS. 44A and 44B show the axial (that is, at an image height of 0.00 mm) lateral aberration. FIGS. 44C and 44D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 14 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 14 is the same as Embodiment 1.

Embodiment 15

Figure 31:
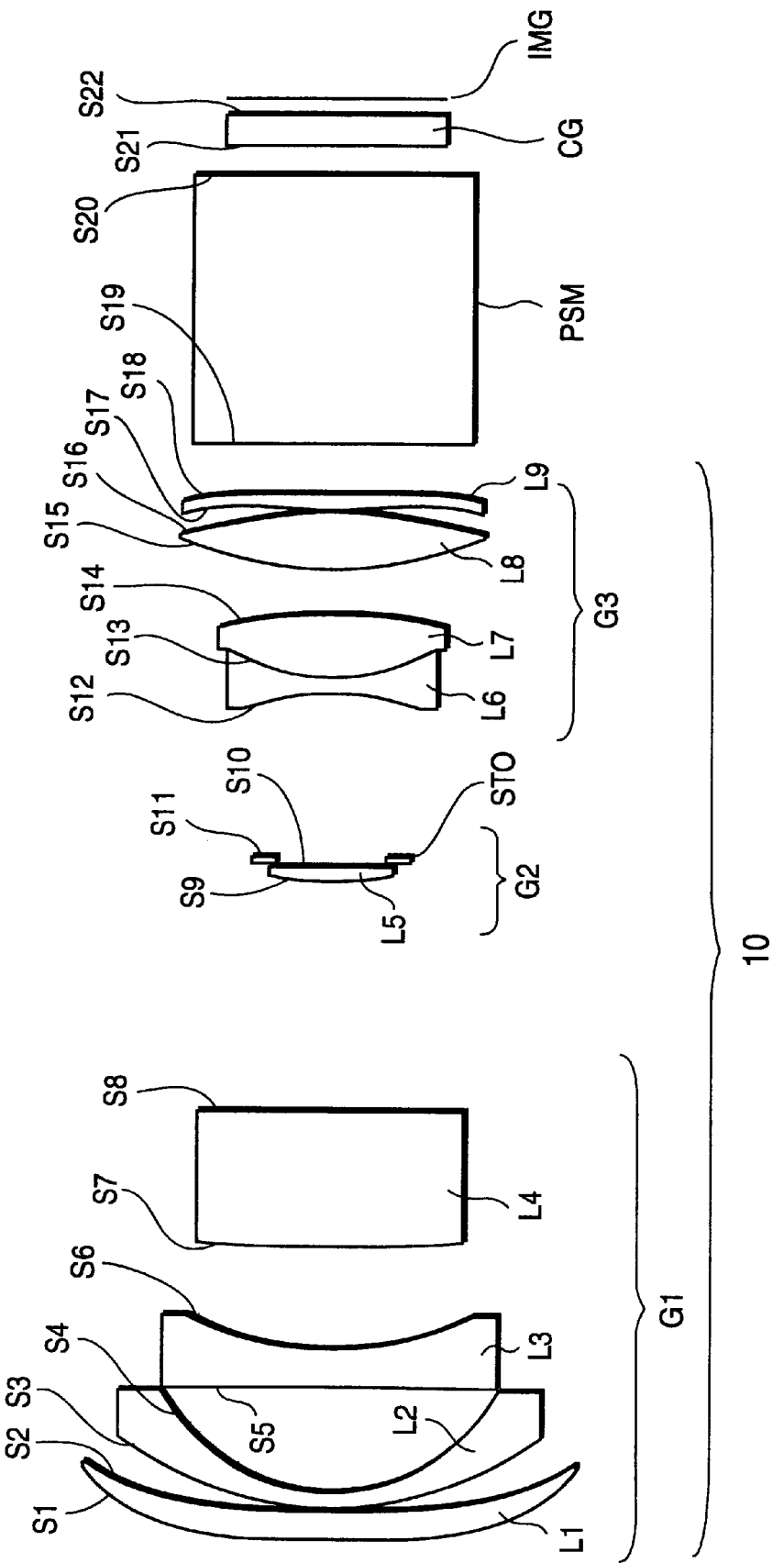
FIG. 31 is a schematic diagram showing a configuration of a retrofocus lens system of Embodiment 15 of the present invention.

FIG. 31 is a schematic diagram showing a configuration of a retrofocus lens system 10 of Embodiment 15 of the present invention. As shown in FIG. 31, the retrofocus lens system 10 of Embodiment 15 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 31).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a third lens $L_3$ having a negative refracting power, and a fourth lens $L_4$ having a weak positive refracting power, both surfaces of which are convex.

The second lens group $G_2$ includes a meniscus-shaped fifth lens $L_5$ having a positive refracting power.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 29 below.

TABLE 29

| S | R | T | N | vd | Type |
|---|---|---|---|---|---|
| OBJ | Infinity | 658 | | | |
| 1 | 15247.92 | 2.694712 | 1.489992 | 54.434 | ASP |
| 2 | 5848.48 | 0.2497689 | | | ASP |
| 3 | 34.74974 | 1.504101 | 1.834807 | 42.700 | |
| 4 | 18.92363 | 9.93905 | | | |
| 5 | −801.5277 | 3.479532 | 1.651597 | 58.500 | |
| 6 | 31.99432 | 9.869403 | | | |
| 7 | 282.4274 | 13.00055 | 1.816000 | 46.600 | |
| 8 | −1313.844 | 22.70748 | | | |
| 9 | 29.96767 | 1.500667 | 1.808095 | 22.800 | |
| 10 | 347.0915 | 0.7294937 | | | |
| 11 | Infinity | 16.36707 | | | STO |
| 12 | −26.88375 | 1.739384 | 1.922860 | 20.880 | |
| 13 | 22.01737 | 6.057039 | 1.799516 | 42.200 | |
| 14 | −50.75866 | 4.457914 | | | |
| 15 | 40.41164 | 5.506336 | 1.788000 | 47.490 | |
| 16 | −50.29862 | 0.2504059 | | | |
| 17 | 82.25537 | 1.496328 | 1.489992 | 54.434 | ASP |
| 18 | −3550.295 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 30 below.

TABLE 30

(ASPHERIC COEFFICIENT)

| S | K | D | E | F | G | H | I |
|---|---|---|---|---|---|---|---|
| 1 | 47.73011 | 3.745201e-5 | −9.428939e-8 | 1.603991e-10 | −9.534442e-14 | −1.690193e-17 | 6.275441e-20 |
| 2 | 46.64074 | 3.551608e-5 | −1.21375e-7 | 2.432507e-10 | −1.829630e-13 | −4.737799e-19 | 3.942747e-20 |
| 17 | −86.71127 | 1.665085e-5 | −2.138813e-7 | −5.521734e-10 | 3.391058e-12 | −7.559908e-15 | 1.603144e-17 |
| 18 | −100.0012 | 1.785660e-5 | −1.324628e-7 | −8.530855e-10 | 4.248764e-12 | −7.870512e-15 | 1.240947e-17 |

The values of $f_2/f_3$, $|f_1|/f$, $|f_4|/f$, $f_5/f$, $|EXP|/f$, and BFL/f of the retrofocus lens system 10 of Embodiment 15 are as indicated in Table 35, which is given later, and the conditional expressions (1) to (9) given above are satisfied.

Further, the retrofocus lens system 10 of Embodiment 15 has such a long back focal length that a prism (PSM in FIG. 31) and a cover glass (CG in FIG. 31) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 45B:
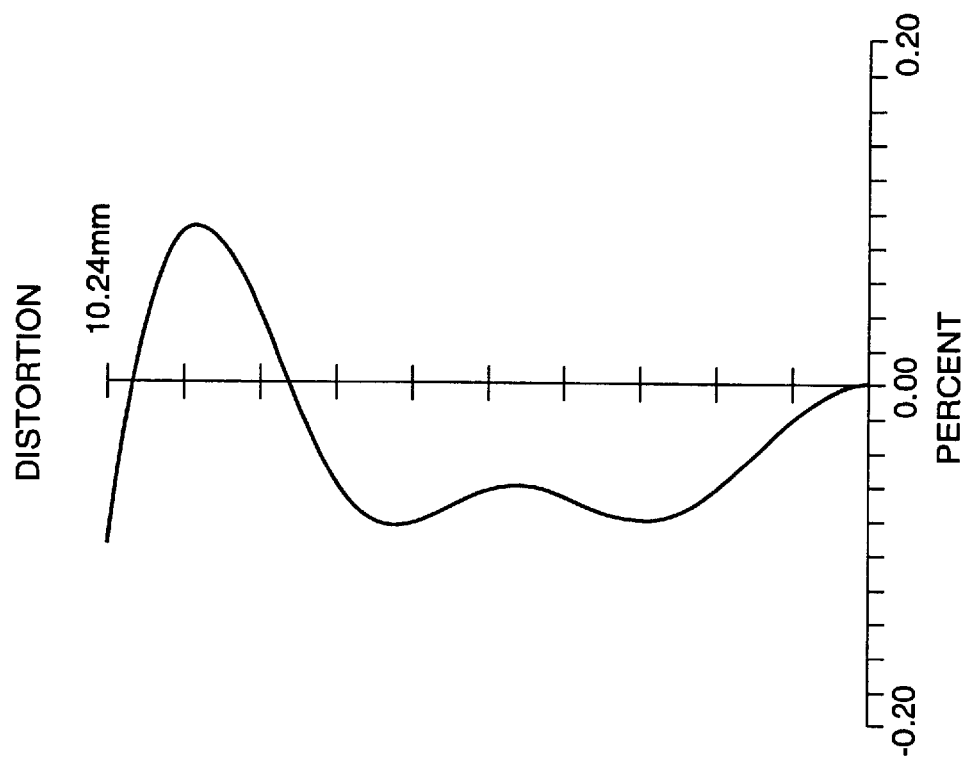
FIGS. 45A and 45B show characteristics of the retrofocus lens system of FIG. 31.
Figure 45A:
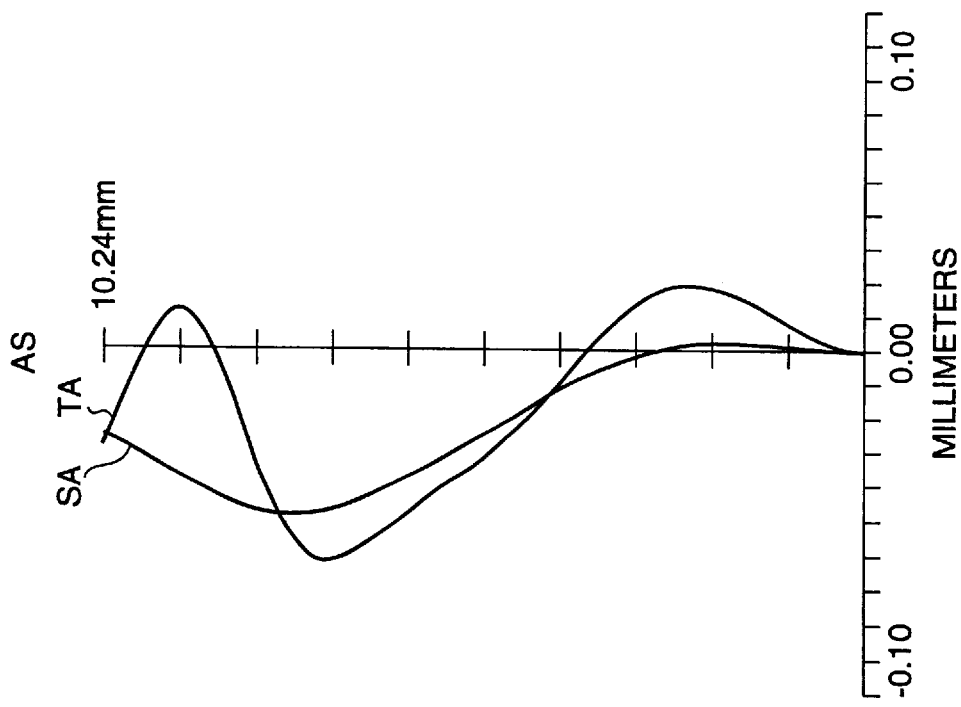

FIGS. 45A and 45B show the characteristics of the retrofocus lens system of Embodiment 15, FIG. 45A shows astigmatism (AS) on the small conjugate side, and FIG. 45B shows distortion. FIGS. 45A and 45B show the plotted astigmatism and distortion of light having a wavelength of 546.1 nm.

Figure 46A:
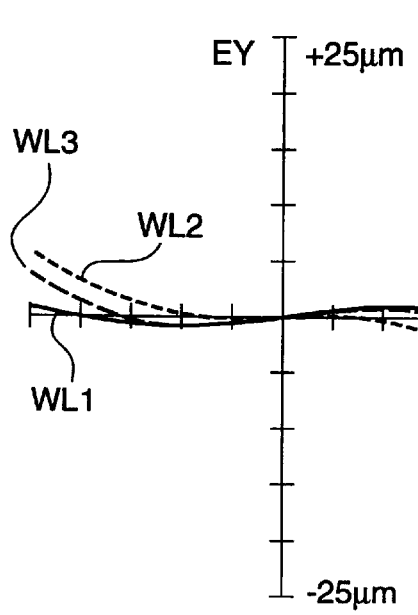
FIGS. 46A to 46D show characteristics of the retrofocus lens system of FIG. 31.
Figure 46B:
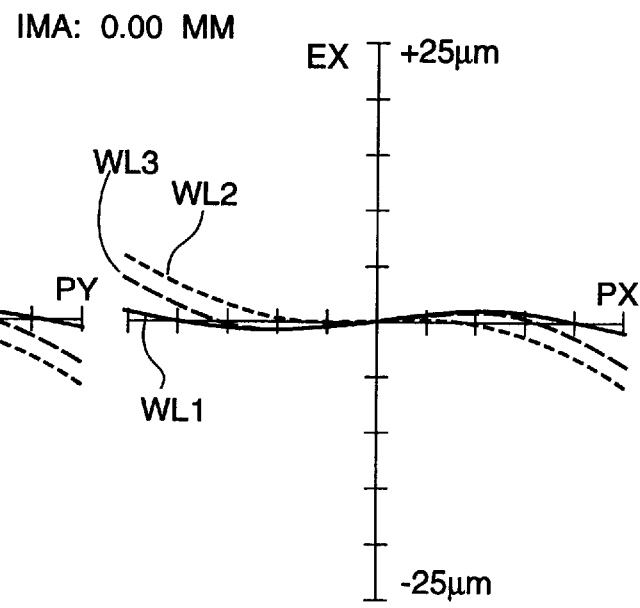
Figure 46C:
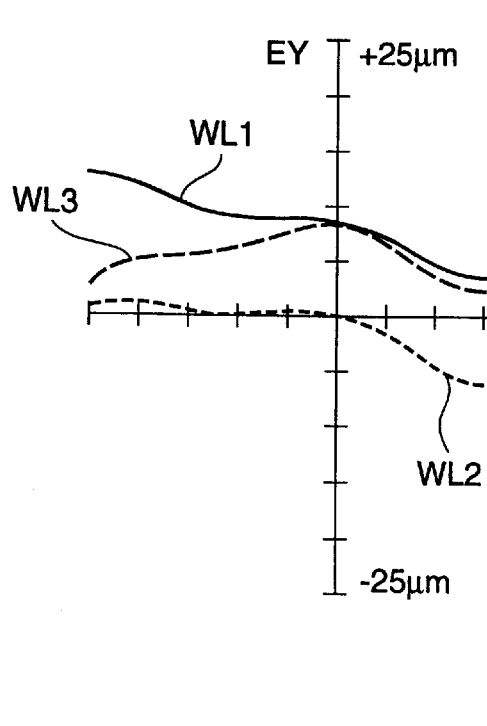
Figure 46D:
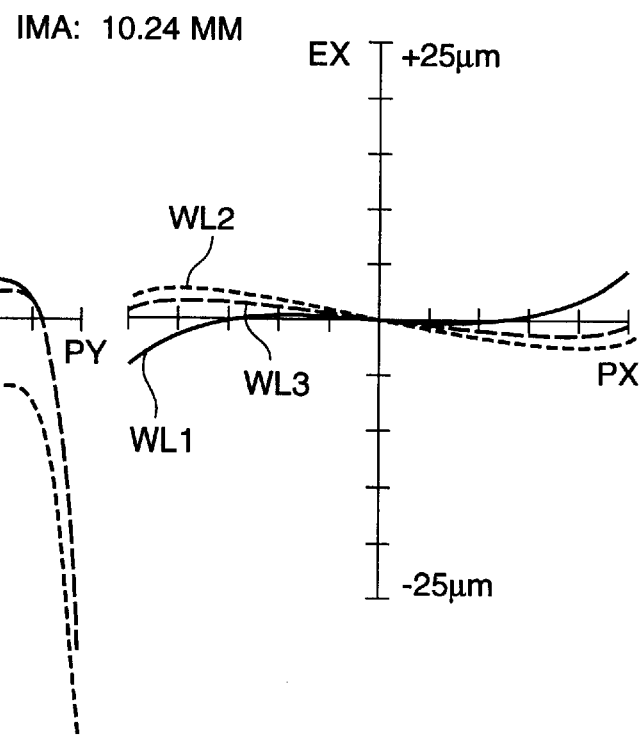

FIGS. 46A–46D show the characteristics of the retrofocus lens system of Embodiment 15. FIGS. 46A and 46B show the axial (that is, at an image height of 0.00 mm) lateral aberration. FIGS. 46C and 46D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 15 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 15 is the same as Embodiment 1.

Embodiment 16

Figure 32:
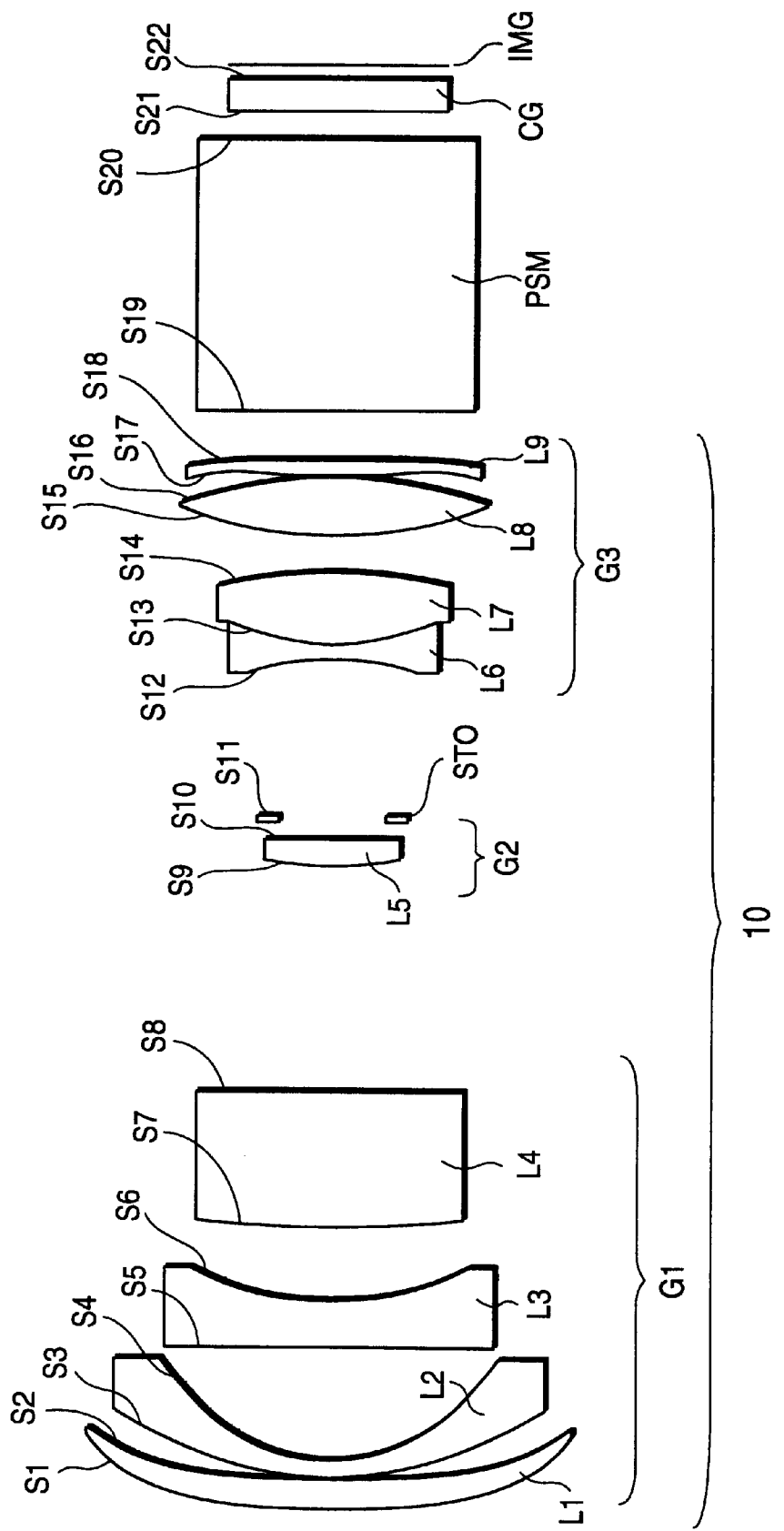
FIG. 32 is a schematic diagram showing a configuration of a retrofocus lens system of Embodiment 16 of the present invention.

FIG. 32 is a schematic diagram showing a configuration of a retrofocus lens system 10 of Embodiment 16 of the present invention. As shown in FIG. 32, the retrofocus lens system 10 of Embodiment 16 comprises a first lens group $G_1$ having a negative refracting power, a second lens group $G_2$ having a positive refracting power, a stop STO (a stop surface is denoted by $S_{11}$), and a third lens group $G_3$ having a positive refracting power, which are disposed in order from the large conjugate side (i.e., the left side of FIG. 32).

The first lens group $G_1$ includes, in order from the large conjugate side, a first lens $L_1$ having a weak negative refracting power in the vicinity of the center, a meniscus-shaped second lens $L_2$ having a negative refracting power and a convex surface facing the large conjugate side, a meniscus-shaped third lens $L_3$ having a negative refracting power, and a meniscus-shaped fourth lens $L_4$ having a weak positive refracting power and a convex surface facing the large conjugate side.

The second lens group $G_2$ includes a fifth lens $L_5$ having a positive refracting power, both surfaces of which are convex.

The third lens group $G_3$ includes, in order from the large conjugate side, a sixth lens $L_6$ having a negative refracting power, both surfaces of which are concave, a seventh lens $L_7$ having a positive refracting power, both surfaces of which are convex, and which is joined with the sixth lens $L_6$, an eighth lens $L_8$ having a positive refracting power, both surfaces of which are convex, and a ninth lens $L_9$ having a positive refracting power in the vicinity of the center.

The components of the retrofocus lens system 10 are identified by the sample values indicated in Table 31 below.

TABLE 31

| S | R | T | N | vd | Type |
|---|---|---|---|---|---|
| OBJ | Infinity | 658 | | | |
| 1 | 6198.378 | 2.630708 | 1.489992 | 54.434 | ASP |
| 2 | 7925.966 | 0.3171195 | | | ASP |
| 3 | 39.00887 | 1.500182 | 1.816000 | 46.570 | |
| 4 | 19.38906 | 10.63401 | | | |
| 5 | 5126.807 | 4.541206 | 1.651597 | 58.500 | |
| 6 | 33.02215 | 7.186782 | | | |
| 7 | 192.5698 | 13.00034 | 1.788001 | 47.400 | |
| 8 | 738.5878 | 22.37514 | | | |
| 9 | 34.68041 | 2.526525 | 1.846659 | 23.800 | |
| 10 | −2342.251 | 2.113203 | | | |
| 11 | Infinity | 15.71381 | | | ST0 |
| 12 | −25.94778 | 1.5 | 1.922864 | 21.300 | |
| 13 | 23.27625 | 7.043356 | 1.815500 | 44.540 | |
| 14 | −52.54686 | 3.637059 | | | |
| 15 | 43.10476 | 5.674874 | 1.804000 | 46.600 | |
| 16 | −44.91299 | 0.2495246 | | | |
| 17 | 87.18978 | 1.495283 | 1.489992 | 54.434 | ASP |
| 18 | −2724.36 | 5 | | | ASP |
| 19 | Infinity | 26 | 1.516800 | 64.200 | |
| 20 | Infinity | 3 | | | |
| 21 | Infinity | 2.74 | 1.471693 | 65.850 | |
| 22 | Infinity | | | | |

The first lens $L_1$ is made of PMMA, and the lens surfaces $S_1$ and $S_2$ are aspheric. The ninth lens $L_9$ is also made of PMMA, and the lens surfaces $S_{17}$ and $S_{18}$ are aspheric. The shapes of the lens surfaces $S_1$ and $S_2$ and the lens surfaces $S_{17}$ and $S_{18}$ can be represented by the expression (10) indicated above. The values of the aspheric coefficients K, D, E, F, G, H, and I are indicated in Table 32 below.

TABLE 32

(ASPHERIC COEFFICIENT)

| S | K | D | E | F |
|---|---|---|---|---|
| 1 | −30.30736 | 3.75768e−5 | −9.389944e−8 | 1.629011e−10 |
| 2 | 87.6773 | 3.575140e−5 | −1.198186e−7 | 2.42849e−10 |
| 17 | −98.28087 | 1.742825e−5 | −2.084110e−7 | −5.683136e−10 |
| 18 | −100 | 2.003811e−5 | −1.287568e−7 | −8.585787e−10 |

| S | G | H | I |
|---|---|---|---|
| 1 | −9.699929e−14 | −1.906152e−17 | 6.719206e−20 |
| 2 | −1.843526e−13 | −4.851966e−19 | 3.878404e−20 |
| 17 | 3.344891e−12 | −7.390991e−15 | 1.576511e−17 |
| 18 | 4.203414e−12 | −7.788488e−15 | 1.241846e−17 |

The values of $f_2/f_3$, $|f_1|/f$, $|f_4|/f$, $f_5/f$, $|EXP|/f$, and $BFL/f$ of the retrofocus lens system 10 of Embodiment 16 are as indicated in Table 35, which is given later, and the conditional expressions (1) to (9) given above are satisfied.

Further, the retrofocus lens system 10 of Embodiment 16 has such a long back focal length that a prism (PSM in FIG. 32) and a cover glass (CG in FIG. 32) in front of the light valve can be disposed between the retrofocus lens system 10 and the light valve surface and that an appropriate air spacing can be disposed in the optical path from the retrofocus lens system 10 to the image forming face IMG of the light valve. The design is provided to make the principal ray at each angle of view approximately parallel to the lens optical axis on the light valve side, so that a sufficient peripheral illuminance is ensured, and the transmission and reflection in the prism become even in the screen. Therefore, the factors causing inconsistencies in color and brightness of the projected image can be reduced.

Figure 47B:
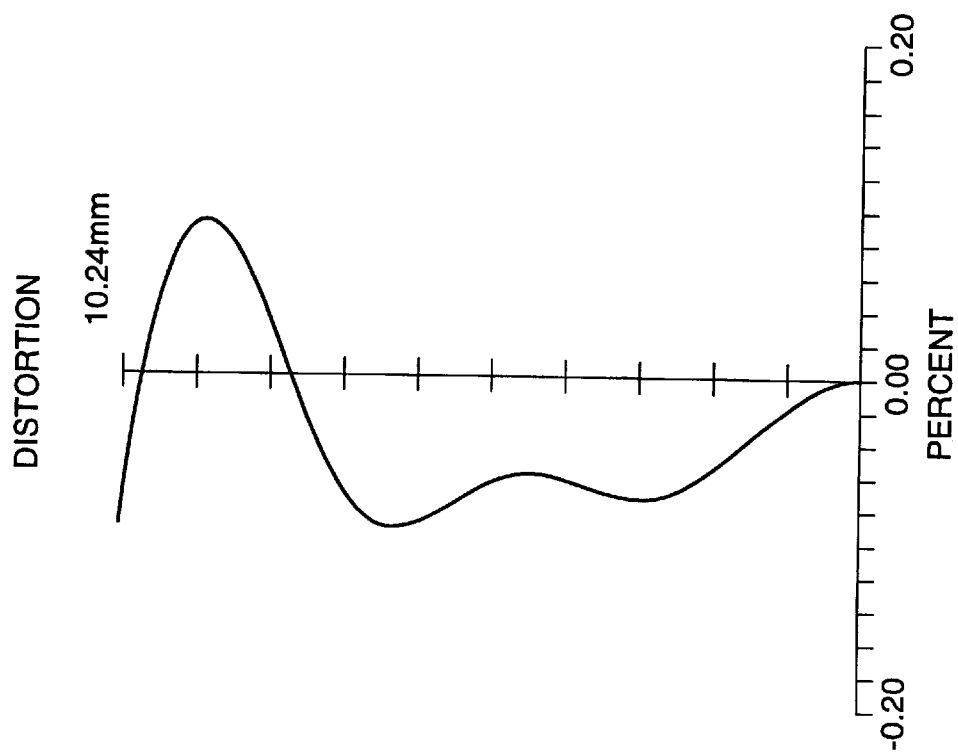
FIGS. 47A and 47B show characteristics of the retrofocus lens system of FIG. 32.
Figure 47A:
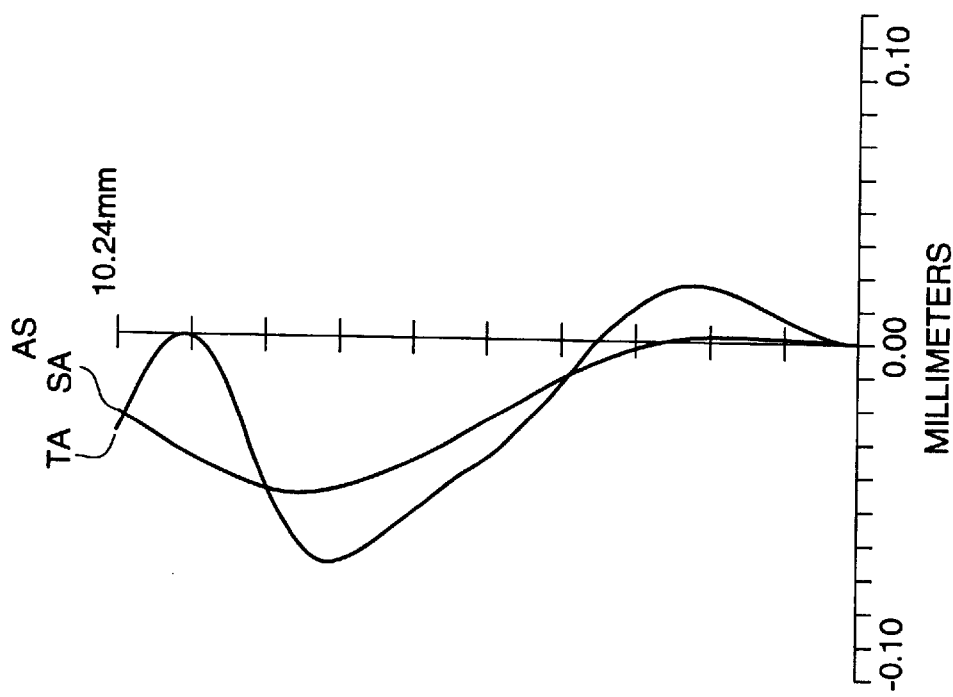

FIGS. 47A and 47B show the characteristics of the retrofocus lens system of Embodiment 16, FIG. 47A shows astigmatism (AS) on the small conjugate side, and FIG. 47B shows distortion. FIGS. 47A and 47B show the plotted astigmatism and distortion of light having a wavelength of 546.1 nm.

FIGS. 48A–48D show the characteristics of the retrofocus lens system of Embodiment 16. FIGS. 48A and 48B show the axial (that is, at an image height of 0.00 mm) lateral aberration. FIGS. 48C and 48D show the lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion, and the like of the lens directly and greatly affects the quality of the projected image. The retrofocus lens system 10 of Embodiment 16 sufficiently corrects both chromatic aberration and distortion and has adequate properties for use in a rear projector. Moreover, the other axial aberrations and off-axis aberrations are appropriately corrected so that a light valve having many pixels on the order of million pixels can be projected. In other respects, Embodiment 16 is the same as Embodiment 1.

Tables 33 and 34 provide a summary of the parameters of sample values of Embodiments 1 to 8 described above (Tables 1 to 16). Tables 35 and 36 provide a summary of the parameters of sample values of Embodiments 9 to 16 described above (Tables 17 to 32).

TABLE 33

| EMBODI-MENT | f (mm) | ω (deg) | Fn | β | f1 | f2 | f3 | EXP | f4 | f5 | BFL | $\frac{|f1|}{f}$ | $\frac{f2}{f3}$ | $\frac{|f4|}{f}$ | $\frac{f5}{f}$ | $\frac{|EXP|}{f}$ | $\frac{BFL}{f}$ |
|---|---|---|---|---|---|---|---|---|---|---|---|---|---|---|---|---|---|
| 1 | 11.74 | 40.9 | 3.0 | 58.2 | −28.83 | 43.66 | 33.77 | −650.9 | −34404 | 159.9 | 28.34 | 2.5 | 1.3 | 2930.5 | 13.6 | 55.4 | 2.4 |
| 2 | 11.80 | 40.7 | 3.0 | 58.2 | −25.73 | 47.62 | 30.94 | −627.2 | −672 | 92.6 | 28.33 | 2.2 | 1.5 | 56.9 | 7.8 | 53.2 | 2.4 |
| 3 | 11.76 | 40.8 | 3.0 | 75.3 | −26.10 | 47.77 | 31.09 | −607.9 | −796 | 90.0 | 28.31 | 2.2 | 1.5 | 67.7 | 7.6 | 51.7 | 2.4 |
| 4 | 11.81 | 40.7 | 3.0 | 75.3 | −25.73 | 47.42 | 30.02 | −710.2 | −860 | 108.3 | 28.42 | 2.2 | 1.6 | 72.8 | 9.2 | 60.1 | 2.4 |
| 5 | 11.79 | 40.8 | 3.0 | 75.3 | −25.69 | 47.66 | 30.43 | −791.9 | −565 | 116.6 | 28.42 | 2.2 | 1.6 | 48.0 | 9.9 | 67.2 | 2.4 |
| 6 | 11.76 | 40.8 | 3.0 | 75.4 | −27.46 | 48.39 | 30.89 | −738.6 | −512 | 105.3 | 28.42 | 2.3 | 1.6 | 43.5 | 9.0 | 62.8 | 2.4 |
| 7 | 11.77 | 40.8 | 3.0 | 75.4 | −27.47 | 48.39 | 30.91 | −731.0 | −526 | 105.8 | 28.39 | 2.3 | 1.6 | 44.6 | 9.0 | 62.1 | 2.4 |
| 8 | 11.76 | 40.8 | 3.0 | 75.4 | −27.43 | 48.39 | 30.91 | −729.5 | −511 | 105.8 | 28.40 | 2.3 | 1.6 | 43.4 | 9.0 | 62.0 | 2.4 |

TABLE 34

| EMBODIMENT | ν9 | ν12 | ν13 | ν15 | ν17 | νp |
|---|---|---|---|---|---|---|
| 1 | 25.40 | 20.88 | 42.20 | 42.20 | 54.43 | 46.28 |
| 2 | 23.80 | 23.83 | 46.57 | 47.49 | 57.56 | 50.54 |
| 3 | 23.80 | 23.83 | 46.57 | 47.49 | 57.56 | 50.54 |
| 4 | 25.46 | 23.90 | 46.60 | 46.50 | 57.56 | 50.22 |
| 5 | 25.46 | 23.90 | 46.60 | 46.50 | 57.56 | 50.22 |
| 6 | 25.46 | 23.90 | 46.60 | 46.50 | 57.56 | 50.22 |
| 7 | 25.46 | 23.90 | 46.60 | 46.50 | 57.56 | 50.22 |
| 8 | 25.46 | 23.90 | 46.60 | 46.50 | 56.98 | 50.03 |

TABLE 35

| EMBODI-MENT | f (mm) | ω (deg) | Fn | β | f1 | f2 | f3 | EXP | f4 | f5 | BFL | $\frac{|f1|}{f}$ | $\frac{f2}{f3}$ | $\frac{|f4|}{f}$ | $\frac{f5}{f}$ | $\frac{|EXP|}{f}$ | $\frac{BFL}{f}$ |
|---|---|---|---|---|---|---|---|---|---|---|---|---|---|---|---|---|---|
| 9 | 13.10 | 40.8 | 3.0 | 50.7 | −22.95 | 45.47 | 36.62 | 1695.8 | −4380.9 | 165.8 | 32.75 | 1.8 | 1.2 | 334.4 | 12.7 | 129.5 | 2.5 |
| 10 | 13.10 | 40.8 | 3.0 | 50.7 | −22.66 | 45.75 | 39.41 | −1579.0 | −6745.2 | 181.9 | 32.79 | 1.7 | 1.2 | 514.9 | 13.9 | 120.5 | 2.5 |
| 11 | 13.06 | 40.8 | 3.0 | 50.8 | −20.90 | 43.00 | 42.41 | −202.0 | −1035.4 | 287.2 | 32.80 | 1.6 | 1.0 | 79.3 | 22.0 | 15.5 | 2.5 |
| 12 | 13.10 | 40.8 | 3.0 | 50.3 | −20.91 | 44.54 | 30.81 | −139.6 | −2039.2 | 166.6 | 28.31 | 1.6 | 1.4 | 155.7 | 12.7 | 10.7 | 2.2 |
| 13 | 13.09 | 40.8 | 3.0 | 50.4 | −24.82 | 49.25 | 33.81 | −137.6 | −850.6 | 327.6 | 28.30 | 1.9 | 1.5 | 65.0 | 25.0 | 10.5 | 2.2 |
| 14 | 11.74 | 40.8 | 3.0 | 58.1 | −18.47 | 42.10 | 28.84 | −131.0 | −2368.3 | 247.2 | 28.38 | 1.6 | 1.5 | 201.7 | 21.1 | 11.2 | 2.4 |
| 15 | 11.76 | 40.8 | 3.0 | 58.0 | −25.54 | 40.09 | 33.25 | −781.0 | −19279.0 | 163.37 | 28.35 | 2.2 | 1.2 | 1639.4 | 13.9 | 66.4 | 2.4 |
| 16 | 11.76 | 40.8 | 3.0 | 58.0 | −24.54 | 39.99 | 31.86 | −874.4 | 57752.0 | 171.69 | 28.34 | 2.1 | 1.3 | 4910.9 | 14.6 | 74.4 | 2.4 |

TABLE 36

| EMBODIMENT | ν9 | ν12 | ν13 | ν15 | ν17 | νp |
|---|---|---|---|---|---|---|
| 9 | 30.05 | 25.70 | 55.46 | 55.45 | 54.43 | 55.11 |
| 10 | 30.05 | 25.70 | 55.46 | 55.45 | 54.43 | 55.11 |
| 11 | 26.61 | 23.78 | 51.05 | 48.30 | 54.43 | 51.26 |
| 12 | 26.55 | 27.53 | 47.71 | 54.70 | 54.43 | 52.28 |
| 13 | 27.76 | 25.46 | 47.40 | 52.32 | 54.43 | 51.38 |
| 14 | 26.61 | 25.46 | 42.20 | 52.30 | 54.43 | 49.64 |
| 15 | 22.80 | 20.88 | 42.20 | 47.49 | 54.43 | 48.04 |
| 16 | 23.80 | 21.30 | 44.54 | 46.60 | 54.43 | 48.52 |

In the tables, f denotes a focal distance of the whole lens system, ω denotes a half field angle of the projection light (large conjugate side), Fn denotes an effective F-value at the reference projecting magnification (small conjugate side), and β denotes a reference projecting magnification. $f_1$ denotes the focal distance of the first lens group $G_1$, $f_2$ denotes the focal distance of the second lens group $G_2$, $f_3$ denotes the focal distance of the third lens group $G_3$, $f_4$ denotes the axial focal distance of the first aspheric lens $L_1$, and $f_5$ denotes the axial focal distance of the ninth aspheric lens $L_9$. EXP denotes the distance from the image surface on the small conjugate side to the pupil surface on the small conjugate side in the whole lens system, and BFL denotes the back focal length of the whole lens system (BFL is measured by removing the prism PSM and cover glass CG and irradiating the system with light from an infinite distance on the large conjugate side). $ν_9$ denotes the Abbe number on the d line of the glass material forming the fifth lens $L_5$, $ν_{12}$ denotes the Abbe number on the d line of the glass material forming the sixth lens $L_6$, and $ν_p$ denotes the mean value of the Abbe numbers on the d line of the glass materials forming the seventh lens $L_7$, eighth lens $L_8$, and ninth lens $L_9$.

Embodiment 17

Embodiment 17 is configured by replacing the projection lens 7 of the projection display apparatus shown in FIG. 49 with the retrofocus lens system 10 of any embodiment described above. The projection display apparatus 300 of Embodiment 17 has a thick dichroic prism 6 disposed between the liquid crystal panels 5R, 5G, and 5B and the projection lens 7. Accordingly, a projection lens of a rear projector or the like that requires wide-angle projection is required to have the following specifications and capabilities:

(1) Capability of wide-angle projection
(2) Long back focal length in comparison with the focal distance
(3) Good telecentric characteristics on the light valve side and the principal ray in the prism component approximately parallel to the optical axis
(4) Good correction of magnification chromatic aberration
(5) Small distortion
(6) Maintenance of desired imaging performance over a wide temperature range and small defocusing
(7) Appropriate correction of various aberrations in the best balance and capability of high-resolution projection of original image on a light valve having many pixels at a high density.

The retrofocus lens system of any embodiment described above satisfies the performance requirements (1) to (7)

indicated above. By incorporating the lens in the projection display apparatus as shown in FIG. 49, a small projection display apparatus that features a high picture quality and low cost and can be used in a wide temperature range can be realized.

Embodiment 18

Figure 50:
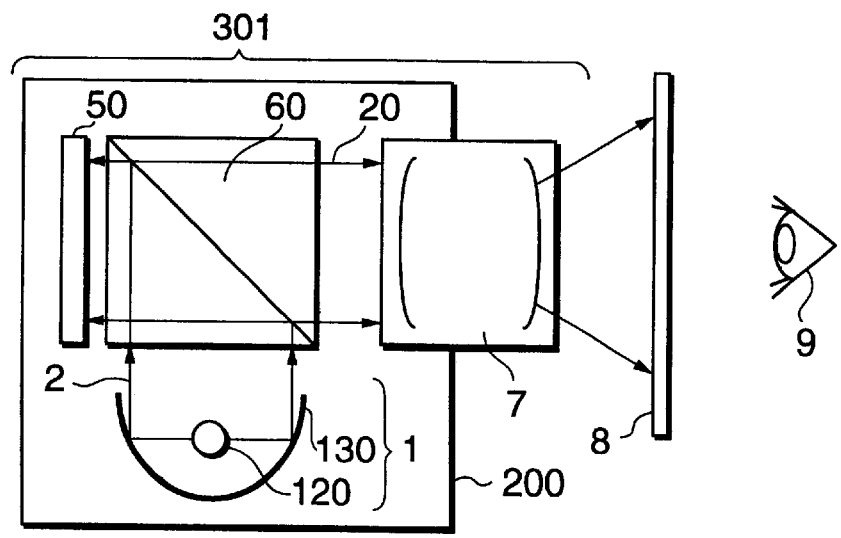
FIG. 50 is a schematic diagram showing a configuration of an optical system of a projection display apparatus of Embodiment 18 of the present invention.

FIG. 50 is a schematic diagram showing a configuration of an optical system of a projection display apparatus 301 of Embodiment 18 of the present invention. As shown in FIG. 50, the projection display apparatus 301 comprises a light source 1 which has a lamp 120 and a reflecting mirror 130 and outputs approximately parallel illuminating light 2, a reflective liquid crystal panel 50 displaying color images, a polarizing beam splitter 60 which reflects and directs the light 2 from the light source 1 onto the reflective liquid crystal panel 50 and passes the reflected light 20 from the reflective liquid crystal panel 50, and the projection lens 7 which projects the incident light 20 onto the screen 8 at magnification. The projection lens 7 of Embodiment 18 is the retrofocus lens system 10 of any embodiment described above. In the figure, the reference numeral 200 denotes the housing.

On the reflective liquid crystal panel 50, a reflecting mirror is formed for each pixel and modulates the polarizing state in a cross section of the illuminating light and spectrum. When the light 20 reflected by the liquid crystal panel 50 pass the polarizing beam splitter 60, the modulation of the polarizing state is converted to intensity modulation, and the projection lens 7 projects a magnified image onto the screen 8.

The retrofocus lens system of any embodiment described above satisfies the performance requirements (1) to (7) indicated above. By incorporating the lens in a projection display apparatus as shown in FIG. 50, a small projection display apparatus which features a high picture quality and low cost and can be used in a wide temperature range can be realized.

Embodiment 19

Figure 51:
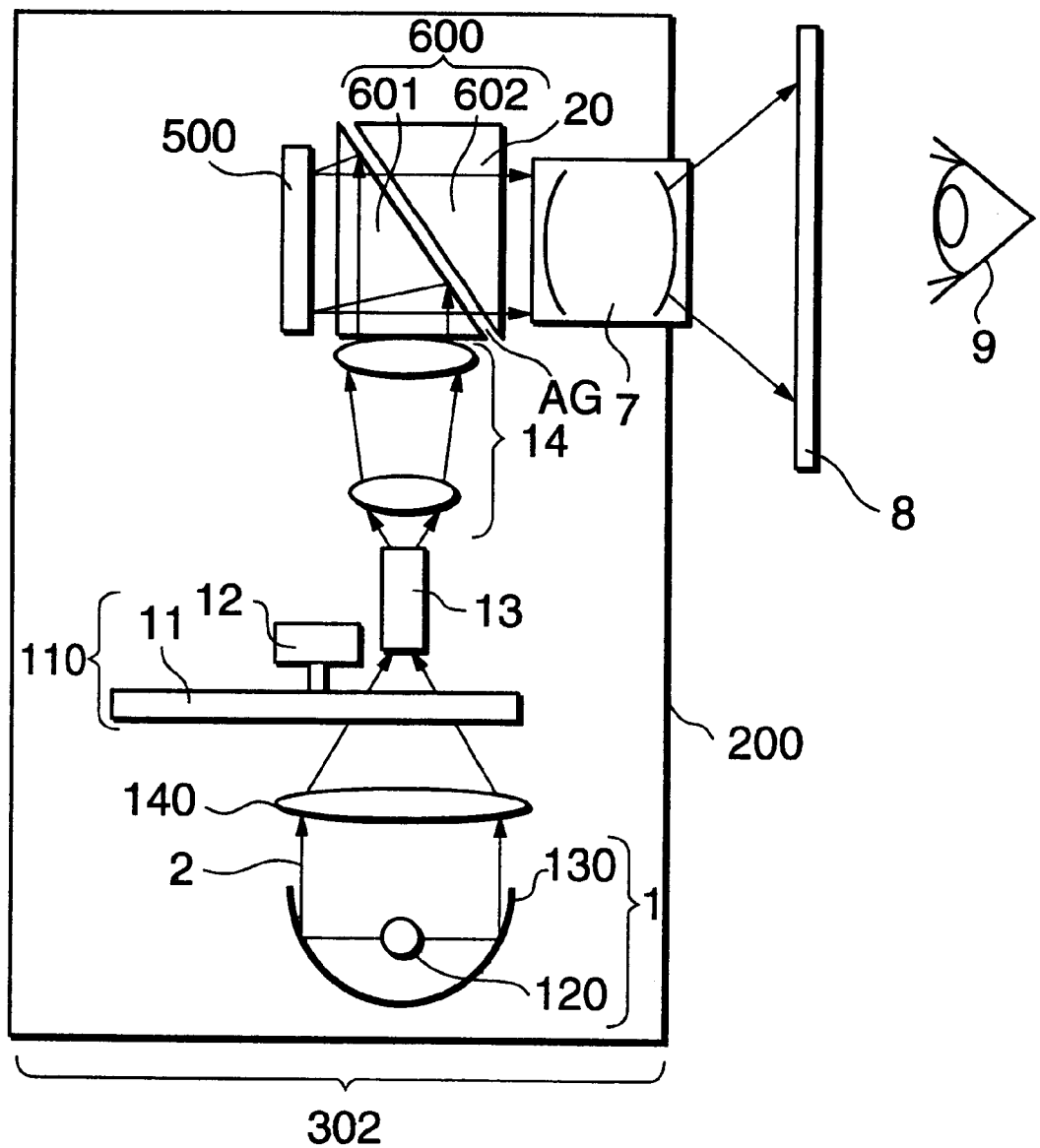
FIG. 51 is a schematic diagram showing a configuration of an optical system of a projection display apparatus of Embodiment 19 of the present invention.

FIG. 51 shows a schematic configuration of the optical system of the projection display apparatus of Embodiment 19 of the present invention. As shown in FIG. 51, the projection display apparatus 302 comprises the light source 1 which has the lamp 120 and the reflecting mirror 130 and outputs approximately parallel illuminating light 2, a condenser lens 140, and a color wheel unit 110. The color wheel unit 110 comprises a color filter 11 in which the sectors passing the primary colors R, G, and B are arranged and a motor 12 for turning the filter. The projection display apparatus 302 also comprises a rod integrator 13, a relay lens system 14, and a total internal reflection (TIR) prism 600 which totally reflects approximately telecentric light. The TIR prism 600 includes a first prism block 601 and a second prism block 602, and the inclined surfaces of the two blocks 601 and 602 face each other with a minute air gap in between.

The projection display apparatus 302 further comprises a digital micro-mirror device (DMD) 500 and the projection lens 7. The DMD 500 is an image display component utilizing micro electromechanical system (MEMS) technology. The DMD 500 is a spatial modulator in which arrays of micro-mirrors are disposed in the two dimensional face, and the inclination of each mirror is modulated to the ON or OFF state within the component surface. In Embodiment 19, the projection lens 7 is the retrofocus lens system 10 of any embodiment described above. In the figure, the reference numeral 200 denotes the housing.

The light striking the inclined surface of the first prism block 601 are totally reflected because of the difference in refractive index between the glass material forming the prism and the air gap AG and directed onto the DMD 500. The light 20 reflected by a micro-mirror in the ON-state in a surface of the DMD 500 passes each surface of the TIR prism 600, a magnified image is formed on the screen 8 by the projection lens 7, and a viewer 9 can see the image.

The retrofocus lens system of any embodiment described above satisfies the performance requirements (1) to (7) indicated above. By incorporating the lens in a projection display apparatus as shown in FIG. 51, a small projection display apparatus which features a high picture quality and low cost and can be operated in a wide temperature range can be realized.

In place of the DMD 500, agrating light valve (GLV) component may be used. The GLV component includes a lot of movable grating elements densely arranged like a two or one-dimensional array using the MEMS technique. By replacing the DMD component with the GLV component, an full color image can be displayed.

The types of light valve components may be different from those indicated in Embodiments 17 to 19.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A retrofocus lens system comprising, in order from a large conjugate side:

a first lens group having a negative refracting power;

a second lens group having a positive refracting power; and a third lens group having a positive refracting power;

said first lens group including, in order from the large conjugate side, a first lens from which projection light is sent out, a meniscus-shaped second lens which has a negative refracting power and a convex surface facing the large conjugate side, a third lens having a negative refracting power, and a fourth lens;

said second lens group including a fifth lens having a positive refracting power;

said third lens group including, in order from the large conjugate side, a sixth lens having a negative refracting power, both surfaces of which are concave, a seventh lens having a positive refracting power, both surfaces of which are convex, said seventh lens being joined with said sixth lens, an eighth lens having a positive refracting power, both surfaces of which are convex, and a ninth lens having a positive axial refracting power;

wherein said retrofocus lens system satisfies the following conditional expressions (1) to (4):

$$1.23 < f_2/f_3 < 1.8 \quad (1)$$

$$1.5 < |f_1|/f < 2.7 \quad (2)$$

$$|f_4|/f > 30 \quad (3)$$

$$f_5/f > 6 \quad (4)$$

where f is a focal distance of the whole lens system, $|f_1|$ is an absolute value of a focal distance of said first lens group, $f_2$ is a focal distance of said second lens group, $f_3$ is a focal distance of said third lens group, $|f_4|$ is an absolute value of a focal distance of said first lens, and $f_5$ is an axial focal distance of said ninth lens;

wherein said first lens has an aspherical surface, and said ninth lens has an aspherical surface.

2. A retrofocus lens system of claim 1, wherein said retrofocus lens system satisfies the following conditional expression (5):

$$|EXP|/f > 10 \tag{5}$$

where $|EXP|$ is an absolute value of a distance from an image surface on a small conjugate side to a pupil surface on the small conjugate side in the whole lens system.

3. A retrofocus lens system of claim 1, wherein said retrofocus lens system satisfies the following conditional expression (6):

$$BFL/f > 2 \tag{6}$$

where BFL is a back focal length of the whole lens system.

4. A retrofocus lens system of claim 1, wherein said retrofocus lens system satisfies the following conditional expressions (7) (8), and (9):

$$v_9 < 32 \tag{7}$$

$$v_{12} < 30 \tag{8}$$

$$v_p > 40 \tag{9}$$

where $v_9$ is an Abbe number on the d line of a glass material forming said fifth lens, $v_{12}$ is an Abbe number on the d line of a glass material forming said sixth lens, and $v_p$ is a mean value of Abbe numbers on the d line of glass materials forming said seventh lens, said eighth lens, and said ninth lens.

5. A projection display apparatus comprising:
a light source for emitting light;
a light valve for two-dimensionally modulating the light from said light source; and
a retrofocus lens system for projecting at a magnification the light modulated by said light valve;
wherein said retrofocus lens system comprising, in order from a large conjugate side:
a first lens group having a negative refracting power;
a second lens group having a positive refracting power; and
a third lens group having a positive refracting power;
said first lens group including, in order from the large conjugate side, a first lens from which projection light is sent out, a meniscus-shaped second lens which has a negative refracting power and. a convex surface facing the large conjugate side, a third lens having a negative refracting power, and a fourth lens;
said second lens group including a fifth lens having a positive refracting power;
said third lens group including, in order from the large conjugate side, a sixth lens having a negative refracting power, both surfaces of which are concave, a seventh lens having a positive refracting power, both surfaces of which are convex, said seventh lens being joined with said sixth lens, an eighth lens having a positive refracting power, both surfaces of which are convex, and a ninth lens having a positive axial refracting power;

wherein said retrofocus lens system satisfies the following conditional expressions (1) to (4):

$$1.23 < f_2/f_3 < 1.8 \tag{1}$$

$$1.5 < |f_1|/f < 2.7 \tag{2}$$

$$|f_4|/f > 30 \tag{3}$$

$$f_5/f > 6 \tag{4}$$

where f is a focal distance of the whole lens system, $|f_1|$ is an absolute value of a focal distance of said first lens group, $f_2$ is a focal distance of said second lens group, $f_3$ is a focal distance of said third lens group, $|f_4|$ is an absolute value of a focal distance of said first lens, and $f_5$ is an axial focal distance of said ninth lens;

wherein said first lens has an aspherical surface, and said ninth lens has an aspherical surface.

6. A projection display apparatus of claim 5, wherein said retrofocus lens system satisfies the following conditional expression (5):

$$|EXP|/f > 10 \tag{5}$$

where $|EXP|$ is an absolute value of a distance from an image surface on a small conjugate side to a pupil surface on the small conjugate side in the whole lens system.

7. A projection display apparatus of claim 5, wherein said retrofocus lens system satisfies the following conditional expression (6):

$$BFL/f > 2 \tag{6}$$

where BFL is a back focal length of the whole lens system.

8. A projection display apparatus of claim 5, wherein said retrofocus lens system satisfies the following conditional expressions (7), (8), and (9):

$$v_9 < 32 \tag{7}$$

$$v_{12} < 30 \tag{8}$$

$$v_p > 40 \tag{9}$$

where $v_9$ is an Abbe number on the d line of a glass material forming said fifth lens, $v_{12}$ is an Abbe number on the d line of a glass material forming said sixth lens, and $v_p$ is a mean value of Abbe numbers on the d line of glass materials forming said seventh lens, said eighth lens, and said ninth lens.

* * * * *